United States Patent
Segal et al.

(10) Patent No.: US 10,637,883 B1
(45) Date of Patent: Apr. 28, 2020

(54) SYSTEMS AND METHODS FOR DETERMINING OPTIMAL REMEDIATION RECOMMENDATIONS IN PENETRATION TESTING

(71) Applicant: XM Cyber Ltd., Hertzelia (IL)

(72) Inventors: Ronen Segal, Hertzelia (IL); Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 16/716,302

(22) Filed: Dec. 16, 2019

Related U.S. Application Data

(60) Provisional application No. 62/870,742, filed on Jul. 4, 2019.

(51) Int. Cl.
*H04L 29/06* (2006.01)

(52) U.S. Cl.
CPC .............................. *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 6,574,737 B1 | 6/2003 | Kingsford et al. | |
| 6,711,127 B1 * | 3/2004 | Gorman | H04L 63/1433 370/230 |
| 6,918,038 B1 | 7/2005 | Smith et al. | |
| 6,952,779 B1 | 10/2005 | Cohen et al. | |
| 7,013,395 B1 * | 3/2006 | Swiler | H04L 63/1433 713/151 |
| 7,296,092 B2 | 11/2007 | Nguyen | |
| 7,757,293 B2 | 7/2010 | Caceres et al. | |
| 7,926,113 B1 * | 4/2011 | Gula | H04L 63/1425 726/25 |
| 8,001,589 B2 | 8/2011 | Ormazabal et al. | |
| 8,112,016 B2 | 2/2012 | Matsumoto et al. | |
| 8,127,359 B2 | 2/2012 | Kelekar | |
| 8,321,944 B1 | 11/2012 | Mayer et al. | |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Bradley W Holder
(74) *Attorney, Agent, or Firm* — Marc Van Dyke; Momentum IP Group

(57) ABSTRACT

Methods and systems for providing a recommendation for improving the security of a networked system against attackers. The recommendation may include a recommendation of a single sub-goal to be protected to achieve optimal improvement in security, or of multiple such sub-goals. If the recommendation includes multiple sub-goals, the sub-goals may be ordered such that the first sub-goal is more important to protect, provides a greater benefit by being protected, or is more cost effective to protect than subsequent sub-goals in the ordered list of sub-goals.

20 Claims, 23 Drawing Sheets

(56) References Cited

U.S. PATENT DOCUMENTS

| | | | |
|---|---|---|---|
| 8,356,353 B2 | 1/2013 | Futoransky et al. | |
| 8,365,289 B2 | 1/2013 | Russ et al. | |
| 8,490,193 B2 | 7/2013 | Sarraute Yamada et al. | |
| 8,490,196 B2 | 7/2013 | Lucangeli Obes et al. | |
| 8,650,651 B2 | 2/2014 | Podjarny et al. | |
| 8,752,183 B1 * | 6/2014 | Heiderich | G06F 21/577 726/22 |
| 8,813,235 B2 | 8/2014 | Sidagni | |
| 9,015,847 B1 | 4/2015 | Kaplan et al. | |
| 9,076,013 B1 | 7/2015 | Bailey, Jr. et al. | |
| 9,183,397 B2 | 11/2015 | Futoransky et al. | |
| 9,224,117 B2 | 12/2015 | Chapman | |
| 9,270,696 B2 | 2/2016 | Fritzson et al. | |
| 9,276,952 B2 | 3/2016 | Simpson et al. | |
| 9,292,695 B1 | 3/2016 | Bassett | |
| 9,350,753 B2 | 5/2016 | Kaplan et al. | |
| 9,467,467 B2 | 10/2016 | Alamuri | |
| 9,473,522 B1 | 10/2016 | Kotler et al. | |
| 9,558,355 B2 | 1/2017 | Madou et al. | |
| 9,760,716 B1 | 9/2017 | Mulchandani | |
| 9,800,603 B1 | 10/2017 | Sidagni | |
| 9,870,715 B2 | 1/2018 | Sadeh-Koniecpol et al. | |
| 9,912,687 B1 | 3/2018 | Wescoe et al. | |
| 10,038,711 B1 | 7/2018 | Gorodissky et al. | |
| 10,068,095 B1 | 9/2018 | Segal et al. | |
| 10,108,803 B2 * | 10/2018 | Chari | G06F 21/577 |
| 10,122,750 B2 | 11/2018 | Gorodissky et al. | |
| 10,257,220 B2 | 4/2019 | Gorodissky et al. | |
| 10,367,846 B2 | 7/2019 | Gorodissky et al. | |
| 10,382,473 B1 | 8/2019 | Ashkenazy et al. | |
| 10,412,112 B2 | 9/2019 | Ashkenazy et al. | |
| 10,440,044 B1 | 10/2019 | Zini et al. | |
| 10,447,721 B2 | 10/2019 | Lasser | |
| 10,454,966 B2 | 10/2019 | Gorodissky et al. | |
| 10,462,177 B1 | 10/2019 | Lasser et al. | |
| 10,469,521 B1 | 11/2019 | Segal et al. | |
| 10,498,803 B1 | 12/2019 | Zini et al. | |
| 10,503,911 B2 * | 12/2019 | Chari | G06F 21/577 |
| 10,505,969 B2 | 12/2019 | Gorodissky et al. | |
| 10,534,917 B2 | 1/2020 | Segal | |
| 10,574,684 B2 | 2/2020 | Segal et al. | |
| 10,574,687 B1 | 2/2020 | Lasser | |
| 2003/0195861 A1 * | 10/2003 | McClure | H04L 41/12 |
| 2003/0212779 A1 | 11/2003 | Boyter et al. | |
| 2003/0217039 A1 * | 11/2003 | Kurtz | G02B 5/3083 |
| 2004/0015728 A1 * | 1/2004 | Cole | G02B 5/3083 726/23 |
| 2004/0078384 A1 * | 4/2004 | Keir | G02B 5/3083 |
| 2005/0086502 A1 | 4/2005 | Rayes et al. | |
| 2005/0102534 A1 | 5/2005 | Wong | |
| 2007/0011319 A1 * | 1/2007 | McClure | G02B 6/105 709/224 |
| 2007/0204347 A1 | 8/2007 | Caceres et al. | |
| 2008/0092237 A1 * | 4/2008 | Yoon | G06F 21/577 726/25 |
| 2008/0104702 A1 * | 5/2008 | Choi | H04L 63/145 726/23 |
| 2008/0172716 A1 * | 7/2008 | Talpade | H04L 41/0869 726/1 |
| 2008/0209567 A1 | 8/2008 | Lockhart et al. | |
| 2008/0256638 A1 | 10/2008 | Russ et al. | |
| 2008/0288822 A1 | 11/2008 | Wu et al. | |
| 2009/0044277 A1 | 2/2009 | Aaron | |
| 2009/0049553 A1 | 2/2009 | Vasudeva | |
| 2009/0172813 A1 | 7/2009 | Aaron | |
| 2010/0138925 A1 * | 6/2010 | Barai | H04L 63/1433 726/25 |
| 2011/0035803 A1 | 2/2011 | Lucangeli Obes et al. | |
| 2011/0061104 A1 | 3/2011 | Sarraute Yamada et al. | |
| 2012/0174228 A1 | 7/2012 | Giakouminakis et al. | |
| 2012/0255022 A1 | 10/2012 | Ocepek et al. | |
| 2013/0014263 A1 | 1/2013 | Porcello et al. | |
| 2013/0031635 A1 | 1/2013 | Lotem et al. | |
| 2014/0007241 A1 * | 1/2014 | Gula | H04L 63/1433 726/25 |
| 2014/0137257 A1 | 5/2014 | Martinez et al. | |
| 2014/0173739 A1 | 6/2014 | Ahuja et al. | |
| 2014/0237606 A1 | 8/2014 | Futoransky et al. | |
| 2015/0058993 A1 * | 2/2015 | Choi | H04L 63/1433 726/25 |
| 2016/0044057 A1 | 2/2016 | Chenetle et al. | |
| 2016/0134653 A1 | 5/2016 | Vallone et al. | |
| 2016/0234251 A1 | 8/2016 | Boice et al. | |
| 2016/0234661 A1 | 8/2016 | Narasimhan et al. | |
| 2016/0248800 A1 | 8/2016 | Ng et al. | |
| 2016/0275289 A1 | 9/2016 | Sethumadhavan et al. | |
| 2016/0342796 A1 | 11/2016 | Kaplan et al. | |
| 2016/0352771 A1 | 12/2016 | Sivan et al. | |
| 2017/0006055 A1 | 1/2017 | Strom et al. | |
| 2017/0013008 A1 | 1/2017 | Carey et al. | |
| 2017/0046519 A1 | 2/2017 | Cam | |
| 2017/0063886 A1 | 3/2017 | Muddu et al. | |
| 2017/0098086 A1 | 4/2017 | Hoernecke et al. | |
| 2017/0104780 A1 | 4/2017 | Zaffarano et al. | |
| 2017/0116421 A1 | 4/2017 | M C et al. | |
| 2017/0279843 A1 | 9/2017 | Schultz et al. | |
| 2017/0286690 A1 * | 10/2017 | Chari | G06F 21/577 |
| 2017/0373923 A1 | 12/2017 | Kazachkov et al. | |
| 2018/0018465 A1 | 1/2018 | Carey et al. | |
| 2018/0219900 A1 | 8/2018 | Gorodissky et al. | |
| 2018/0219901 A1 | 8/2018 | Gorodissky et al. | |
| 2018/0219903 A1 | 8/2018 | Segal | |
| 2018/0219904 A1 | 8/2018 | Gorodissky et al. | |
| 2018/0219905 A1 | 8/2018 | Gorodissky et al. | |
| 2018/0219909 A1 | 8/2018 | Gorodissky et al. | |
| 2018/0270268 A1 | 9/2018 | Gorodissky et al. | |
| 2018/0330103 A1 * | 11/2018 | Chari | G06F 21/577 |
| 2018/0365429 A1 | 12/2018 | Segal | |
| 2019/0014141 A1 | 1/2019 | Segal et al. | |
| 2019/0036961 A1 | 1/2019 | Gorodissky et al. | |
| 2019/0068631 A1 | 2/2019 | Ashkenazy et al. | |
| 2019/0081974 A1 | 3/2019 | Lasser | |
| 2019/0149572 A1 | 5/2019 | Gorodissky et al. | |
| 2019/0245883 A1 | 8/2019 | Gorodissky et al. | |
| 2019/0268369 A1 | 8/2019 | Gorodissky et al. | |
| 2019/0312903 A1 | 10/2019 | Zini et al. | |
| 2019/0364070 A1 | 11/2019 | Zini et al. | |
| 2019/0387015 A1 | 12/2019 | Ashkenazy et al. | |

FOREIGN PATENT DOCUMENTS

| | | |
|---|---|---|
| CN | 104009881 A | 8/2014 |
| EP | 1559008 A1 | 8/2005 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016164844 A1 | 10/2016 |
| WO | 2018156394 A1 | 8/2018 |

OTHER PUBLICATIONS

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

* cited by examiner

{[List of paths of attack] — 320
   {[Path 1]
     {Starting state, — 322
     Use method Z,
     Node B compromised,
     Use method Y,
     Password hash codes of management floor obtained,
     Use method X,
     Passwords of management floor obtained,
     Use method W,
     Node C compromised,
     Use method V,
     Node A compromised
     Node A or Node F compromised
   }
   {[Path 2] — 324
     {Starting state,
     Use method U,
     Node D compromised,
     Use method T,
     Passwords of finance floor obtained,
     Use method S,
     Node E compromised,
     Use method R,
     Node F compromised
     Node A or Node F compromised
   }
}

FROM FIG. 13A

ASSIGN AN IMPORTANCE SCORE TO ONE OR MORE SUB GOALS, EACH OF THE ONE OR MORE SUB-GOALS BEING INCLUDED IN AT LEAST ONE PATH OF ATTACK INCLUDED IN GROUP Gr, WHERE THE IMPORTANCE SCORE ASSIGNED TO AT LEAST ONE SPECIFIC SUB-GOAL OF THE ONE OR MORE SUB-GOALS IS BASED ON A NUMBER OF PATHS OF ATTACK IN GROUP Gr WHICH INCLUDE THE SPECIFIC SUB-GOAL S912

SELECT A SPECIFIC SUB-GOAL INCLUDED IN AT LEAST ONE PATH IN GROUP Gr BASED ON THE IMPORTANCE SCORE ASSIGNED TO AT LEAST ONE OF THE ONE OR MORE SUB-GOALS AND ADD THE SELECTED SUB-GOAL TO LIST L S916

MODIFY GROUP Gr S918

920 IS THE HALTING CONDITION SATISFIED?

NO → 922 DOES GROUP Gr INCLUDE AT LEAST ONE PATH?

YES → SELECT ONE OR MORE SUB-GOALS FROM LIST L S924

PROVIDE A RECOMMENDATION TO PROTECT THE ONE OR MORE SUB-GOALS SELECTED FROM LIST L S926

US 10,637,883 B1

SYSTEMS AND METHODS FOR DETERMINING OPTIMAL REMEDIATION RECOMMENDATIONS IN PENETRATION TESTING

RELATED APPLICATIONS

The present application gains priority from U.S. Provisional Patent Application 62/870,742 filed on Jul. 4, 2019, and entitled "Systems and Methods for Determining Optimal Remediation Recommendations in Penetration Testing".

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long, the organization might again end with a too long discovery period after a new threat appears.

In view of the above difficulties, several vendors offer automated penetration testing systems. Such systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (iii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30, reporting function code 40 and optionally cleanup function code 50—for example, in combination with suitable hardware (e.g. one or more computing device(s) 110 and one or more processor(s) 120 thereof, see FIG. 2) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

Penetration testing systems may employ different types of architectures, each having its advantages and disadvantages. Examples are actual attack penetration testing systems, simulated penetration testing systems and reconnaissance agent penetration testing systems. See the Definitions section for more details about these types of penetration testing systems.

The Problem to Solve

As described above, an automated penetration testing system carries out a penetration testing campaign in order to test how well the tested networked system is protected against cyber-attacks. Each penetration testing campaign has an associated "goal of an attacker". The "goal of an attacker" of a campaign indicates what the attacker of the campaign is attempting to achieve by attacking the networked system being tested. In other words, what is the criterion according to which the attack will be considered a success or a failure and/or to what extent was the attack successful. Examples of goals of attackers include: exporting a specific file out of the networked system, shutting down a specific network node of the networked system, encrypting five Excel files in a specific node of the networked system (for example as part of a demand for ransom), and the like.

If the penetration testing campaign succeeds in achieving the goal, an attacker might be able to do the same, and therefore the networked system is vulnerable to attack.

Typically, the method for an attacker to achieve the goal comprises an ordered series of steps the attacker would take in order to achieve the goal. An exemplary method for achieving a goal of controlling network node A (e.g. the CEO's computer), illustrated in FIG. 3A, may include:

1. Using method Z (e.g. using a known weakness in Microsoft Windows's networking mechanism) (step 300), attacking and compromising network node B (e.g. the management floor administrator's computer) (sub-goal 302).

2. Once network node B is under the attacker's control, using method Y (e.g. using a known method of extracting password hash codes files) (step 304) for extracting from network node B a file containing password hash codes of the management floor network nodes (sub-goal 306).

3. Based on the obtained password hash codes of the management floor network nodes and using method X (e.g. using a known method for recovering passwords from their hash codes) (step 308), recovering passwords of the management floor network nodes corresponding to the obtained password hash codes (sub-goal 310). It is assumed the CEO's password is kept separately and is not obtained in this step.

4. Based on the recovered passwords of the management floor network nodes (which include the password of the CEO's personal assistant's computer), and using method W (e.g. logging into a computer using its known password) (step 312), attacking and compromising network node C (e.g. the CEO's personal assistant's computer) (sub-goal 314).

5. Once network node C (e.g. the CEO's personal assistant's computer) is under the attacker's control, using method V (e.g. using a known weakness in Microsoft Windows's shared folder mechanism) (step 316) for attacking and compromising network node A (e.g. the CEO's computer) (goal 318).

As can be seen in FIG. 3A, a way for accomplishing the goal of the attacker, also termed as "a path of attack", includes a sequence of attacker steps, each attacker step moving the attacker from one sub-goal to a subsequent sub-goal.

For example, attacker step 304 moves the attacker from sub-goal 302 of "controlling network node B" to sub-goal 306 of "having the password hash codes of the management floor network nodes", and attacker step 308 moves the attacker from sub-goal 306 of "having the password hash codes of the management floor network nodes" to sub-goal 310 of "having the passwords of the management floor network nodes". The first attacker step 302 moves the attacker from the starting state, which is a dummy sub-goal that is assumed to be satisfied when starting the penetration test, and the last attacker step 316 moves the attacker to sub-goal 318 that is identical to the true goal of the attacker of the penetration testing campaign.

Note that FIG. 3A represents a path of attack of a networked system as a directed graph in which sub-goals and attacker steps are represented by nodes of the graph. FIG. 3B shows an alternative representation of the exemplary method shown in FIG. 3A, in which a path of attack of a networked system is represented as a graph in which sub-goals are represented by nodes of the graph, while attacker steps are represented by directed edges connecting sub-goals. In the graph of FIG. 3B, the steps and sub-goals are given the same reference numerals as in FIG. 3A. Other forms of representing paths of attack of a networked system are also possible.

For example, paths of attack of a networked system may be represented by a list, where each member of the list corresponds to one path of attack of the networked system. Each member of the list, or each such path of attack, is itself represented as a list, including items corresponding to all attacker steps and to all sub-goals included in that path of attack. FIG. 3C illustrates an example of such representation, showing a list 320 including two paths of attack 322 and 324.

The representation methods of FIGS. 3A, 3B, and 3C are equivalent, and any one of them, or any other equivalent representation method, may be used for implementing the methods and systems of the present disclosure. The use of any specific representation method in any figure or any explanation of the present disclosure should not be construed as limiting the scope of the claimed invention to that specific representation method.

Typically, a description of the method for the attacker to achieve the goal, which method was discovered by a penetration test, is displayed to the user of the penetration testing system, and optionally also mailed to other people such as the administrator or CISO of the organization owning the tested networked system.

Most penetration testing systems also provide to the user a recommendation as to how to block the discovered method of attack. In the above example, the recommendation may be to upgrade the Microsoft Windows OS installed on network node B to a later version that does not have the weakness used by step 300. Alternatively, the recommendation may be to have the CEO's personal assistant computer, network node C, use a two-factor authentication method, so that knowledge of the password for network node C is insufficient for logging into this computer, thus blocking step 312. Alternatively, the recommendation may be to disable the folder sharing mechanism that is used in step 316 in the CEO's computer, network node A, and ask the CEO and his/her personal assistant to share files using other mechanisms. In the above example, each step in the discovered method to attack results in a corresponding recommendation for a remediation action that is aimed at blocking that step.

Since methods for attack might be complex and may include dozens of attacker steps, sometimes having multiple alternatives for some of those attacker steps, choosing the best recommendation to provide to the user for blocking the attack might become quite difficult. The prior art discloses many approaches, some of which are:

1. Using cost of exploitation as the determining consideration. The cost of exploitation of an attacker step is a measure of how difficult it is for an attacker to carry out that attacker step. For example, the attacker step known as "ARP Spoofing" is costlier for the attacker than an attacker step that uses a publicly available exploit kit.

The cost of exploitation may be represented by a numeric score within a given range, typically (but not necessarily) with a higher score representing a costlier method. For example, the given range may be [0 . . . 10], with a cost of exploitation of ARP Spoofing being 7, and a cost of exploitation of any attacker step using a publicly available exploit kit being 2.

A penetration testing system using this approach may recommend to the user to invest in blocking the attacker step having the lowest cost of exploitation.

It is noted that in the example presented above, which includes a single and linear path of attack, it does not matter which attacker step of the path of attack is blocked, as blocking any attacker step protects the tested networked system from the discovered method of attack. However, when dealing with more complex cases, the advantage of selecting the attacker step to block based on cost of exploitation becomes clear, as will be evident hereinbelow.

2. Using cost of remediation as the determining consideration. The cost of remediation of an attacker step is a measure of how expensive it is for the organization owning the tested networked system to block that attacker step. For example, an attacker step that can be blocked by simply installing a security patch for a software application (e.g. Microsoft Word) is much less costly to fix than an attacker step that requires buying and installing a new router in order to split an existing sub-network into two different sub-networks.

The cost of remediation may be represented by a numeric score within a given range, typically (but not necessarily) with a higher score representing a costlier method. For example, the given range may be [0 . . . 10], with a cost of remediation requiring only installing a patch being 1, and a cost of remediation requiring a new router being 8.

A penetration testing system using this approach may recommend to the user to invest in blocking the attacker step having the lowest cost of remediation, thus blocking an attacker from achieving its goal while investing the smallest budget.

3. Using probability of success as the determining consideration. The probability of success of an attacker step is a measure of how probable is it that execution of the attacker step by the attacker will succeed in achieving the sub-goal that the attacker step is intended to achieve, taking into account the currently available knowledge regarding the state of the attacked networked system. For example, an attacker step that is based on exploiting a known Windows 7 vulnerability may have high probability of success when applied to a network node having the original version of the OS installed, and may have a low probability of success when applied to a network node in which a certain security patch has been installed.

Typically, probabilities of success are expressed in percentages in the range of 0% to 100%. Alternatively, the probabilities of success may be represented by numeric values in the range of zero to one, where zero corresponds to 0% and one corresponds to 100%. However, any other numerical scale may be used for representing probabilities of success, provided that the scale is a monotonically increasing or monotonically decreasing function of how probable is it that the attacker step will succeed in achieving its sub-goal.

A penetration testing system using this approach may recommend to the user to invest in blocking the attacker step having the highest probability of success.

4. Using a combination of any of the previous considerations. For example, a combination of cost of exploitation and cost of remediation may be used as the determining considerations.

A function of both factors is defined, and the recommendation of which attacker step to block is selected based on values of the function for the various attacker steps of the path of attack.

For example, the value of the function for each attacker step may be defined to be the multiplication of the cost of exploitation of the attacker step by the cost of remediation of the attacker step, and the recommendation may be to block the attacker step having the lowest value of the function.

In another example, the value of the function for each attacker step may be defined as follows—if the cost of exploitation of the attacker step is lower than five, then the value of the function is the cost of remediation multiplied by three, and if the cost of exploitation of the attacker step is equal to or greater than five, then the value of the function is the cost of remediation multiplied by seven. Again, the recommendation may be to block the attacker step having the lowest value of the function.

The example of a method for achieving an attacker's goal of compromising a networked system illustrated in FIGS. 3A and 3B has a relatively simple attacker's goal and a single and relatively simple path of attack for the attacker to achieve his goal. Consequently, deciding which recommendation to provide to the user is also a relatively simple task.

In other cases, the attacker's goal and the options available for the attacker to achieve that goal may be more complex, and consequently the selection of a suitable recommendation to provide to the user is also more complex. For example, the attacker's goal may be to control either one of the CEO's computer and the CFO's computer. In this case, the method to achieve the goal contains two separate "branches" (i.e. paths of attack), merging in the final sub-goal (see FIG. 4, which is equivalent to FIG. 3C, but is presented as a graph rather than as a list).

One branch of the graph of FIG. 4 is identical to the graph illustrated in FIG. 3A, and steps and sub-goals thereof are indicated by the same reference numerals, while the second branch includes the following steps and sub-goals:

1. Using method U (e.g. using a known weakness in Microsoft Windows's RPC mechanism) (step 400), attacking and compromising network node D (e.g. the finance floor administrator's computer) (sub-goal 402).
2. Once network node D is under the attacker's control, using method T (e.g. using a known method of extracting password files) (step 404) for extracting from network node D a file containing passwords of the finance floor network nodes (sub-goal 406). It is assumed the CFO's password is kept separately and is not obtained in this step.
3. Based on the obtained passwords of the finance floor network nodes (which include the password of the CFO's personal assistant's computer), and using method S (e.g. logging into a computer using its known password) (step 408), attacking and compromising network node E (e.g. the CFO's personal assistant's computer) (sub-goal 410).
4. Once network node E (the CFO's personal assistant's computer) is under the attacker's control, using method R (e.g. using a known weakness in Microsoft Windows's file sharing mechanism) (step 412) for attacking and compromising network node F (e.g. the CFO's computer) (sub-goal 414).

It is clear that in this case it is not possible to block all possibilities of attack by blocking a single attacker step. Each of the two branches has to be separately blocked, requiring blocking of at least one attacker step in each branch.

A possible algorithm for selecting recommendations of steps to be blocked in this case may operate as follows:

A. Determine the best attacker step to block in a first branch of the two, assuming the other branch does not exist.
B. Determine the best attacker step to block in the other branch, assuming the first branch does not exist.
C. Recommend blocking both of the steps determined in A and B.

Blocking one attacker step in each of the two branches guarantees that both branches become unusable (or at least less usable) for the attacker. The step recommended for blocking the first branch and the step recommended for blocking the second branch may be determined using any method known in the art—based on cost of exploitation, based on cost of remediation, based on both cost of exploitation and cost of remediation, etc. It should be noted that the determination for each of the branches is completely independent of the determination for the other branch. Moreover, the method of determination may be different for the two branches—for example, in one branch the determination may be based on cost of remediation, while in the other branch the determination may be based on a combination of cost of remediation and probability of success.

Blocking one attacker step in each path of attack is useful when the owner of the tested networked system blocks as many attacker steps as are required for completely blocking all possibilities for the attackers to compromise the networked system. However, this is not always the case in the real world. Remediation actions recommended for blocking all possibilities of attack might be highly expensive and their combined costs might exceed the budget available for protecting the networked system. For example, blocking a certain attacker step may require installing a certain defensive application on each node of the networked system. Even for an inexpensive application costing just $10 per node, in a large network of 10,000 network nodes this translates to a direct cost of $100,000, prior to training of users and other indirect costs.

Therefore, some penetration testing systems provide their recommendations as a list, ordered by priority. This way the available funds can be allocated to implementing the recommendations at the top of the list, which are the most urgent and/or important to fix. Even though such partial implementation of the recommendations list might not provide a fool-proof solution, leaving some unblocked attack paths available to potential attackers, it nevertheless makes the best use of the available funds and improves the security posture of the networked system to the maximal possible under the existing budget constraints.

Algorithms for selecting the highest priority recommendation may operate in the following high-level way:
1. Determine the list of "branches" (i.e. paths of attack) available for a potential attacker to achieve his goal.
2. If there is only one branch, define it to be the "critical branch".
3. Otherwise, if there are multiple branches, evaluate each of the branches according to some criteria and generate a numerical score for each branch. Based on generated numerical scores for all the branches, define one of the branches to be the "critical branch".
4. Determine, based on some criteria, one of the attacker steps of the critical branch to be the best recommendation.

The following is an example of such an algorithm:
1. Determine the list of "branches" (i.e. paths of attack) available for a potential attacker to achieve his goal.
2. If there is only one branch, define it to be the "critical branch".
3. Otherwise, if there are multiple branches:
   a. For each branch, calculate a "cost of exploitation" score. The cost of exploitation score of a branch is the sum of the costs of exploitation of all the attacker steps included in the branch.
   b. The branch having the lowest cost of exploitation score of all branches is defined to be the "critical branch".
4. Determine which attacker step of the critical branch has the lowest cost of remediation.

This step is recommended as the highest priority attacker step to be blocked.

FIG. 5 demonstrates how the exemplary algorithm described above may be applied to the method of attack illustrated in FIG. 4. In FIG. 5, the cost of exploitation and cost of remediation of each attacker step are provided. The format used in FIG. 5 for showing the costs is "X/Y", where "X" is the cost of exploitation according to some exploitation cost scale and "Y" is the cost of remediation according to some remediation cost scale.

As there are two branches in FIG. 5 identified in step 1 of the algorithm, the implementation of the algorithm skips to step 3, where the critical branch must be identified. The cost of exploitation for the left-side branch is 2+4+7+1+6=20. The cost of exploitation for the right-side branch is 6+7+1+8=22. The branch having the lowest cost of exploitation is the left-side branch, and in accordance with step 3b of the algorithm the left-side branch is determined to be the critical branch. Within the left-side branch, the attacker step having the lowest cost of remediation is step 300 of applying method Z. Therefore, the algorithm decides that the highest priority attacker step to be blocked is step 300, as the method determined it to be the most cost-effective investment. It should be noted that even after blocking that attacker step, the networked system is still not fully protected—an attacker might still use the route of the right-side branch to compromise it, but his cost of exploitation would be somewhat higher after the remediation of blocking attacker step 300.

FIG. 6 provides another example of use of the exemplary algorithm. The paths of attack of FIG. 6 are nearly identical to those of FIG. 5, with the only difference being that in FIG. 6 step 408 (the third step of the right-side branch) "Use method S" is replaced with another copy of step 312, "Use method W", where methods S and W of steps 408 and 312 have the same costs of exploitation and remediation. Note that in FIG. 6, step 312 of "Use method W" appears in both branches. The example of FIG. 6 may correspond to a case in which the CEO and the CFO share a common personal assistant. Applying the above algorithm to FIG. 6 results in the same recommendation provided in FIG. 5—the highest priority attacker step to be blocked is again step 300, the first step in the left-side branch, leaving an attacker the option to attack using the right-side branch.

However, a careful review of FIG. 6 indicates that blocking of attacker step 300 is clearly not the most cost-effective move. By blocking attacker step 312, "Use method W", both branches can be blocked by a single remediation action. The cost of that single remediation action may be higher than the cost of blocking step 300 (in this example, 4 vs. 3), but the benefit gained from this slight additional cost is significant—instead of just somewhat increasing the cost of exploitation for the attacker while leaving paths of attack available to the attacker, blocking step 312 would completely block the attacker's ability to obtain his goal in compromising the networked system.

The flaw of the previous method, which causes it to recommend a non-optimal solution, is that it focuses on the "branches of attack" (i.e. on complete paths of attack) as fundamental and independent building blocks, ignoring connections or relations existing between different branches at a lower level.

There was thus a need in the art to have a method for prioritizing remediation recommendations so as to provide cost-effective recommendations even when there are dependencies between different paths of attack.

U.S. Pat. No. 10,382,473 addresses the above need and discloses methods that focus on single attacker steps (instead of complete branches of attack), examining how blocking each single attacker step affects the vulnerability of the tested networked system. For each attacker step included in at least one path of attack determined to exist in the tested networked system, the methods of the '063 application compute a corresponding vulnerability grade. The vulnerability grade of a given attacker step is determined according to a vulnerability score computed for the tested networked system when assuming that the given attacker step is being blocked. The remediation recommendations are then selected to be the blocking of the attacker step(s) associated with the highest vulnerability to the tested networked system.

While the methods disclosed in the '063 application provide more optimal recommendation than prior methods, they are relatively complex and computation-intensive.

There is thus a need in the art to have a method for prioritizing remediation recommendations so as to provide cost-effective recommendations even when there are dependencies between different paths of attack, while using relatively simple methods to identify the remediation recommendations.

SUMMARY OF THE INVENTION

Some embodiments of the invention relate to methods and systems for carrying out automated penetration testing, and to providing to the user recommendations for the highest priority sub-goals to protect in order to improve the security of the tested networked system against attackers.

According to an embodiment of a first aspect of the invention, there is provided a method for providing, by a penetration testing system, a recommendation for improving the security of a networked system against attackers, the method including:

a. carrying out one or more tests of the networked system by the penetration testing system;
b. based on results of the one or more tests of the networked system, determining multiple paths of attack available to the attackers, each path of attack of the determined multiple paths of attack being an ordered sequence of one or more attacker steps and one or more sub-goals;
c. assigning a calculated importance score to each of multiple sub-goals, wherein (i) each sub-goal of the multiple sub-goals is included in at least one of the determined multiple paths of attack, and (ii) for at least one given sub-goal of the multiple sub-goals, the importance score assigned to the given sub-goal is based on a number of paths of attack of the determined multiple paths of attack which include the given sub-goal;
d. selecting one sub-goal included in at least one of the determined multiple paths of attack, the selecting of the one sub-goal being based on the importance score assigned to at least one of the multiple sub-goals; and
e. providing a recommendation to protect the selected one sub-goal, the providing of the recommendation including at least one operation selected from the group consisting of:
  i. causing a display device to display information about the recommendation;
  ii. recording the information about the recommendation in a file; and
  iii. electronically transmitting the information about the recommendation.

In some embodiments, for each given sub-goal of the multiple sub-goals, the importance score assigned to the given sub-goal is based on the number of paths of attack of the determined multiple paths of attack which include the given sub-goal.

In some embodiments, for at least one given sub-goal of the multiple sub-goals, the importance score assigned to the given sub-goal is based only on the number of paths of attack of the determined multiple paths of attack which include the given sub-goal.

In some embodiments, for each given sub-goal of the multiple sub-goals, the importance score assigned to the given sub-goal is based only on the number of paths of attack of the determined multiple paths of attack which include the given sub-goal.

In some embodiments, for at least one given sub-goal of the multiple sub-goals, the importance score assigned to the given sub-goal is equal to the number of paths of attack of the determined multiple paths of attack which include the given sub-goal.

In some embodiments, the selecting of the one sub-goal included in at least one of the determined multiple paths of attack includes selecting one sub-goal whose assigned importance score meets a predefined criterion.

In some embodiments, the method further includes representing the determined multiple paths of attack by a graph, where each given path of attack of the determined multiple paths of attack corresponds to a path in the graph.

In some such embodiments, the representing includes, for each given path in the graph corresponding to a specific path of attack of the determined multiple paths of attack, representing all sub-goals and all attacker steps included in the specific path of attack as graph nodes included in the given path in the graph.

In some other such embodiments, the representing includes, for each given path in the graph corresponding to a specific path of attack of the determined multiple paths of attack, representing all sub-goals included in the specific path of attack as graph nodes included in the given path in the graph and representing all attacker steps included in the specific path of attack as graph edges included in the given path in the graph.

In some embodiments, the method further includes representing the determined multiple paths of attack by a list, where each given path of attack of the determined multiple paths of attack corresponds to an item in the list that includes all sub-goals and all attacker steps included in the given path of attack.

In some embodiments, each given path of attack of the determined multiple paths of attack starts at a starting sub-goal that is assumed to be achievable by the attackers and ends at a final sub-goal which is assumed to be a goal of the attackers in at least one test of the one or more tests.

In some embodiments, for each given path of attack of the determined multiple paths of attack: (A) each attacker step included in the given path of attack is preceded by a sub-goal and followed by a sub-goal in the given path of attack, (B) each sub-goal included in the given path of attack, except for a starting sub-goal of the given path of attack, is preceded by an attacker step in the given path of attack, and (C) each sub-goal included in the given path of attack, except for a final sub-goal of the given path of attack, is followed by an attacker step in the given path of attack.

In some embodiments, for at least one given sub-goal of the multiple sub-goals, the importance score assigned to the given sub-goal is based on (i) the number of paths of attack of the determined multiple paths of attack which include the given sub-goal, and (ii) at least one member selected from the group consisting of: a cost of remediation of the given sub-goal, a cost of exploitation of an attacker step leading to the given sub-goal, a cost of remediation of an attacker step leading to the given sub-goal, and a probability of success of an attacker step leading to the given sub-goal.

In some embodiments, the importance scores assigned to the multiple sub-goals are such that a higher numerical value of an importance score of a specific sub-goal is indicative of a higher degree of importance associated with the specific sub-goal.

In some other embodiments, the importance scores assigned to the multiple sub-goals are such that a lower numerical value of an importance score of a specific sub-goal is indicative of a higher degree of importance associated with the specific sub-goal.

In some embodiments, the selecting of the one sub-goal includes selecting, as the one sub-goal, a sub-goal whose assigned importance score has the highest numerical value of all importance scores assigned to sub-goals included in at least one of the determined multiple paths of attack.

In some embodiments, the selecting of the one sub-goal includes selecting, as the one sub-goal, a sub-goal whose assigned importance score has the lowest numerical value of all importance scores assigned to sub-goals included in at least one of the determined multiple paths of attack.

In some embodiments, the selecting of the one sub-goal includes: in response to at least two sub-goals of the multiple sub-goals having assigned a common importance score, which common importance score is an importance score indicative of the highest degree of importance of all the importance scores assigned to the multiple sub-goals, using a tie-breaking rule to select one of the at least two sub-goals having assigned the common importance score as the one sub-goal.

In some such embodiments, the tie-breaking rule depends on at least one member selected from the group consisting of: a cost of remediation of one of the at least two sub-goals having assigned the common importance score, a cost of exploitation of an attacker step leading to one of the at least two sub-goals having assigned the common importance score, a cost of remediation of an attacker step leading to one of the at least two sub-goals having assigned the common importance score, and a probability of success of an attacker step leading to one of the at least two sub-goals having assigned the common importance score.

In some other such embodiments, the using of the tie-breaking rule includes randomly selecting one of the at least two sub-goals having assigned the common importance score.

According to an embodiment of the first aspect of the invention, there is provided a system for providing a recommendation for improving the security of a networked system against attackers, the system including:

a. a penetration-testing-campaign module including:
  i. one or more penetration-testing-campaign processors; and
  ii. a penetration-testing-campaign non-transitory computer readable storage medium for instructions execution by the one or more penetration-testing-campaign processors, the penetration-testing-campaign non-transitory computer readable storage medium having stored instructions to carry out one or more penetration tests of the networked system;
b. a sub-goal-selection module including:
  i. one or more sub-goal-selection processors; and
  ii. a sub-goal-selection non-transitory computer readable storage medium for instructions execution by the one or more sub-goal-selection processors, the sub-goal-selection non-transitory computer readable storage medium having stored:
    1) instructions to receive, from the penetration-testing-campaign module, results of the one or more penetration tests of the networked system;
    2) instructions to determine, based on the received results, multiple paths of attack available to the attackers, each path of attack of the determined multiple paths of attack being an ordered sequence of one or more attacker steps and one or more sub-goals;
    3) instructions to assign a calculated importance score to each of multiple sub-goals, wherein (i) each sub-goal of the multiple sub-goals is included in at least one of the determined multiple paths of attack, and (ii) for at least one given sub-goal of the multiple sub-goals, the importance score assigned to the given sub-goal is based on a number of paths of attack of the determined multiple paths of attack which include the given sub-goal; and
    4) instructions to select one sub-goal included in at least one of the determined multiple paths of attack, the selecting of the one sub-goal being based on the importance score assigned to at least one of the multiple sub-goals; and
c. a reporting module including:
  i. one or more reporting processors; and
  ii. a reporting non-transitory computer readable storage medium for instructions execution by the one or more reporting processors, the reporting non-transitory computer readable storage medium having stored:
    1) instructions to receive, from the sub-goal-selection module, an identification of the selected one sub-goal; and
    2) instructions to provide a recommendation to protect the selected one sub-goal, the instructions to provide the recommendation including at least one member selected from the group consisting of:
      I. instructions to cause a display device to display information about the recommendation;
      II. instructions to record the information about the recommendation in a file; and
      III. instructions to electronically transmit the information about the recommendation.

According to an embodiment of a second aspect of the invention, there is provided a method for providing, by a penetration testing system, a recommendation for improving the security of a networked system against attackers, the method including:

a. initializing a list of sub-goals that should be protected to be an empty list;
b. obtaining a halting condition, the halting condition including a Boolean condition applied to the list of sub-goals;
c. carrying out one or more tests of the networked system by the penetration testing system;
d. based on results of the one or more tests of the networked system, determining multiple paths of attack available to the attackers, each path of attack of the determined multiple paths of attack being an ordered sequence of one or more attacker steps and one or more sub-goals;
e. initializing a group of relevant paths of attack to consist of the determined multiple paths of attack;
f. assigning a calculated importance score to each of one or more sub-goals, wherein (i) each sub-goal of the one or more sub-goals is included in at least one path of attack included in the group of relevant paths of attack, and (ii) for at least one given sub-goal of the one or more sub-goals, the importance score assigned to the given sub-goal is based on a number of paths of attack in the group of relevant paths of attack which include the given sub-goal;
g. selecting one sub-goal included in at least one member of the group of relevant paths of attack and adding the one sub-goal to the list of sub-goals, the selecting of the one sub-goal being based on the importance scores assigned to at least one of the one or more sub-goals;
h. modifying the group of relevant paths of attack by removing from it every path of attack that includes the one sub-goal;
i. evaluating the halting condition for the list of sub-goals;

j. in response to determining that (i) the halting condition is not satisfied, and (ii) the group of relevant paths of attack is not empty, repeating steps f to j; and
k. in response to determining that (i) the halting condition is satisfied, or (ii) the group of relevant paths of attack is empty, providing a recommendation to protect one or more sub-goals from the list of sub-goals, the providing of the recommendation including at least one operation selected from the group consisting of:
  i. causing a display device to display information about the recommendation;
  ii. recording the information about the recommendation in a file; and
  iii. electronically transmitting the information about the recommendation.

In some embodiments, for each given sub-goal of the one or more sub-goals, the importance score assigned to the given sub-goal is based on the number of paths of attack in the group of relevant paths of attack which include the given sub-goal.

In some embodiments, for at least one given sub-goal of the one or more sub-goals, the importance score assigned to the given sub-goal is based only on the number of paths of attack in the group of relevant paths of attack which include the given sub-goal.

In some embodiments, for each given sub-goal of the one or more sub-goals, the importance score assigned to the given sub-goal is based only on the number of paths of attack in the group of relevant paths of attack which include the given sub-goal.

In some embodiments, for at least one given sub-goal of the one or more sub-goals, the importance score assigned to the given sub-goal is equal to the number of paths of attack in the group of relevant paths of attack which include the given sub-goal.

In some embodiments, the selecting of the one sub-goal included in at least one member of the group of relevant paths of attack includes selecting one sub-goal whose assigned importance score meets a predefined criterion.

In some embodiments, the method further includes representing the determined multiple paths of attack by a graph, where each given path of attack of the determined multiple paths of attack corresponds to a path in the graph.

In some such embodiments, the representing includes, for each given path in the graph corresponding to a specific path of attack of the determined multiple paths of attack, representing all sub-goals and all attacker steps included in the specific path of attack as graph nodes included in the given path in the graph.

In some other such embodiments, the representing includes, for each given path in the graph corresponding to a specific path of attack of the determined multiple paths of attack, representing all sub-goals included in the specific path of attack as graph nodes included in the given path in the graph and representing all attacker steps included in the specific path of attack as graph edges included in the given path in the graph.

In some embodiments, the method further includes representing the determined multiple paths of attack by a list, where each given path of attack of the determined multiple paths of attack corresponds to an item in the list that includes all sub-goals and all attacker steps included in the given path of attack.

In some embodiments, each given path of attack of the determined multiple paths of attack starts with a starting sub-goal that is assumed to be achievable by the attackers and ends with a final sub-goal which is assumed to be a goal of the attackers in at least one test of the one or more tests.

In some embodiments, for each given path of attack of the determined multiple paths of attack: (A) each attacker step included in the given path of attack is preceded by a sub-goal and followed by a sub-goal in the given path of attack, (B) each sub-goal included in the given path of attack, except for a starting sub-goal of the given path of attack, is preceded by an attacker step in the given path of attack, and (C) each sub-goal included in the given path of attack, except for a final sub-goal of the given path of attack, is followed by an attacker step in the given path of attack.

In some embodiments, for at least one given sub-goal of the one or more sub-goals, the importance score assigned to the given sub-goal is based on (i) the number of paths of attack in the group of relevant paths of attack which include the given sub-goal, and (ii) at least one member selected from the group consisting of: a cost of remediation of the given sub-goal, a cost of exploitation of an attacker step leading to the given sub-goal, a cost of remediation of an attacker step leading to the given sub-goal, and a probability of success of an attacker step leading to the given sub-goal.

In some embodiments, the importance scores assigned to the one or more sub-goals are such that a higher numerical value of an importance score of a specific sub-goal is indicative of a higher degree of importance associated with the specific sub-goal.

In some other embodiments, the importance scores assigned to the one or more sub-goals are such that a lower numerical value of an importance score of a specific sub-goal is indicative of a higher degree of importance associated with the specific sub-goal.

In some embodiments, the selecting of the one sub-goal includes selecting, as the one sub-goal, a sub-goal whose assigned importance score has the highest numerical value of all sub-goals included in at least one path of attack in the group of relevant paths of attack.

In some embodiments, the selecting of the one sub-goal includes selecting, as the one sub-goal, a sub-goal whose assigned importance score has the lowest numerical value of all sub-goals included in at least one path of attack in the group of relevant paths of attack.

In some embodiments, the selecting of the one sub-goal includes: in response to at least two sub-goals of the one or more sub-goals having assigned a common importance score, which common importance score is an importance score indicative of the highest degree of importance of all the importance scores assigned to all sub-goals included in at least one path of attack in the group of relevant paths of attack, using a tie-breaking rule to select one of the at least two sub-goals having assigned the common importance score as the one sub-goal.

In some such embodiments, the tie-breaking rule depends on at least one member selected from the group consisting of: a cost of remediation of one of the multiple sub-goals having assigned the common importance score, a cost of exploitation of an attacker step leading to one of the at least two sub-goals having assigned the common importance score, a cost of remediation of an attacker step leading to one of the at least two sub-goals having assigned the common importance score, and a probability of success of an attacker step leading to one of the at least two sub-goals having assigned the common importance score.

In some other such embodiments, the using of the tie-breaking rule includes randomly selecting one of the multiple sub-goals having assigned the common importance score.

In some embodiments, (i) the list of sub-goals is an ordered list of sub-goals, (ii) the adding of the one sub-goal to the list of sub-goals includes adding the one sub-goal at an end of the ordered list of sub-goals such that the one sub-goal becomes a last member of the ordered list of sub-goals, and (iii) the providing a recommendation to protect one or more sub-goals from the list of sub-goals includes providing a recommendation to protect the one or more sub-goals from the list of sub-goals according to an order of the one or more sub-goals in the ordered list of sub-goals.

In some embodiments, the halting condition is true if and only if the list of sub-goals consists of one sub-goal.

In some embodiments, the halting condition is true if and only if the list of sub-goals consists of a pre-determined number of sub-goals.

In some embodiments, the halting condition is true if and only if a sum of remediation costs of all members of the list of sub-goals satisfies a second Boolean condition.

In some embodiments, the second Boolean condition is true if and only if the sum of remediation costs of all members of the list of sub-goals is higher than a pre-determined threshold.

In some embodiments, the second Boolean condition is true if and only if the sum of remediation costs of all members of the list of sub-goals is higher than or equal to a pre-determined threshold.

In some embodiments, the second Boolean condition is true if and only if the sum of remediation costs of all members of the list of sub-goals is lower than a pre-determined threshold.

In some embodiments, the second Boolean condition is true if and only if the sum of remediation costs of all members of the list of sub-goals is lower than or equal to a pre-determined threshold.

According to an embodiment of the second aspect of the invention, there is provided a system for providing a recommendation for improving the security of a networked system against attackers, the system including:

a. a penetration-testing-campaign module including:
  i. one or more penetration-testing-campaign processors; and
  ii. a penetration-testing-campaign non-transitory computer readable storage medium for instructions execution by the one or more penetration-testing-campaign processors, the penetration-testing-campaign non-transitory computer readable storage medium having stored instructions to carry out one or more penetration tests of the networked system;
b. a sub-goals-selection module including:
  i. one or more sub-goals-selection processors; and
  ii. a sub-goals-selection non-transitory computer readable storage medium for instructions execution by the one or more sub-goals-selection processors, the sub-goals-selection non-transitory computer readable storage medium having stored:
    1) first instructions to initialize a list of sub-goals that should be protected to be an empty list;
    2) second instructions to obtain a halting condition, the halting condition including a Boolean condition applied to the list of sub-goals;
    3) third instructions to receive, from the penetration-testing-campaign module, results of the one or more penetration tests of the networked system;
    4) fourth instructions to determine, based on the received results of the one or more tests of the networked system, multiple paths of attack available to the attackers, each path of attack of the determined multiple paths of attack being an ordered sequence of one or more attacker steps and one or more sub-goals;
    5) fifth instructions to initialize a group of relevant paths of attack to consist of the determined multiple paths of attack;
    6) sixth instructions to assign a calculated importance score to each of one or more sub-goals, wherein (i) each sub-goal of the one or more sub-goals is included in at least one path of attack included in the group of relevant paths of attack, and (ii) for at least one given sub-goal of the one or more sub-goals, the importance score assigned to the given sub-goal is based on a number of paths of attack in the group of relevant paths of attack which include the given sub-goal;
    7) seventh instructions to select one sub-goal included in at least one member of the group of relevant paths of attack and to add the one sub-goal to the list of sub-goals, the selecting of the one sub-goal being based on the importance scores assigned to at least one of the one or more sub-goals;
    8) eighth instructions to modify the group of relevant paths of attack by removing from it every path of attack that includes the one sub-goal;
    9) ninth instructions to evaluate the halting condition for the list of sub-goals;
    10) tenth instructions, to be carried out in response to determining that (i) the halting condition is not satisfied, and (ii) the group of relevant paths of attack is not empty, to repeat the sixth instructions to the tenth instructions; and
    11) eleventh instructions, to be carried out in response to determining that (i) the halting condition is satisfied, or (ii) the group of relevant paths of attack is empty, to select one or more sub-goals from the list of sub-goals; and
c. a reporting module including:
  i. one or more reporting processors; and
  ii. a reporting non-transitory computer readable storage medium for instructions execution by the one or more reporting processors, the reporting non-transitory computer readable storage medium having stored:
    1) instructions to receive, from the sub-goals-selection module, an identification of the one or more selected sub-goals; and
    2) instructions to provide a recommendation to protect the one or more selected sub-goals, the instructions to provide the recommendation including at least one member selected from the group consisting of:
      I. instructions to cause a display device to display information about the recommendation;
      II. instructions to record the information about the recommendation in a file; and
      III. instructions to electronically transmit the information about the recommendation.

All technical and scientific terms used herein have the same meaning as commonly understood by one of ordinary skill in the art to which the invention pertains, unless explicitly defined in this application. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

In the summary and in the description that follows, the terms "importance score" and "importance measure" are used interchangeably, and have the same meaning.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 3C is a list representation of an example of a method for an attacker to achieve a goal of an attack, the example having multiple branches of attack;

FIGS. 13A and 13B, together, are a flow chart of a method for providing a recommendation for improving the security of a network system against attackers according to an embodiment of the second aspect of the invention.

DESCRIPTION OF SOME EMBODIMENTS OF THE INVENTION

Figure 1A:
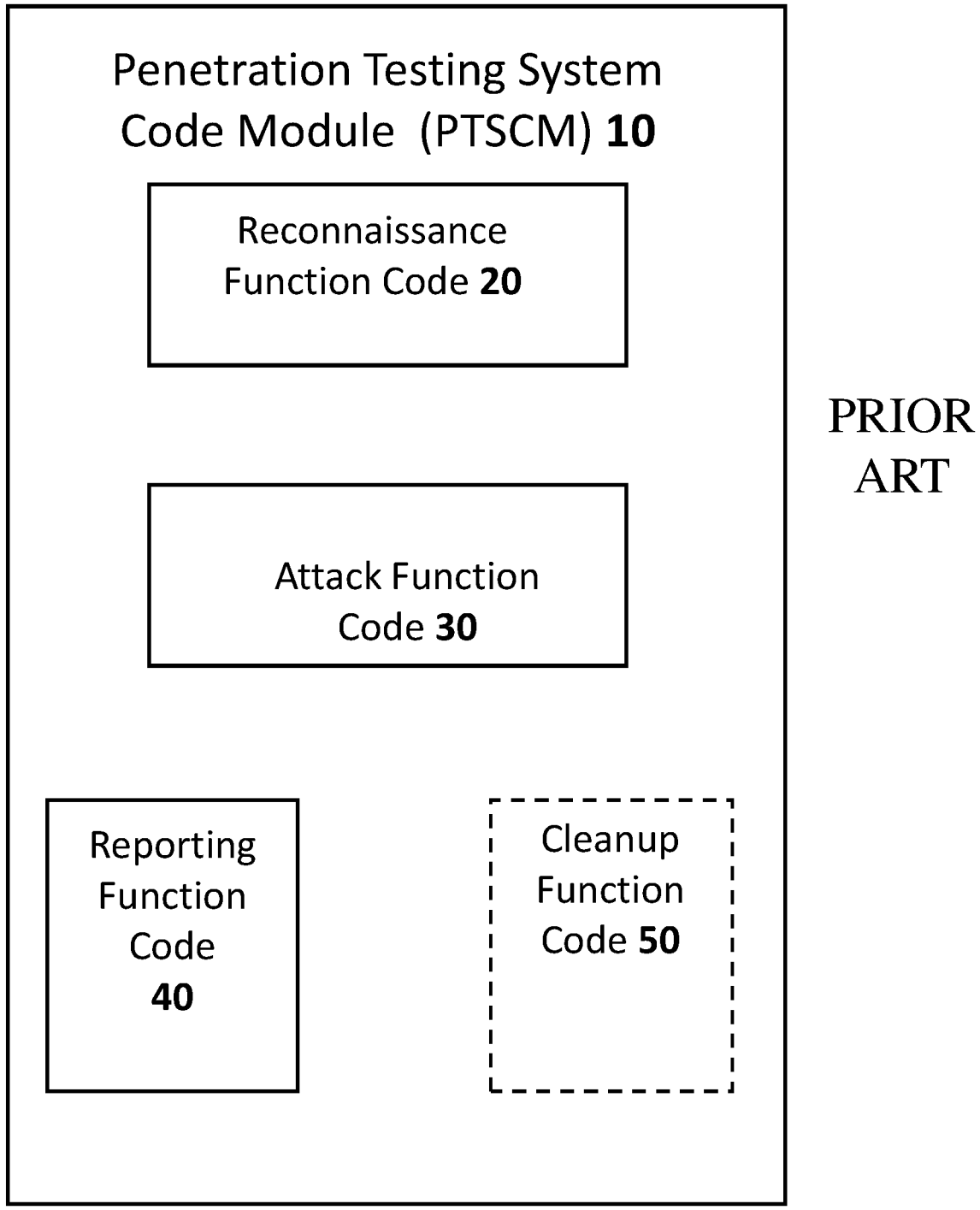
FIG. 1A (PRIOR ART) is a block diagram of code modules of a typical penetration testing system.
Figure 1B:
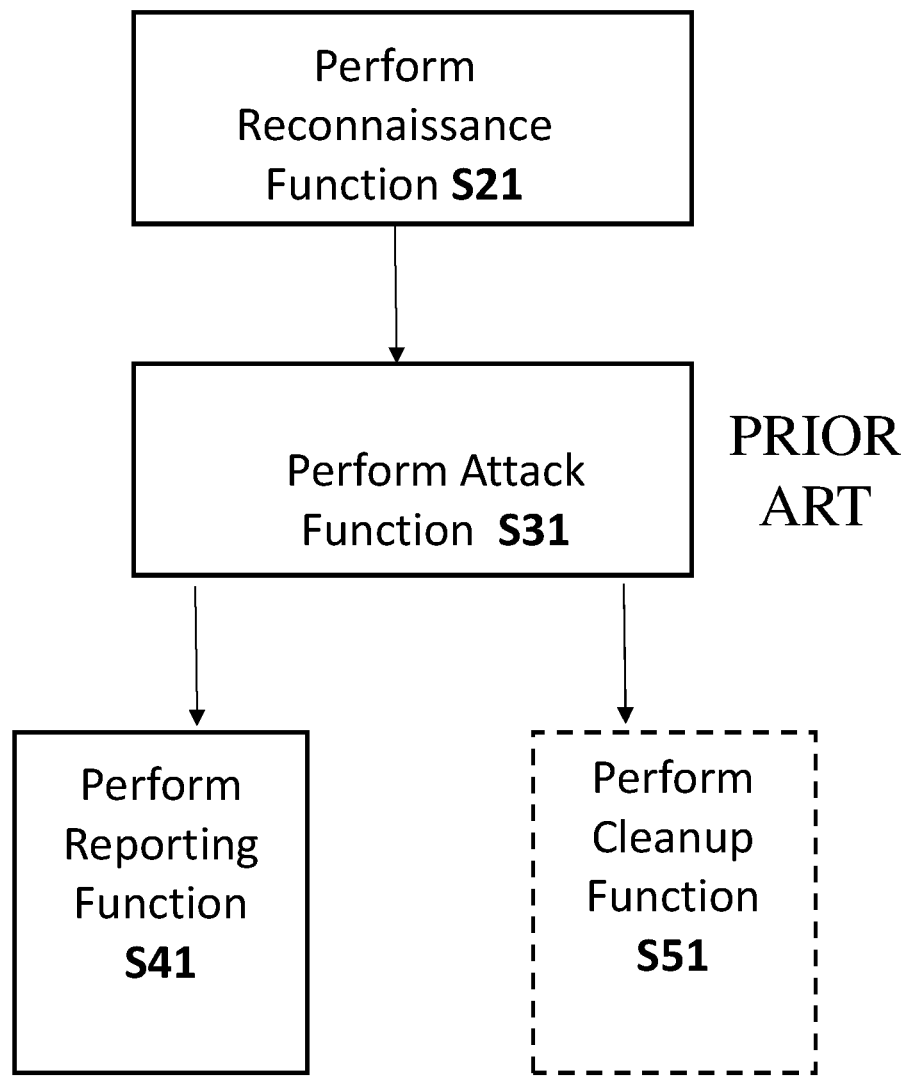
FIG. 1B (PRIOR ART) is a flow-chart related to the system of FIG. 1A.
Figure 2:
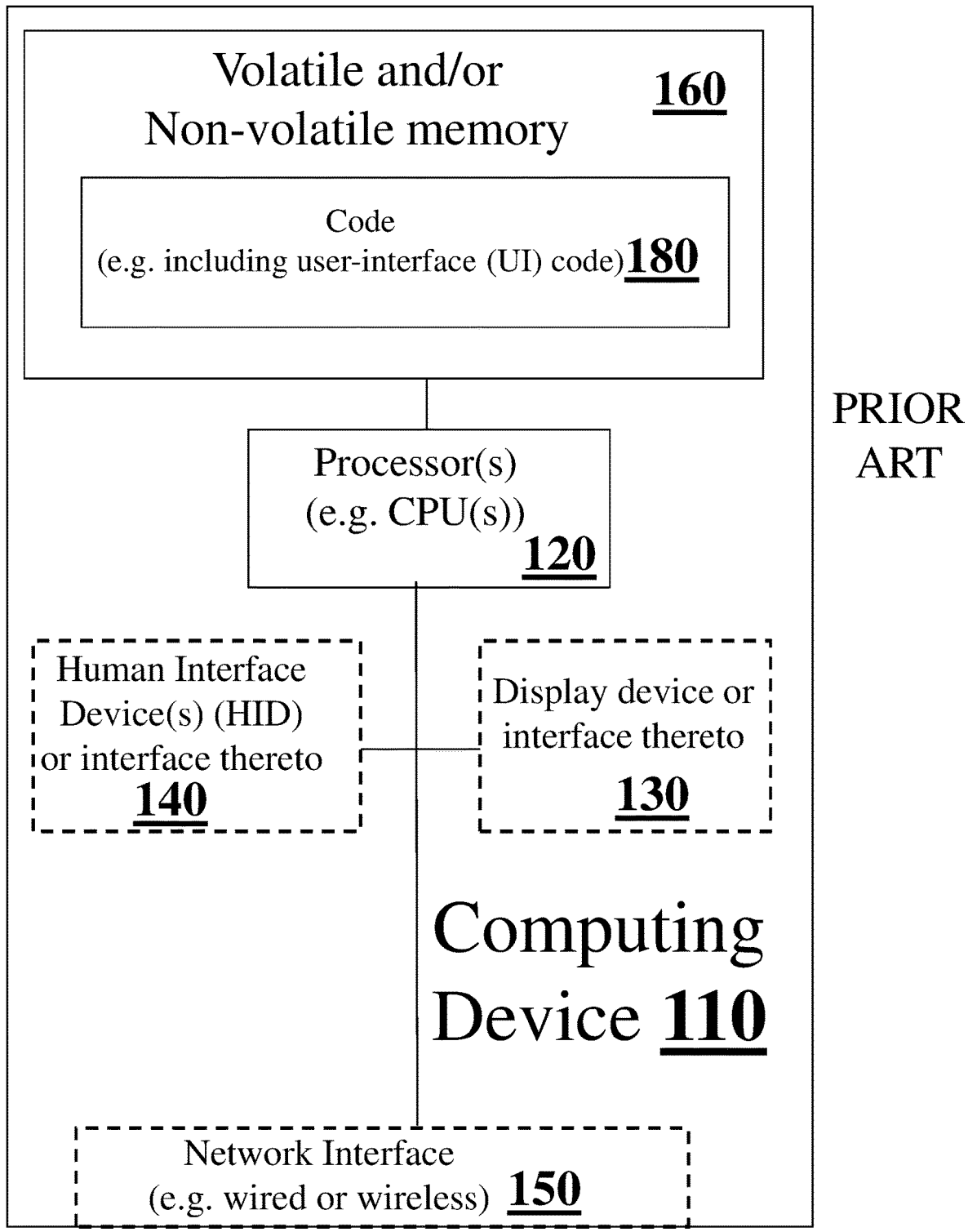
FIG. 2 (PRIOR ART) illustrates a prior art computing device.
Figure 3A:
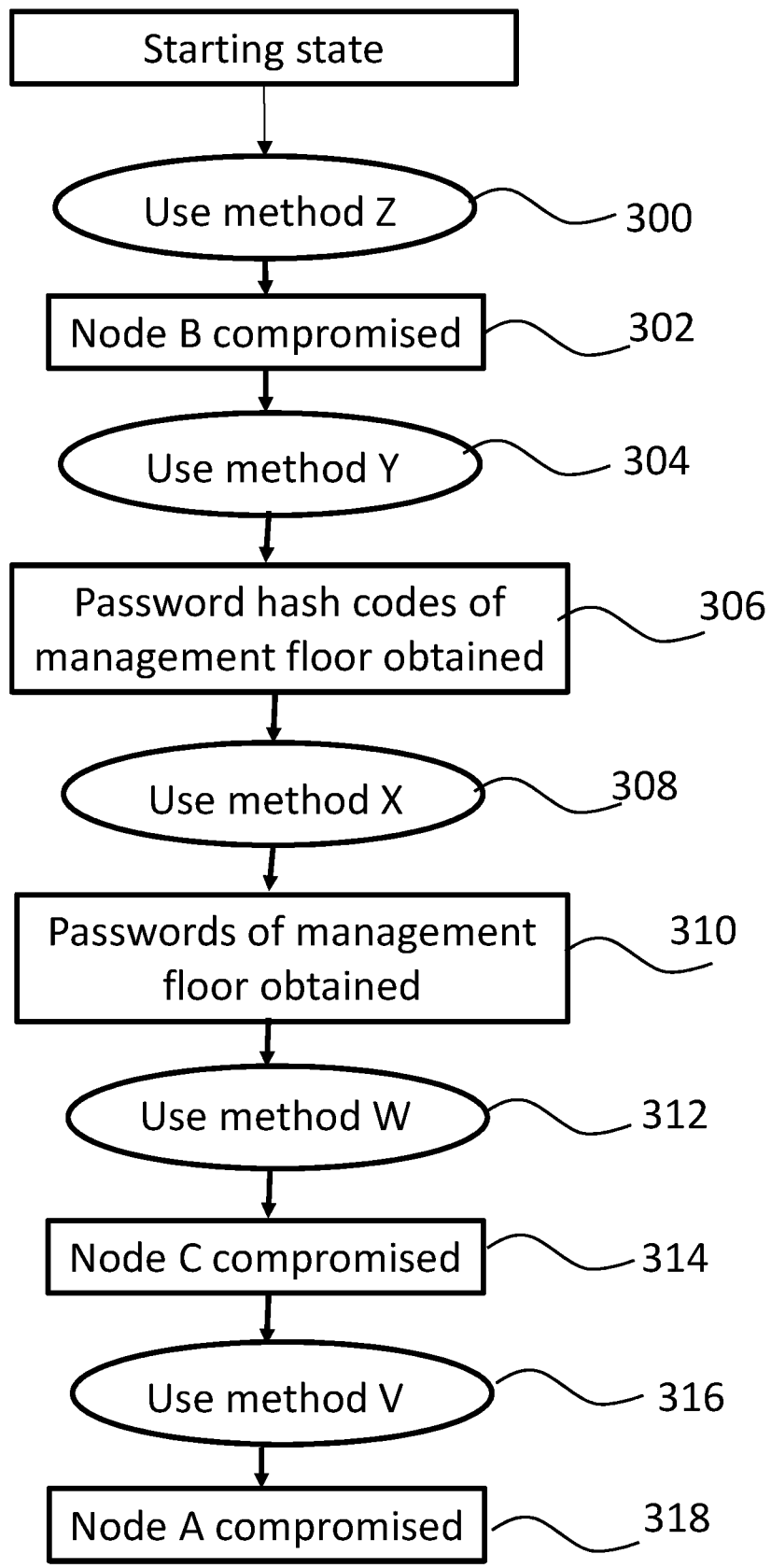
FIGS. 3A and 3B are different graph representations of an example of a method for an attacker to achieve a goal of an attack, the example having a single branch of attack.
Figure 3B:
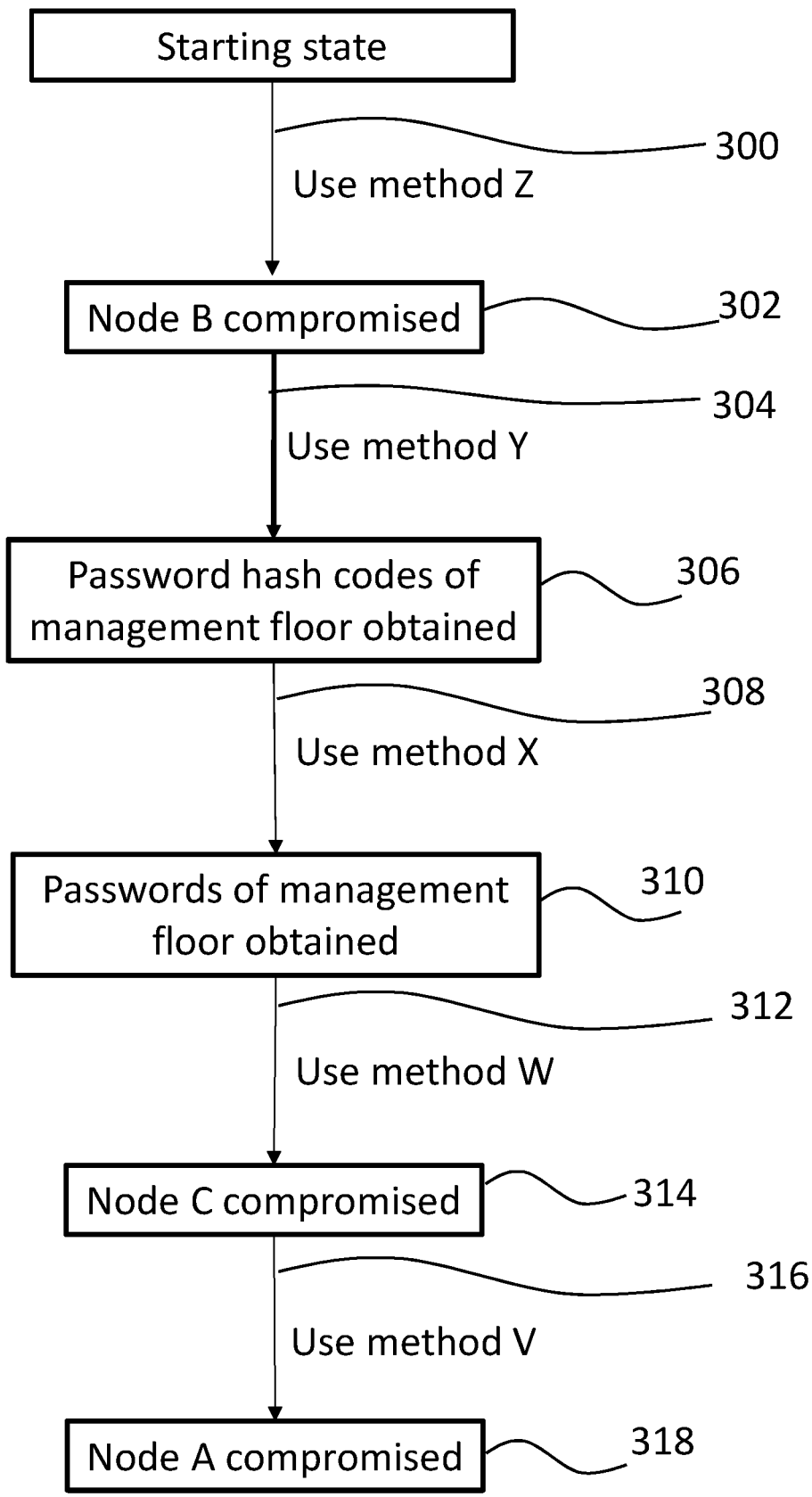
Figure 4:
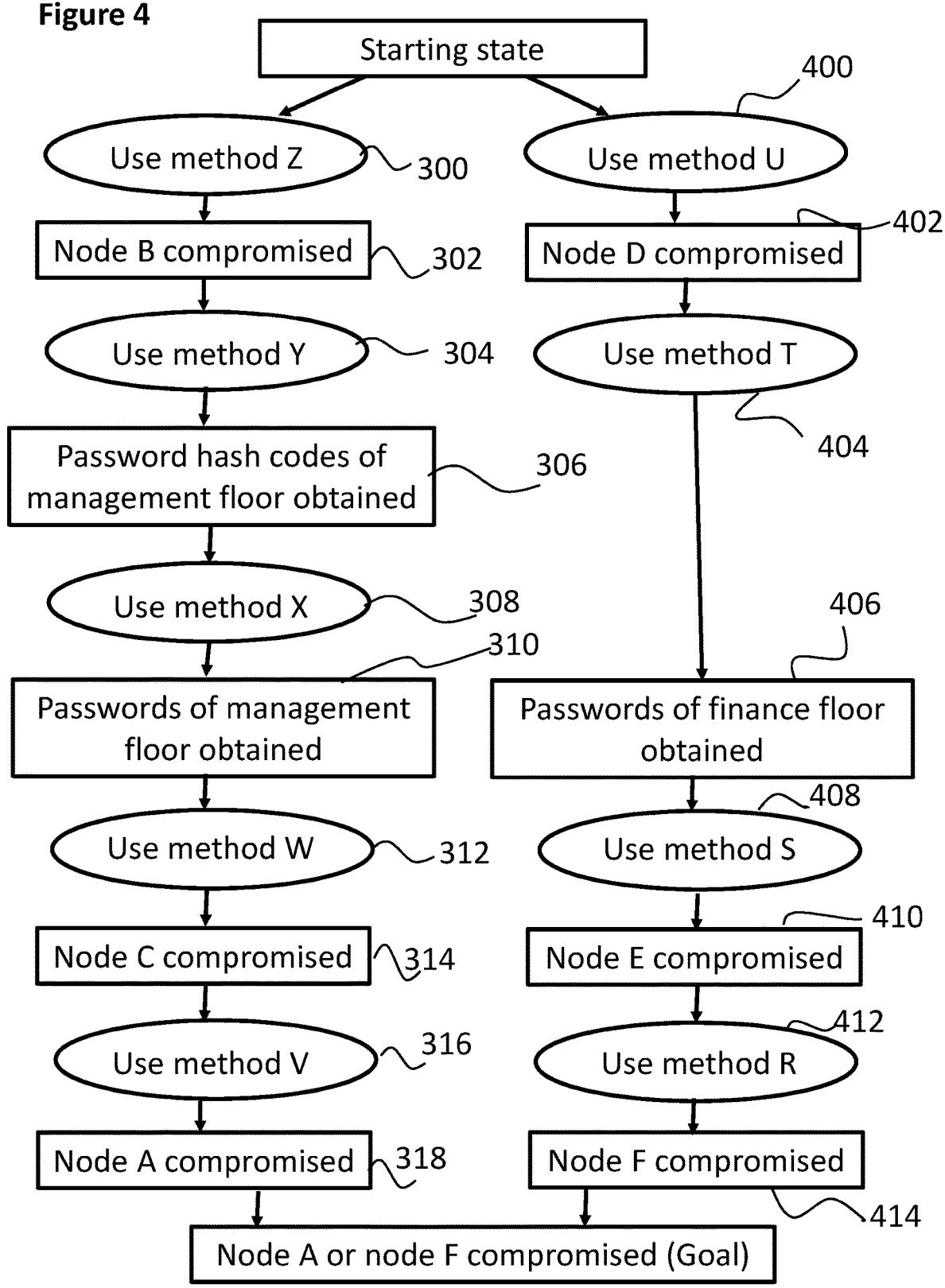
FIG. 4 is a graph representation of an example of a method for an attacker to achieve a goal of an attack, the example having multiple branches of attack.
Figure 5:
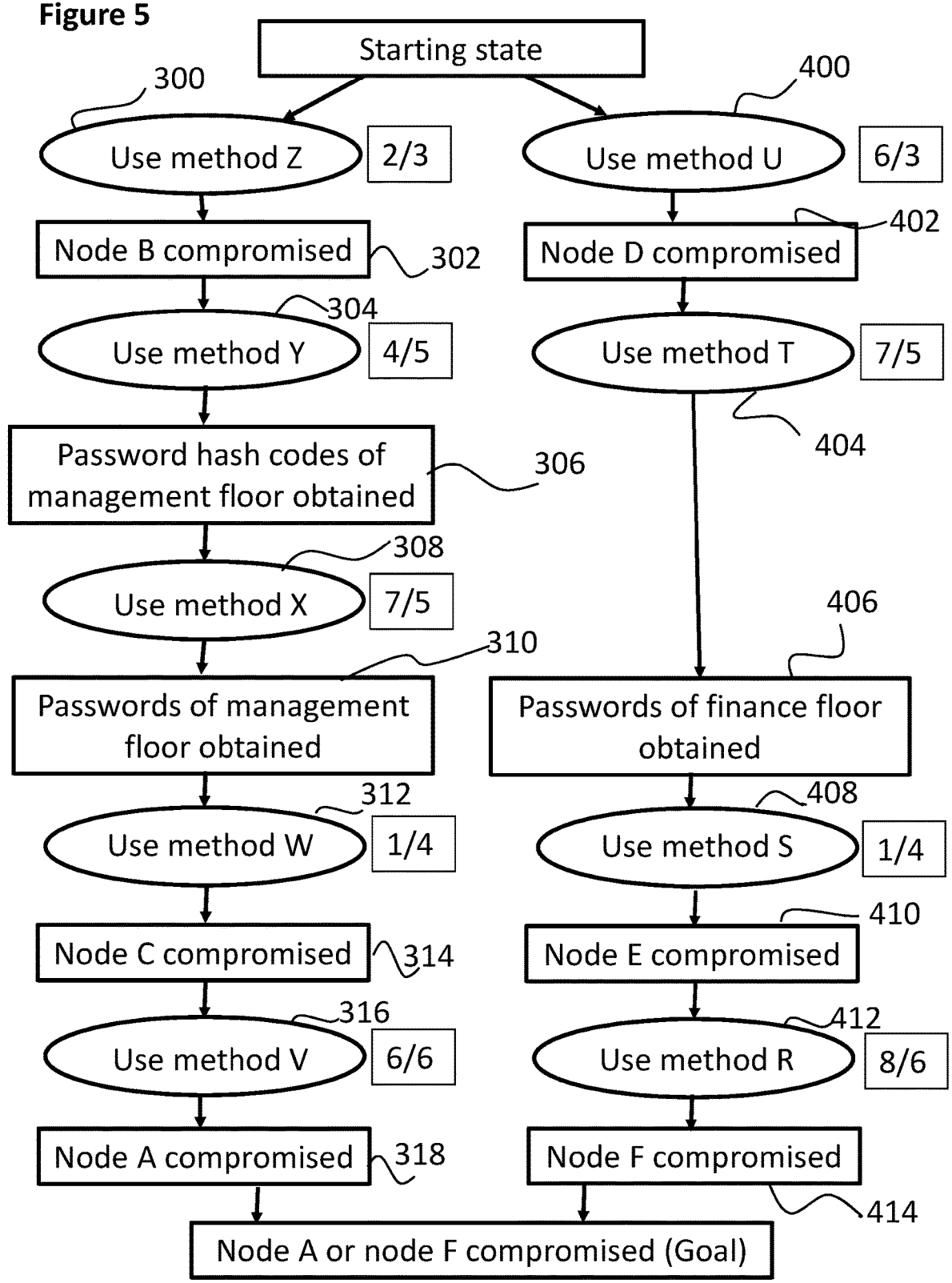
FIG. 5 is a representation of the paths of attack of FIG. 4, having costs of remediation and of exploitation associated with attacker steps.
Figure 6:
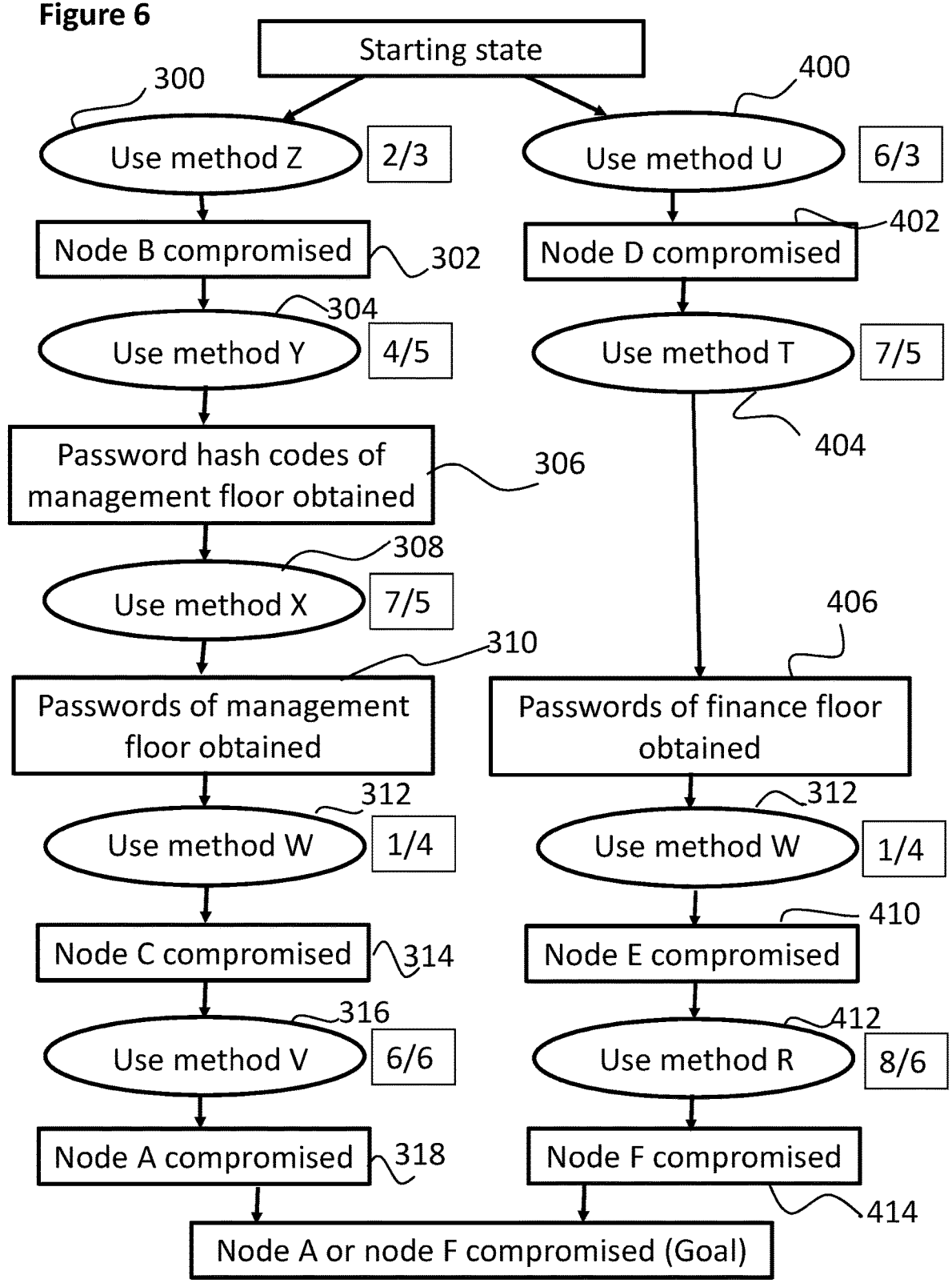
FIG. 6 is a graph representation of another example of a method for an attacker to achieve a goal of an attack, the example having multiple branches of attack that share a common attacker step.

The invention, in some embodiments, relates to penetration testing of a networked system, and specifically to methods and systems for providing to a user optimal remediation recommendations for protecting sub-goals in order to block paths of attack identified during penetration testing.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically provides methods and systems for efficiently prioritizing sub-goals to be protected such that cost-effective recommendations are provided to the user even when there are dependencies between different paths of attack. In the general case, the output of the method is a priority-ordered list of sub-goals that are recommended to be protected by suitable remediation actions.

The proposed solution operates at the level of individual sub-goals rather than complete paths of attack or individual attacker steps. Consequently, implementing the proposed solution requires defining of a measure of importance for each of the sub-goals included in at least one path of attack known to be available to attackers attacking the networked system.

The measure of importance used for grading the importance of sub-goals can be such that the higher the numerical value of the level of importance, the more important is the sub-goal. Alternatively, the measure of importance used for grading the importance of sub-goals can be such that the higher the numerical value of the level of importance, the less important is the sub-goal.

For the purpose of the methods of the proposed solution, the starting sub-goal and the final sub-goal of a path of attack are ignored and are not evaluated for importance. Consequently, in this disclosure the term "true sub-goal of a path of attack" means a sub-goal included in the path of attack that is not the starting sub-goal of the path of attack or the final sub-goal of the path of attack.

A first example for a measure of importance of a given sub-goal is the number of paths of attack in which the given sub-goal is included. The higher the number, the more important is the sub-goal. The reasoning behind using this measure is that protecting a sub-goal included in many paths of attack results in blocking many paths of attack.

Figure 7A:
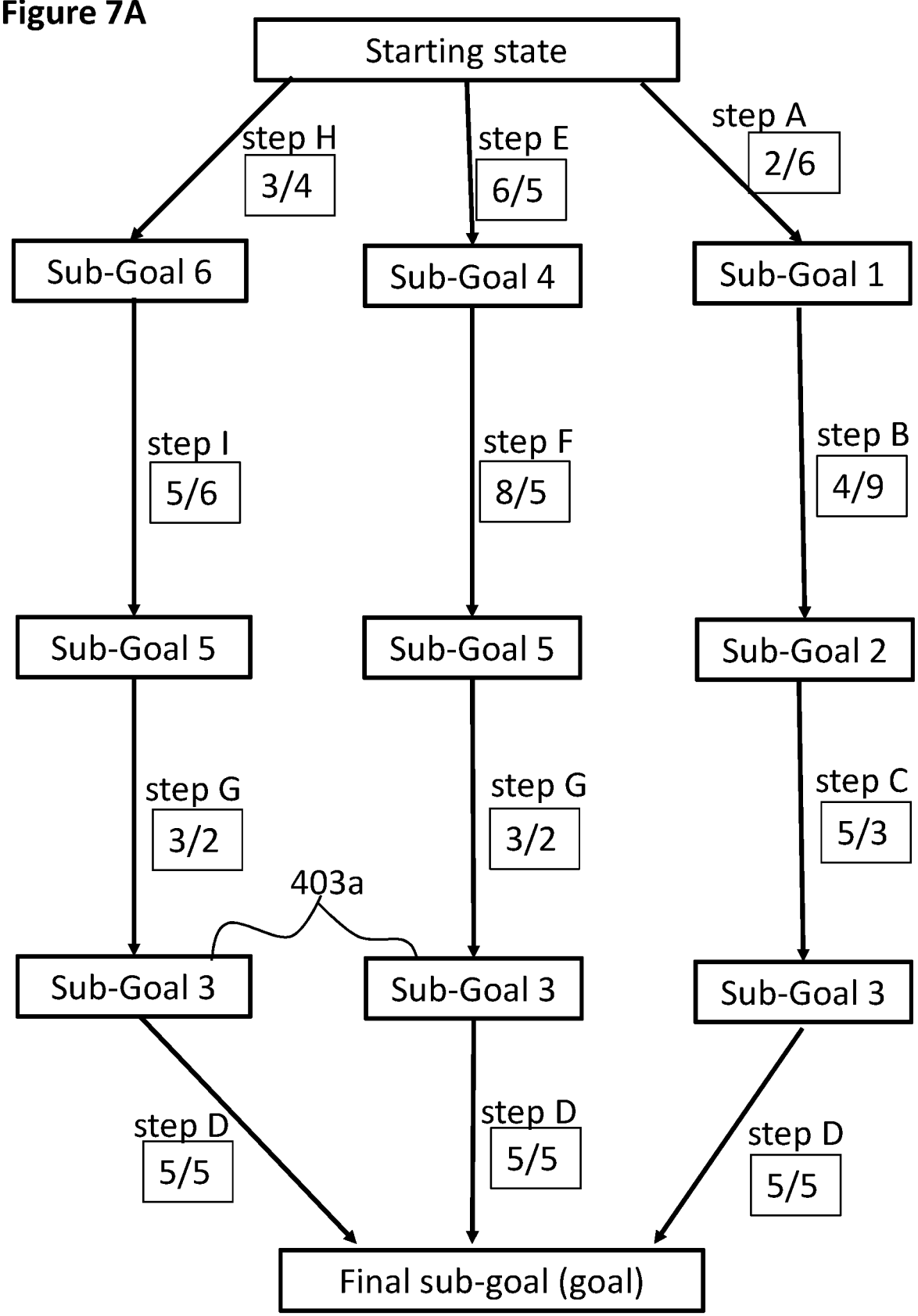
FIGS. 7A, 7B, and 7C are equivalent graph representations of the same paths of attack, having costs of remediation and of exploitation associated with attacker steps.

In the example of FIG. 7A, there are three paths of attack, each including three true sub-goals (that is—three sub-goals that are not the initial or final sub-goals). However, some of the sub-goals appear in more than one of the three paths of attack. As such, the number of distinct true sub-goals in FIG. 7A is six, not nine.

As can be seen in FIG. 7A:
A. Sub-goal 1 appears in one path of attack, and consequently its importance measure is 1;
B. Sub-goal 2 appears in one path of attack, and consequently its importance measure is 1;
C. Sub-goal 3 appears in three paths of attack, and consequently its importance measure is 3;
D. Sub-goal 4 appears in one path of attack, and consequently its importance measure is 1;
E. Sub-goal 5 appears in two paths of attack, and consequently its importance measure is 2; and
F. Sub-goal 6 appears in one path of attack, and consequently its importance measure is 1.

Therefore, the most important sub-goal in FIG. 7A is sub-goal 3 (importance measure 3), followed by sub-goal 5 (importance measure 2), followed by all other sub-goals, all of which have an equal and lowest importance (importance measure 1).

A second example for a measure of importance of a given sub-goal is the multiplication of the number of paths of attack in which the given sub-goal is included by the lowest cost of exploitation of all attacker steps leading to an occurrence of the given sub-goal in a path of attack. As in the previous example of an importance measure, the highest the number, the more important is the sub-goal.

The reasoning behind using this measure is similar to the reasoning behind using the importance measure of the first example. However, in this second example, there is an additional aspect of "weighting factors" that take into account the ease or difficulty with which an attacker can reach a given sub-goal. In order for this exemplary importance measure to make sense, the definition of the cost of exploitation in this example should be such that the easier it is for an attacker to carry out an attacker step, the higher is the numerical value of the cost of exploitation. This implies that the "lowest cost of exploitation" used in the calculation is numerically highest cost of exploitation of all attacker steps leading to an occurrence of the given sub-goal in a path of attack.

In FIG. 7A, the costs of exploitation and remediation associated with each attacker step are indicated using the format "X/Y", where "X" is the cost of exploitation and "Y" is the cost of remediation.

Based on the costs of exploitation shown in FIG. 7A, the calculation of the importance measures for the sub-goals are:
A. For sub-goal 1, multiply 1 (the number of paths in which it is included) by 2 (the numerical value of cost of exploitation of attacker step A, which is the only attacker step leading to an occurrence of sub-goal 1 in a path) resulting in an importance measure of 2 ($1 \times 2 = 2$);
B. For sub-goal 2, multiply 1 (the number of paths in which it is included) by 4 (the numerical value of cost of exploitation of attacker step B, which is the only attacker step leading to an occurrence of sub-goal 2 in a path) to get an importance measure of 4 ($1 \times 4 = 4$);
C. For sub-goal 3, multiply 3 (the number of paths in which it is included) by 5 (the highest numerical value of all costs of exploitation of attacker steps C and G, which lead to an occurrence of sub-goal 3 in a path) to get an importance measure of 15 ($3 \times 5 = 15$);
D. For sub-goal 4, multiply 1 (the number of paths in which it is included) by 6 (the numerical value of cost of exploitation of attacker step E, which is the only attacker step leading to an occurrence of sub-goal 4 in a path) to get an importance measure of 6 ($1 \times 6 = 6$);
E. For sub-goal 5, multiply 2 (the number of paths in which it is included) by 8 (the highest numerical value of all costs of exploitation of attacker steps F and I, which lead to an occurrence of sub-goal 5 in a path) to get an importance measure of 16 ($2 \times 8 = 16$); and
F. For sub-goal 6, multiply 1 (the number of paths in which it is included) by 3 (the numerical value of cost of exploitation of attacker step H, which is the only attacker step leading to an occurrence of sub-goal 6 in a path) to get an importance measure of 3 ($1 \times 3 = 3$).

Therefore, the order of importance of the sub-goals of FIG. 7A, using this second exemplary importance measure, from highest importance to lowest importance, is {sub-goal 5, sub-goal 3, sub-goal 4, sub-goal 2, sub-goal 6, sub-goal 1}.

A third example for a measure of importance of a given sub-goal is the addition of twice the number of paths of attack in which the given sub-goal is included to the lowest cost of remediation of all attacker steps leading to an occurrence of the given sub-goal in a path of attack. As in the second exemplary measure, the higher the numerical value of the importance measure, the more important is the sub-goal.

The reasoning behind using this measure is similar to the reasoning behind that of the second exemplary measure, only in this case the "weighting factors" take into account the ease or difficulty with which a sub-goal can be better protected (or made less vulnerable). In order for this exemplary measure to make sense, the definition of the cost of remediation in this example should be such that the easier it is to block an attacker step, the higher is the numerical value of the cost of remediation of that attacker step. This implies that the "lowest cost of remediation" used in the calculation is numerically the highest cost of remediation of all attacker steps leading to an occurrence of the given sub-goal in a path of attack.

Based on the costs of remediation shown in FIG. 7A, the calculation of the importance measures for the sub-goals in the current example are:
A. For sub-goal 1, add two times 1 (the number of paths in which it is included) to 6 (the numerical value of cost of remediation of attacker step A, which is the only attacker step leading to an occurrence of sub-goal 1 in a path) to get an importance measure of 8 ($2 \times 1 + \max\{6\} = 8$);
B. For sub-goal 2, add two times 1 (the number of paths in which it is included) to 9 (the numerical value of cost of remediation of attacker step B, which is the only attacker step leading to an occurrence of sub-goal 2 in a path) to get an importance measure of 11 ($2 \times 1 + \max\{9\} = 11$);
C. For sub-goal 3, add two times 3 (the number of paths in which it is included) to 3 (the highest numerical value of all costs of remediation of attacker steps C and G, which lead to an occurrence of sub-goal 3 in a path) to get an importance measure of 9 (2×3+max{3, 2}=9);

D. For sub-goal 4, add two times 1 (the number of paths in which it is included) to 5 (the numerical value of cost of remediation of attacker step E, which is the only attacker step leading to an occurrence of sub-goal 4 in a path) to get an importance measure of 7 (2×1+max{5}=7);

E. For sub-goal 5, add two times 2 (the number of paths in which it is included) to 6 (the highest numerical value of all costs of remediation of attacker steps F and I, which lead to an occurrence of sub-goal 5 in a path) to get an importance measure of 10 (2×2+max{5, 6}=10); and F. For sub-goal 6, add two times 1 (the number of paths in which it is included) to 4 (the numerical value of cost of remediation of attacker step H, which is the only attacker step leading to an occurrence of sub-goal 6 in a path) to get an importance measure of 6 (2×1+max{4}=6).

Therefore, the order of importance of the sub-goals of FIG. 7A, using this third exemplary importance measure, from highest importance to lowest importance, is {sub-goal 2, sub-goal 5, sub-goal 3, sub-goal 1, sub-goal 4, sub-goal 6}.

A fourth example for a measure of importance of a given sub-goal is the addition of three times the number of paths of attack in which the given sub-goal is included to the sum of costs of remediation of all different attacker steps leading to an occurrence of the given sub-goal in a path of attack. As in the second and third exemplary measures, the higher the numerical value of the importance measure, the more important is the sub-goal.

The reasoning behind using this measure is similar to the reasoning behind that of the second and third exemplary measures, only in this case the "weighting factors" take into account the ease or difficulty with which a sub-goal can be fully protected (and not just made slightly better protected, as in the previous example). As in the previous example, in order for this exemplary measure to make sense, the definition of the cost of remediation in this example should be such that the easier it is to block an attacker step, the higher is the numerical value of the cost of remediation of that attacker step.

Based on the costs of remediation shown in FIG. 7A, the calculation of the importance measures for the sub-goals in the current example are:

A. For sub-goal 1, add three times 1 (the number of paths in which it is included) to 6 (the numerical value of the cost of remediation of attacker step A, which is the only attacker step leading to an occurrence of sub-goal 1 in a path) to get an importance measure of 9 (3×1+6=9);

B. For sub-goal 2, add three times 1 (the number of paths in which it is included) to 9 (the numerical value of the cost of remediation of attacker step B, which is the only attacker step leading to an occurrence of sub-goal 2 in a path) to get an importance measure of 12 (3×1+9=12);

C. For sub-goal 3, add three times 3 (the number of paths in which it is included) to 5 (the sum of the numerical values of the costs of remediation of attacker steps C and G that lead to occurrences of sub-goal 3 in a path) to get an importance measure of 14 (3×3+[3+2]=14);

D. For sub-goal 4, add three times 1 (the number of paths in which it is included) to 5 (the numerical value of the cost of remediation of attacker step E, which is the only attacker step leading to an occurrence of sub-goal 3 in a path) to get an importance measure of 8 (3×1+5=8);

E. For sub-goal 5, add three times 2 (the number of paths in which it is included) to 11 (the sum of the numerical values of the costs of remediation of attacker steps F and I that lead to occurrences of sub-goal 5 in a path) to get an importance measure of 17 (3×2+[5+6]=17); and F. For sub-goal 6, add three times 1 (the number of paths in which it is included) to 4 (the numerical value of the cost of remediation of attacker step H, the only attacker step leading to an occurrence of sub-goal 6 in a path) to get an importance measure of 7 (3×1+4=7).

Therefore, the order of importance of the sub-goals of FIG. 7A, using this fourth exemplary importance measure, from highest importance to lowest importance, is {sub-goal 5, sub-goal 3, sub-goal 2, sub-goal 1, sub-goal 4, sub-goal 6}.

The importance measure calculations presented above are merely examples, and many other importance measures may be used when implementing the present invention, including importance measures based only on the number of paths of attack in which a sub-goal is included (as in the first example above), based on the number of paths of attack in which a sub-goal is included as well as on other factors (such as costs of exploitation and/or costs of remediation of attacker steps leading to a sub-goal, as in the second, third and fourth examples above), or based on other factors and considerations.

In the exemplary importance calculations discussed hereinabove using FIG. 7A, sub-goal 3 was "credited" with three appearances in paths of attack, even though two of those three appearances are preceded by the same attacker step. In both the left and central paths of FIG. 7A, sub-goal 3 is reached by attacker step G. In some embodiments of the proposed invention, multiple occurrences of the same sub-goal that are included in multiple paths of attack and are reached by the same attacker step, are counted as a single appearance for the purpose of calculating the importance measure of that sub-goal.

Figure 7B:
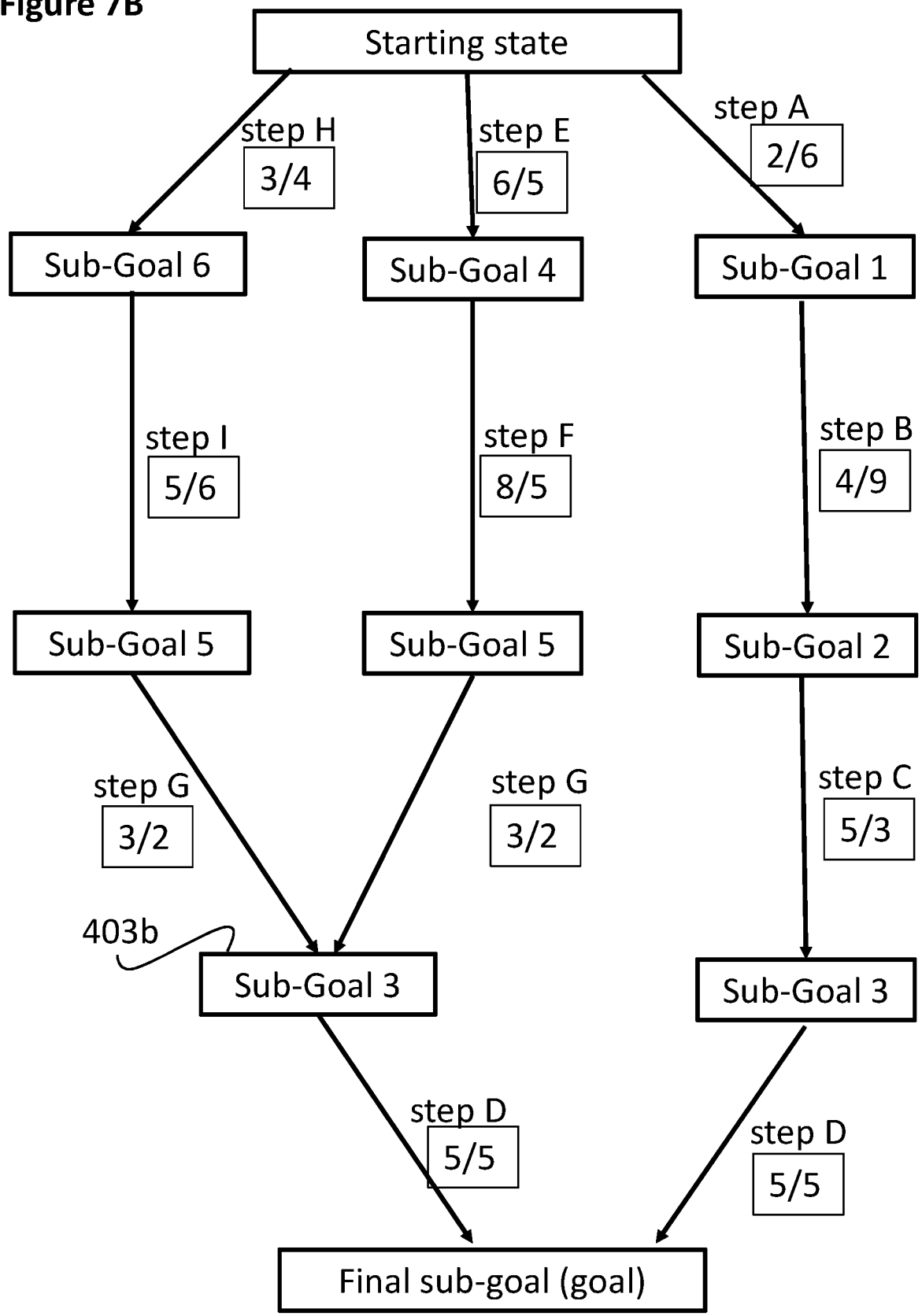

FIG. 7B presents the same paths of attack as FIG. 7A. However, in FIG. 7B multiple appearances of a sub-goal reached by the same attacker step are eliminated by merging such multiple appearances into one common appearance. Specifically, comparison of FIGS. 7A and 7B demonstrates that the appearances of sub-goal 3 in the central and left paths of FIG. 7A (indicated by reference numerals 403a in FIG. 7A), both of which are reached by step G, have been merged in FIG. 7B to a single appearance of sub-goal 3 (indicated by reference numeral 403b). Conversely, when multiple appearances of a sub-goal are reached by different attacker steps, those appearances are not merged into a single appearance in FIG. 7B, and each one of the multiple appearances is separately counted. For example, the two appearances of sub-goal 5, which are reached by steps F and I, have not been merged in FIG. 7B.

FIGS. 7A and 7B are completely equivalent, and provide two different presentation forms of the same information. However, FIG. 7B is more convenient when using an embodiment that counts multiple occurrences of the same sub-goal and attacker step combination as a single occurrence of the sub-goal for the purpose of calculating the sub-goal importance measure.

The calculations of the importance measures for the sub-goals, according to the examples provided hereinabove, are repeated using an embodiment that counts multiple occurrences of the same sub-goal that are reached by the same attacker step as a single occurrence of the sub-goal (as shown in FIG. 7B).

For the first example, in which the importance measure is based only on number of appearances of a sub-goal in the graph of paths of attack, the results are:
- A. Sub-goal 1 has one appearance and consequently its importance measure is 1;
- B. Sub-goal 2 has one appearance and consequently its importance measure is 1;
- C. Sub-goal 3 has two appearances and consequently its importance measure is 2;
- D. Sub-goal 4 has one appearance and consequently its importance measure is 1;
- E. Sub-goal 5 has two appearances and consequently its importance measure is 2; and
- F. Sub-goal 6 has one appearance and consequently its importance measure is 1.

For the second example, in which the importance measure is based on the number of appearances of a sub-goal in the graph of paths of attack as well as on costs of exploitations of attacker steps leading to the sub-goal, the results are:
- A. For sub-goal 1, multiply 1 (the number of appearances) by 2 (the numerical value of cost of exploitation of attacker step A, which is the only attacker step leading to an occurrence of sub-goal 1 in a path) to get an importance measure of 2 (1×2=2);
- B. For sub-goal 2, multiply 1 (the number of appearances) by 4 (the numerical value of cost of exploitation of attacker step B, which is the only attacker step leading to an occurrence of sub-goal 2 in a path) to get an importance measure of 4 (1×4=4);
- C. For sub-goal 3, multiply 2 (the number of appearances) by 5 (the highest numerical value of all costs of exploitation of attacker steps C and G which lead to an occurrence of sub-goal 3 in a path) to get an importance measure of 10 (2×5=10);
- D. For sub-goal 4, multiply 1 (the number of appearances) by 6 (the numerical value of cost of exploitation of attacker step E, which is the only attacker step leading to an occurrence of sub-goal 4 in a path) to get an importance measure of 6 (1×6=6);
- E. For sub-goal 5, multiply 2 (the number of appearances) by 8 (the highest numerical value of all costs of exploitation of attacker steps F and I which lead to an occurrence of sub-goal 5 in a path) to get an importance measure of 16 (2×8=16); and
- F. For sub-goal 6, multiply 1 (the number of appearances) by 3 (the numerical value of cost of exploitation of attacker step H, which is the only attacker step leading to an occurrence of sub-goal 6 in a path) to get an importance measure of 3 (1×3=3).

For the third example, in which the importance measure is based on the number of appearances of a sub-goal in the graph of paths of attack as well as on costs of remediation of attacker steps leading to the sub-goal, the results are:
- A. For sub-goal 1, add two times 1 (the number of appearances) to 6 (the numerical value of cost of remediation of attacker step A, which is the only attacker step leading to an occurrence of sub-goal 1 in a path) to get an importance measure of 8 (2×1+max{6}=8);
- B. For sub-goal 2, add two times 1 (the number of appearances) to 9 (the numerical value of cost of remediation of attacker step B, which is the only attacker step leading to an occurrence of sub-goal 2 in a path) to get an importance measure of 11 (2×1+max{9}=11);
- C. For sub-goal 3, add two times 2 (the number of appearances) to 3 (the highest numerical value of all costs of remediation of attacker steps C and G which lead to an occurrence of sub-goal 3 in a path) to get an importance measure of 7 (2×2+max{3, 2}=7);
- D. For sub-goal 4, add two times 1 (the number of appearances) to 5 (the numerical value of cost of remediation of attacker step E, which is the only attacker step leading to an occurrence of sub-goal 4 in a path) to get an importance measure of 7 (2×1+max{5}=7);
- E. For sub-goal 5, add two times 2 (the number of appearances) to 6 (the highest numerical value of all costs of remediation of attacker steps F and I which lead to an occurrence of sub-goal 5 in a path) to get an importance measure of 10 (2×2+max {5, 6}=10); and
- F. For sub-goal 6, add two times 1 (the number of appearances) to 4 (the numerical value of cost of remediation of attacker step H, which is the only attacker step leading to an occurrence of sub-goal 6 in a path) to get an importance measure of 6 (2×1+max{4}=6).

For the fourth example, in which the importance measure is also based on the number of appearances as well as costs of remediation (as in the third example), the results are:
- A. For sub-goal 1, add three times 1 (the number of appearances) to 6 (the numerical value of the cost of remediation of attacker step A, the only attacker step leading to an occurrence of sub-goal 1 in a path) to get an importance measure of 9 (3×1+6=9);
- B. For sub-goal 2, add three times 1 (the number of appearances) to 9 (the numerical value of the cost of remediation of attacker step B, the only attacker step leading to an occurrence of sub-goal 2 in a path) to get an importance measure of 12 (3×1+9=12);
- C. For sub-goal 3, add three times 2 (the number of appearances) to 5 (the sum of the numerical values of the costs of remediation of attacker steps C and G that lead to occurrences of sub-goal 3 in a path) to get an importance measure of 11 (3×2+[2+3]=11);
- D. For sub-goal 4, add three times 1 (the number of appearances) to 5 (the numerical value of the cost of remediation of attacker step E, which is the only attacker step leading to an occurrence of sub-goal 4 in a path) to get an importance measure of 8 (3×1+5=8);
- E. For sub-goal 5, add three times 2 (the number of appearances) to 11 (the sum of the numerical values of the costs of remediation of attacker steps F and I that lead to occurrences of sub-goal 5 in a path) to get an importance measure of 17 (3×2+[5+6]=17); and
- F. For sub-goal 6, add three times 1 (the number of appearances) to 4 (the numerical value of the cost of remediation of attacker step H, which is the only attacker step leading to an occurrence of sub-goal 6 in a path) to get an importance measure of 7 (3×1+4=7).

Figure 7C:
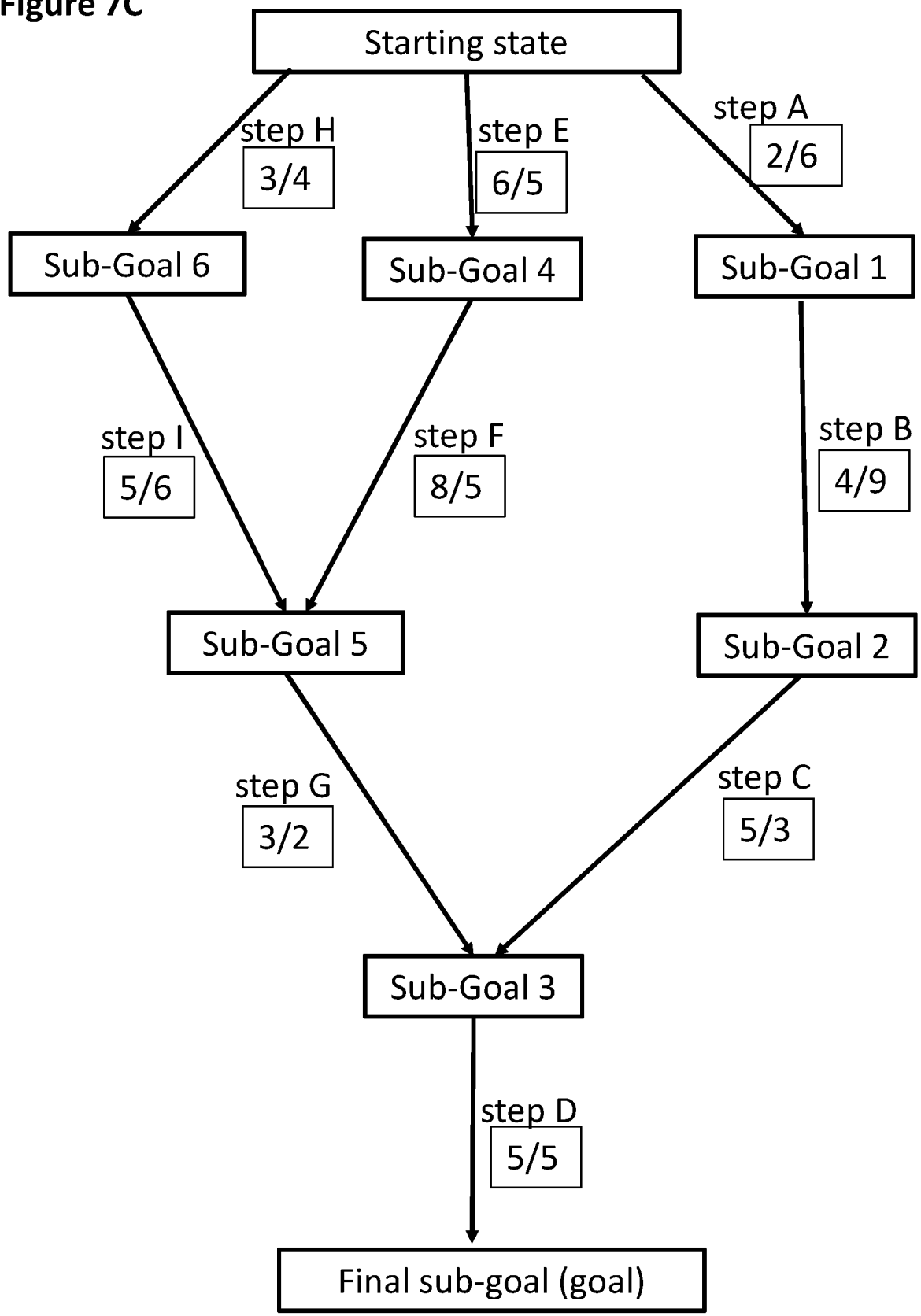

FIG. 7C is another form of representation of the paths of attack of FIGS. 7A and 7B, and is completely equivalent to each of them. In FIG. 7C each sub-goal appears only once. Even if a sub-goal is reachable by two different attacker steps, it still appears only once in the graph of paths of attack. For example, sub-goal 5, which is reachable by both step F and step I, appears only once in the graph, unlike in FIG. 7B where it appears twice. FIG. 7C may be used instead of FIG. 7B when calculating importance measures for an embodiment that counts multiple occurrences of the same sub-goal and attacker step combination as a single occurrence of the sub-goal. However, when using FIG. 7C for this purpose, care must be taken to consider a sub-goal reachable by multiple different attacker steps as having multiple occurrences.

As discussed hereinabove with respect to FIGS. 3A to 6, in some cases, a sub-goal included in a path of attack may be the compromising of a given network node, such as, for example, compromising the CFO's computer or compromising the inventory database server. However, sub-goals are not limited to compromising network nodes, and any achievement that may be useful to an attacker in any way may serve as a sub-goal in a path of attack. For example, a sub-goal may be the obtaining of certain resources (see for example at sub-goals 310 and 406 in FIG. 6), such as a passwords file of the accounting department or the credentials (e.g. username and password) of a given user.

Given one's ability to calculate an importance measure of any sub-goal included in at least one path of attack, in accordance with the present invention there is provided a method of recommending the best sub-goals to be protected by remediation actions, which method includes the following operative steps:
1. Initialize an ordered list of sub-goals to be protected to be an empty list.
2. Define a halting condition for stopping operation of the method. The halting condition is a condition applied to the ordered list of sub-goals to be protected. For example, the halting condition may be that the ordered list includes three members, or that the cumulative sum of the costs of remediation of all attacker steps leading to members in the ordered list exceeds a given threshold.
3. For each sub-goal included in at least one path of attack, calculate its corresponding importance measure.
4. Determine the sub-goal that has the optimal importance measure. The optimal importance measure may be the highest numerical value of importance measure, when the importance measure generates a high numerical value for a high importance sub-goal, as in the examples provided above, or it may be the lowest numerical value of importance measure, when the importance measure generates a high numerical value for a low importance sub-goal. In the case of a tie, in which multiple sub-goals have equal corresponding importance measures, employ some tie-breaking mechanism to determine the optimal sub-goal. The tie-breaking mechanism may depend on factors such as costs of remediation, costs of exploitation and/or probabilities of success of the attacker steps leading to the sub-goals having the same importance measure. Alternatively, the tie-breaking mechanism may be a random selection of one of the sub-goals having the same importance measure.
5. Insert the sub-goal determined to have the optimal importance measure to be the next member (last member) in the ordered list of sub-goals to be protected.
6. Modify the representation of the networked system vulnerabilities (e.g. the graph representing the paths of attack or the list representing the paths of attack), by removing from it all occurrences of the last sub-goal inserted into the ordered list. Any path of attack that becomes "broken" and unavailable to the attacker by the removal of the sub-goal, is entirely removed from the representation.
7. Evaluate the halting condition for the ordered list.
8. If the halting condition is not satisfied and there is at least one path of attack left in the modified representation, return to step 3, using the modified representation as the current representation of the networked system vulnerabilities. Otherwise, if the halting condition is satisfied or there are no more paths of attack left in the modified representation, terminate the computation and provide the current ordered list as the output of the method.

The inventive method described above provides as its output an ordered list of sub-goals whose protection, for example by remediation actions, would improve the security of the networked system. Alternatively, the output may be an unordered list of sub-goals to be protected. The advantage of having the list of attacker steps in a specific order is that, if the cost required for protecting all of the recommended sub-goals is greater than the budget available for improving the security of the networked system, the relative importance of protecting the sub-goals in the list is known, and the best use of the existing resources for protecting the system becomes clear to the system owner or administrator.

As an example, the inventive method described herein is applied to the example illustrated in FIG. 7A. For the purpose of present example, the importance measure of a sub-goal is defined as in the first example presented above (i.e. equal to the number of paths of attack including the sub-goal). The embodiment used in this example counts every occurrence of a sub-goal in a path of attack, even when the same attacker step leads to the sub-goal in multiple paths of attack.

In this exemplary setting of FIG. 7A, the method described hereinabove operates as follows:
1. The ordered list of sub-goals to be protected is initialized to { } (the empty list).
2. The halting condition is set to be "having two members in the ordered list".
3. Calculating the importance measure for each sub-goal (see the calculations in the first example above):
   a. Sub-goal 1—importance measure of 1;
   b. Sub-goal 2—importance measure of 1;
   c. Sub-goal 3—importance measure of 3;
   d. Sub-goal 4—importance measure of 1;
   e. Sub-goal 5—importance measure of 2;
   f. Sub-goal 6—importance measure of 1;
4. The sub-goal having the highest importance is sub-goal 3.
5. The ordered list of sub-goals to be protected becomes {sub-goal 3}.
6. The representation of the networked system vulnerabilities (i.e. the graph of FIG. 7A) is modified by removing all occurrences of sub-goal 3. As this breaks all three paths of attack, all of them are completely removed from the representation.
7. The halting condition is evaluated and found to be not satisfied, since there is only a single sub-goal in the ordered list.
8. As no path of attack remains in the graph, the inventive method terminates with the result being the list {sub-goal 3}.

In this example, the remediation recommendation that is provided is to protect only sub-goal 3. In should be noted, that protecting a given sub-goal means blocking each and every attacker step that leads to an occurrence of the given sub-goal in a path of attack. In the example of FIG. 7A, a recommendation to protect sub-goal 3 translates into a recommendation to block attacker steps C and G.

In the present example, even though the halting condition requires that the ordered list have two members (i.e. the question we asked was "what are the two best sub-goals to be protected?"), the result produced by the inventive method is a recommendation to protect a single sub-goal. This is due to the fact that once sub-goal 3 is protected, there is no added benefit in protecting another sub-goal, as the protection of sub-goal 3 already brings the networked system to be fully protected. Obviously, this is not always the case, and in most real-world cases the inventive method will generate multiple recommendations of sub-goals to be protected, ordered from most important to least important.

As explained above, the identity of the specific sub-goals to be protected, depends very much on the selected importance measure.

In order to demonstrate this, in a second exemplary implementation, the method of the present invention is applied to the example illustrated in FIG. 7A while using the third exemplary importance measure discussed hereinabove (the importance measure of a sub-goal is the addition of twice the number of paths of attack in which the sub-goal is included to the lowest cost of remediation of all attacker steps leading to an occurrence of the sub-goal in a path of attack). The embodiment used in this example counts every occurrence of a sub-goal in a path of attack, even when the same attacker step leads to the sub-goal in multiple paths of attack.

Figure 8:
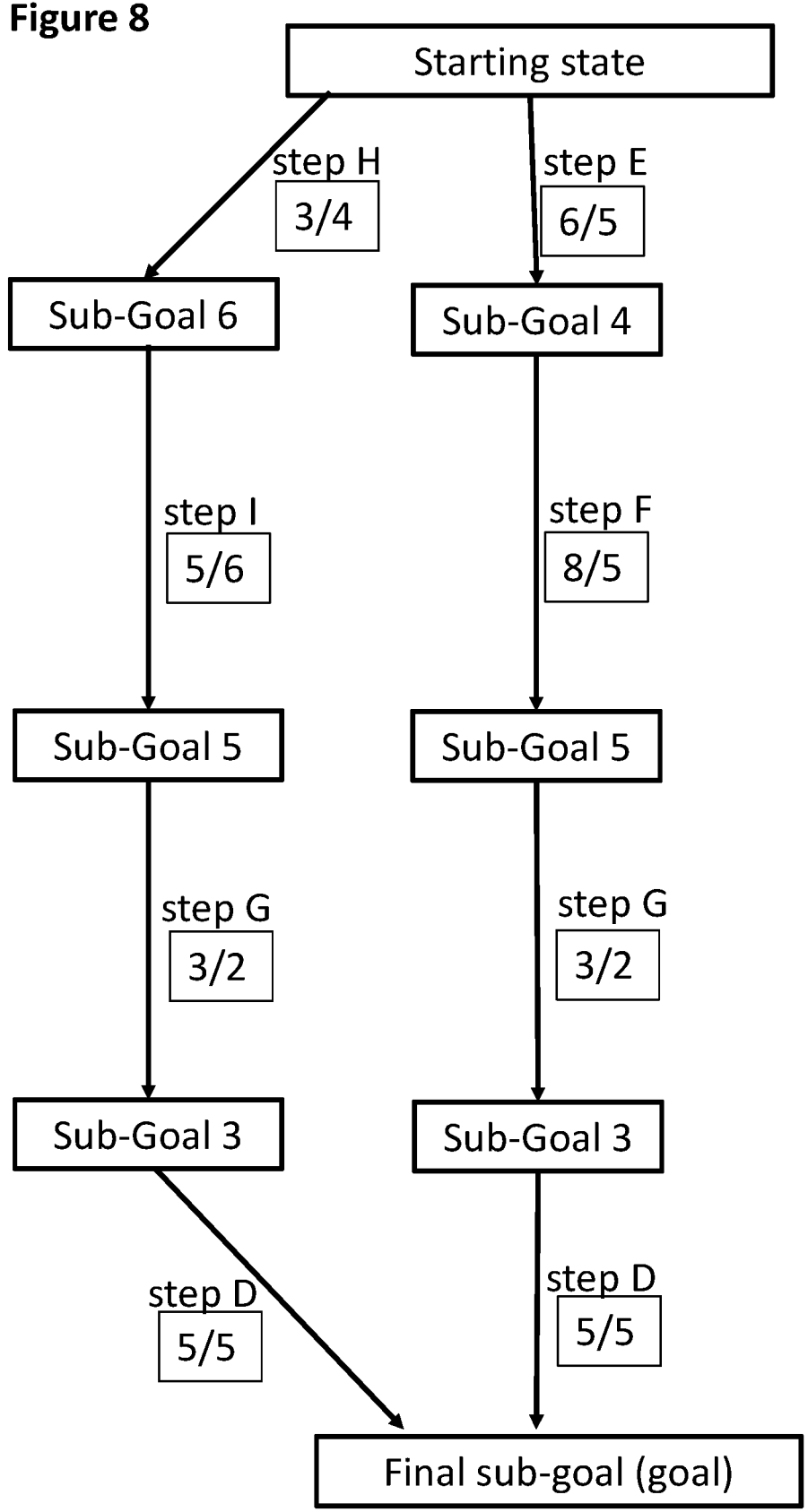
FIG. 8 is a graph representation of the paths of attack of FIG. 7A, following application thereto of a first iteration of a method of the present invention.

In this second exemplary setting of FIG. 7A, the method described hereinabove operates as follows:
1. The ordered list of sub-goals to be protected is initialized to { } (the empty list).
2. The halting condition is set to be "having two members in the ordered list".
3. Calculating the importance measure for each sub-goal based on the graph shown in FIG. 7A (see the calculations in the third example above):
   a. Sub-goal 1—importance measure of 8 (2×1+max{6}=8);
   b. Sub-goal 2—importance measure of 11 (2×1+max{9}=11);
   c. Sub-goal 3—importance measure of 9 (2×3+max{3, 2}=9);
   d. Sub-goal 4—importance measure of 7 (2×1+max{5}=7);
   e. Sub-goal 5—importance measure of 10 (2×2+max{5, 6}=10); and
   f. Sub-goal 6—importance measure of 6 (2×1+max{4}=6).
4. The sub-goal having the highest importance is sub-goal 2.
5. The ordered list of sub-goals to be protected becomes {sub-goal 2}.
6. The representation of the networked system vulnerabilities (i.e. the graph of FIG. 7A) is modified by removing all occurrences of sub-goal 2. This breaks only the rightmost path of attack, which is completely removed from the representation, thus forming the representation shown in FIG. 8.
7. The halting condition is evaluated and found to be not satisfied, since there is only a single sub-goal in the ordered list.
8. As two paths of attack remains in the graph (the central path of attack and the leftmost path of attack), the inventive method carries out another iteration, starting at step 3.
3a. Recalculating the importance measure for each sub-goal based on the modified representation illustrated in FIG. 8:
   a. Sub-goal 1—has been removed from the representation;
   b. Sub-goal 2—has been removed from the representation;
   c. Sub-goal 3—importance measure of 6 (2×2+max{2, 2}=6);
   d. Sub-goal 4—importance measure of 7 (2×1+max{5}=7);
   e. Sub-goal 5—importance measure of 10 (2×2+max{5, 6}=10); and
   f. Sub-goal 6—importance measure of 6 (2×1+max{4}=6).
4a. The sub-goal having the highest importance is sub-goal 5.
5a. The ordered list of sub-goals to be protected becomes {sub-goal 2, sub-goal 5}.
6a. The representation of the networked system vulnerabilities (i.e. the graph of FIG. 8) is modified by removing all occurrences of sub-goal 5. This breaks the remaining two paths of attack, which are both completely removed from the representation.
7a. The halting condition is evaluated and found to be satisfied, since there are two sub-goal in the ordered list.
8a. As the halting condition is satisfied, and no path of attack remains in the graph, the inventive method terminates with the result being the list {sub-goal 2, sub-goal 5}.

In this example, the remediation recommendation that is provided is to protect sub-goals 2 and 5. In the example of FIG. 7A, a recommendation to protect sub-goal 2 translates into a recommendation to block attacker step B, and a recommendation to protect sub-goal 5 translates into a recommendation to block attacker steps F and I.

As already explained above, in FIG. 7A the three branches, or paths of attack, are drawn separately, even though they share a sub-goal (i.e. shared sub-goal 3 is drawn three times). Alternatively, the three branches may be drawn using two occurrences of the shared sub-goal (as in FIG. 7B) or using only a single occurrence of the shared sub-goal (as in FIG. 7C). All these forms are equivalent, and the inventive method is applicable for all of them.

Additionally, in the example of FIG. 7C the two left-most paths of attack merge into a single path. This occurs when two paths share a common sub-goal (in this case sub-goal 5). A vulnerabilities graph including multiple branches merging into a common ending is equivalent to a vulnerabilities graph containing separately drawn branches duplicating the common portion of the merging branches. Therefore, the inventive method is equally applicable to cases in which sub-goals are shared between different branches, for example when multiple branches merge into a common ending.

Similarly, a branch or path of attack may split into multiple different continuations. This happens when there are multiple attacker steps that may be used by the attacker to continue his attack after reaching a certain sub-goal. A vulnerabilities graph drawn this way is also equivalent to a vulnerabilities graph containing separately drawn branches, duplicating the common initial portion of the splitting branch in each one of the separately drawn branches. Therefore, the inventive method is equally applicable to cases in which a common beginning splits into multiple branches.

It should be emphasized that applying the inventive method disclosed herein does not necessarily require the use of a graph. As discussed hereinabove, a graph is just one form of representation of the paths of attack discovered in a networked system, and there are other, equivalent, forms of representation. The inventive method may equally be applied while using a list or some other data structure for representing the paths of attack of a networked system.

When the inventive method is used for identifying a single optimal sub-goal to be protected, and there is no interest in determining multiple sub-goals to be protected, the method may be somewhat simplified. For this special case the method reduces to:
1. For each sub-goal included in at least one path of attack, calculate its corresponding importance measure.
2. Determine the sub-goal that has the optimal importance measure. The optimal importance measure may be the highest numerical value of importance measure, when the importance measure generates a high numerical value for a high importance sub-goal, as in the examples provided above, or it may be the lowest numerical value of importance measure, when the importance measure generates a high numerical value for a low importance sub-goal. In the case of a tie, in which multiple sub-goals have equal corresponding importance measures, employ some tie-breaking mechanism to determine the optimal sub-goal. The tie-breaking mechanism may depend on factors such as costs of remediation, costs of exploitation and/or probabilities of success of the attacker steps leading to the sub-goals having the same importance measure. Alternatively, the tie-breaking mechanism may be a random selection of one of the sub-goals having the same importance measure.
3. The result of the inventive method is the sub-goal having the optimal importance measure.

As can easily be seen, applying the above single-sub-goal version of the inventive method to the example of FIG. 7A using the first exemplary importance measure (number of paths of attack in which a sub-goal appears) results in a recommendation to protect sub-goal 3, the same result shown above to be generated by the multiple-sub-goals version of the inventive method using the same importance measure.

Figure 9A:
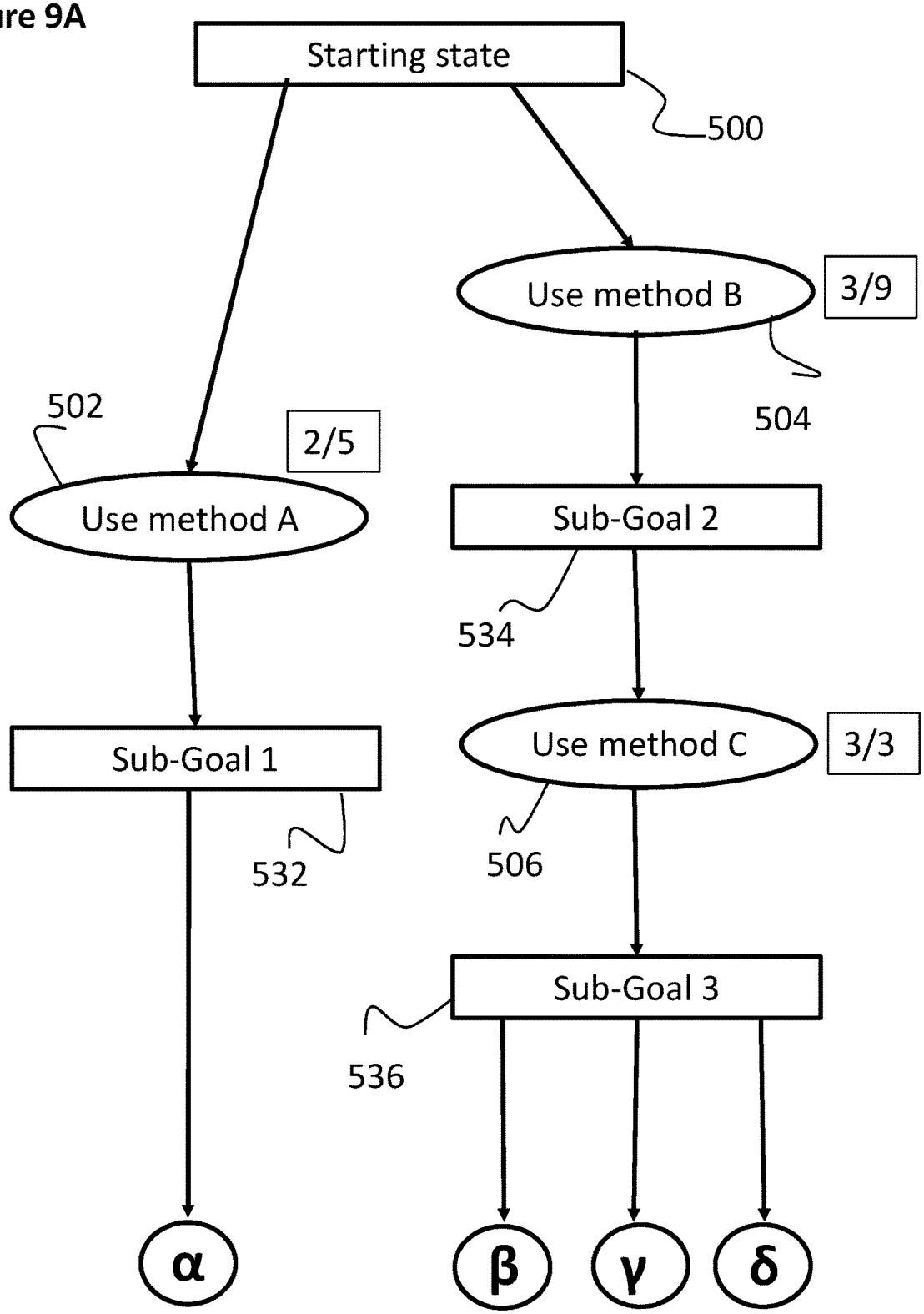
FIGS. 9A and 9B, together, are a graph representation of another example of a method of an attacker to achieve a goal, the example having multiple branches of attack that include multiple occurrences of similar attacker steps.
Figure 9B:
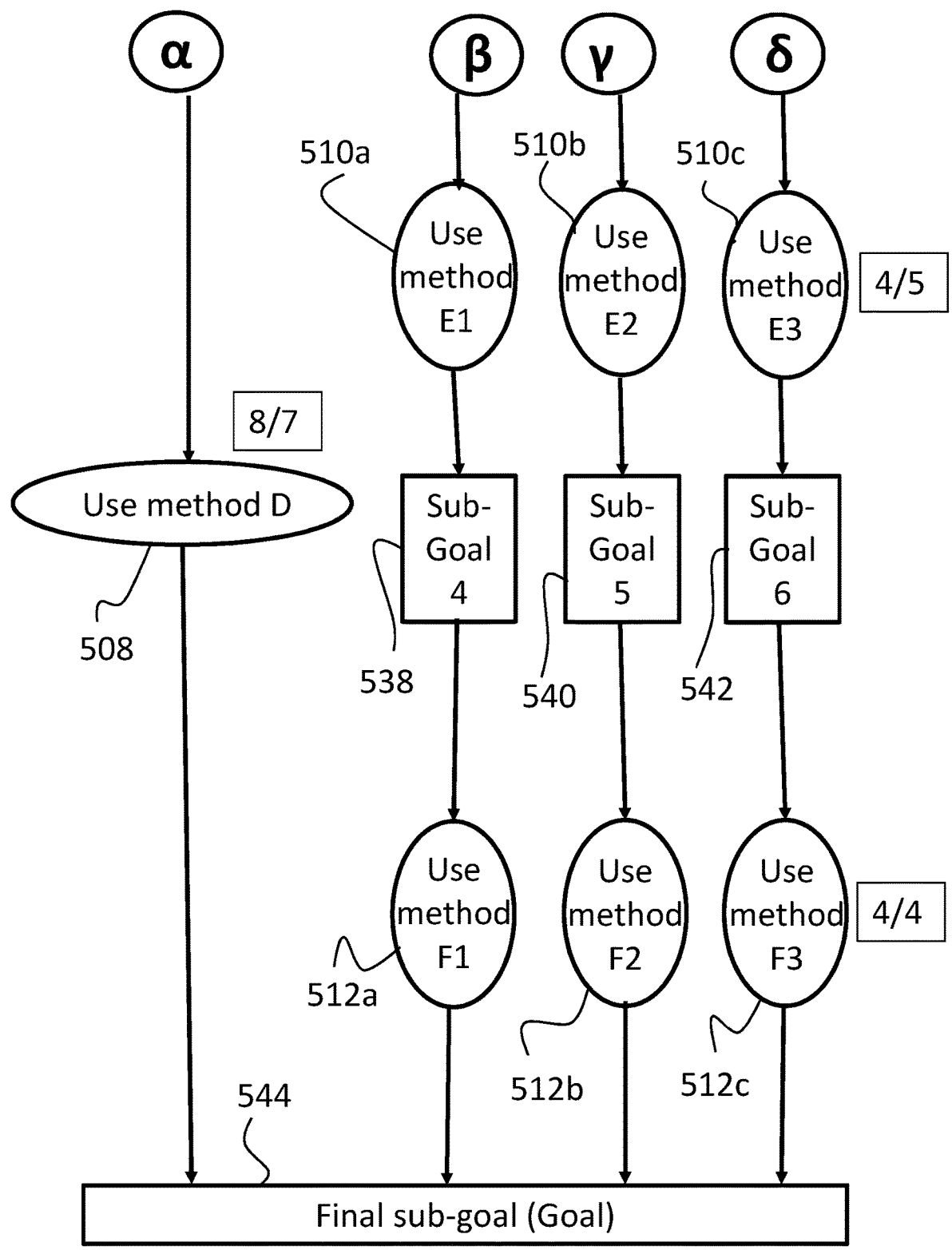

Reference is now made to FIGS. 9A and 9B, which illustrate paths of attack discovered for a tested networked system, and with respect to which the method of the present invention will also be described.

FIGS. 9A and 9B initiate at a Starting state 500 and include attacker steps 502 (Use method A), 504 (Use method B), 506 (Use method C), 508 (Use method D), 510a (Use method E1), 510b (Use method E2), 510c (Use method E3), 512a (Use method F1), 512b (Use method F2), and 512c (Use method F3). FIGS. 9A and 9B also include sub-goal 1 indicated by reference numeral 532, sub-goal 2 indicated by reference numeral 534, sub-goal 3 indicated by reference numeral 536, sub-goal 4 indicated by reference numeral 538, sub-goal 5 indicated by reference numeral 540, sub-goal 6 indicated by reference numeral 542, and final sub-goal 544.

FIGS. 9A and 9B use a representation mode in which paths of attack that share common attacker steps and common sub-goals are drawn as a common branch that splits into multiple sub-branches. FIGS. 9A and 9B indicate that the networked system has four paths of attack:
A. {Starting state, Use method A, Sub-Goal 1, Use method D, Final Sub-Goal}
B. {Starting state, Use method B, Sub-Goal 2, Use method C, Sub-Goal 3, Use method E1, Sub-Goal 4, Use method F1, Final Sub-Goal}
C. {Starting state, Use method B, Sub-Goal 2, Use method C, Sub-Goal 3, Use method E2, Sub-Goal 5, Use method F2, Final Sub-Goal}
D. {Starting state, Use method B, Sub-Goal 2, Use method C, Sub-Goal 3, Use method E3, Sub-Goal 6, Use method F3, Final Sub-Goal}

The three attacker steps 510a, 510b, and 510c (Use method E1, Use method E2, and Use method E3, respectively), are similar to each other and share the same cost of exploitation and cost of remediation. For example, attacker step 510a (Use method E1) may be the attacker step "using common technique E for obtaining an ability to remotely execute arbitrary code in network node X", attacker step 510b (Use method E2) may be the attacker step "using common technique E for obtaining an ability to remotely execute arbitrary code in network node Y", and attacker step 510c (Use method E3) may be the attacker step "using common technique E for obtaining an ability to remotely execute arbitrary code in network node Z".

Similarly, the three attacker steps 512a, 512b, and 512c (Use method F1, Use method F2, and Use method F3, respectively), are similar to each other and share the same cost of exploitation and cost of remediation. In the above example, attacker step 512a (Use method F1) may be the attacker step "using common technique F and an ability to remotely execute arbitrary code in network node X, obtain the final sub-goal", attacker step 512b (Use method F2) may be the attacker step "using common technique F and an ability to remotely execute arbitrary code in network node Y, obtain the final sub-goal", and attacker step 512c (Use method F3) may be the attacker step "using common technique F and an ability to remotely execute arbitrary code in network node Z, obtain the final sub-goal".

In the above example the three sub-goals 538, 540, and 542 between attacker steps 510a, 510b, and 510c, and attacker steps 512a, 512b, and 512c, respectively, are also similar to each other. Sub-goal 4 (indicated by reference numeral 538) may be "an ability to remotely execute arbitrary code in network node X", sub-goal 5 (indicated by reference numeral 540) may be "an ability to remotely execute arbitrary code in network node Y", and sub-goal 6 (indicated by reference numeral 542) may be "an ability to remotely execute arbitrary code in network node Z".

Such cases of paths of attack that include similar sub-goals that follow similar attacker steps and are followed by similar attacker steps, are quite common. For example, common technique E may be a technique that compromises a network node of choice, and common technique F may be a technique that achieves the next sub-goal using the node compromised by use of technique E. Network nodes X, Y and Z may be three nodes that share a common broadcast domain with a network node W that is associated with the next sub-goal, which, in this example, is the network node that is associated with the final goal 544 of the attacker. In order to achieve a desired sub-goal in node W, an attacker may compromise any one of the three nodes located in the same broadcast domain as node W (using technique E), and then remotely execute on the compromised node malicious code that achieves the final goal in node W (using technique F). From the attacker's point of view, each of the three nodes X, Y and Z may be used, thus creating three paths of attack, that are functionally equivalent but differ in the network node compromised as a sub-goal on the way to achieving the desired next sub-goal.

As in previous Figures, in FIGS. 9A and 9B the costs associated with each attacker step are indicated using the format "X/Y", where "X" is the cost of exploitation and "Y" is the cost of remediation.

The importance measure used for the example relating to FIGS. 9A and 9B is the second exemplary importance measure described above—the multiplication of the number of paths of attack in which the given sub-goal is included by the lowest cost of exploitation of all attacker steps leading to an occurrence of the given sub-goal in a path of attack. As noted above, this importance measure is defined such that a lower numerical measure indicates a less important sub-goal, and a higher numerical measure indicates a more important sub-goal. Additionally, as noted above, when portions of multiple paths of attack are merged in the representation because they include identical attacker steps leading to identical sub-goals, those sub-goals are counted as appearing in each of the multiple paths of attack, even though in the graphic representation those sub-goals may appear only once.

Turning now to use of the inventive method, in a first stage, the single-sub-goal version of the inventive method is applied to the exemplary graph of FIGS. 9A and 9B.

As a first step, sub-goal importance levels are computed for each of the sub-goals included in any of the paths of attack:

The importance level calculations applied to FIGS. 9A and 9B result in:
 a. Sub-goal 1—importance of: 1×2=2 (one appearance of sub-goal 1, attacker step 502 leading to sub-goal 1 has a cost of exploitation of 2);
 b. Sub-goal 2—importance of: 3×3=9 (three [merged] appearances of sub-goal 2, step 504 leading to sub-goal 2 has a cost of exploitation of 3);
 c. Sub-goal 3—importance of: 3×3=9 (three [merged] appearances of sub-goal 3, step 506 leading to sub-goal 3 has a cost of exploitation of 3);
 d. Sub-goal 4—importance of: 1×4=4 (one appearance of sub-goal 4, step 510*a* leading to sub-goal 4 has a cost of exploitation of 4);
 e. Sub-goal 5—importance of: 1×4=4 (one appearance of sub-goal 5, step 510*b* leading to sub-goal 5 has a cost of exploitation of 4); and
 f. Sub-goal 6—importance of: 1×4=4 (one appearance of sub-goal 6, step 510*c* leading to sub-goal 6 has a cost of exploitation of 4).

Next, the optimal sub-goal is determined by finding the numerically highest value of the sub-goal importance measures listed above. The highest sub-goal importance measure is 9, which is shared by sub-goals 2 and 3. Because two sub-goals are tied for the highest importance measure, a tie-breaking mechanism is used. In the present example, the tie-breaking rule selects the sub-goal having the lowest cost of remediation when blocking all attacker steps leading to that sub-goal. As attacker step 506 ("Use method C"), which is the only attacker step leading to sub-goal 3, has a lower cost of remediation than attacker step 504 ("Use method B"), which is the only attacker step leading to sub-goal 2, (3 vs. 9), the method generates a recommendation to protect sub-goal 3, which translates to blocking attacker step 506.

In a second stage, the multiple-sub-goals version of the inventive method is applied to the example of FIGS. 9A and 9B. The exemplary halting condition to be used is having an ordered list of sub-goals that contains three sub-goals.

The first iteration of the multiple-sub-goals version of the method operates exactly as the single-sub-goals version and inserts sub-goal 3 into the ordered list of sub-goals.

In the second iteration, the process is repeated for a group of paths of attack that includes only path A, since paths B, C and D are "broken" by protecting sub-goal 3 and are thus removed from consideration following the first iteration.

As sub-goal 1 is the only sub-goal in path A, it is the sub-goal selected to be protected in the second iteration. As such, following the second iteration of the inventive method, the ordered list of sub-goals is now {sub-goal 3, sub-goal 1}.

The halting condition is now checked, but is not satisfied, as the list includes only two members and not three. However, no paths of attack remain in the graph at this stage, causing the inventive method to terminate with a recommendation for protecting (i) sub-goal 3, and (ii) sub-goal 1, in that order of priority.

Figure 10A:
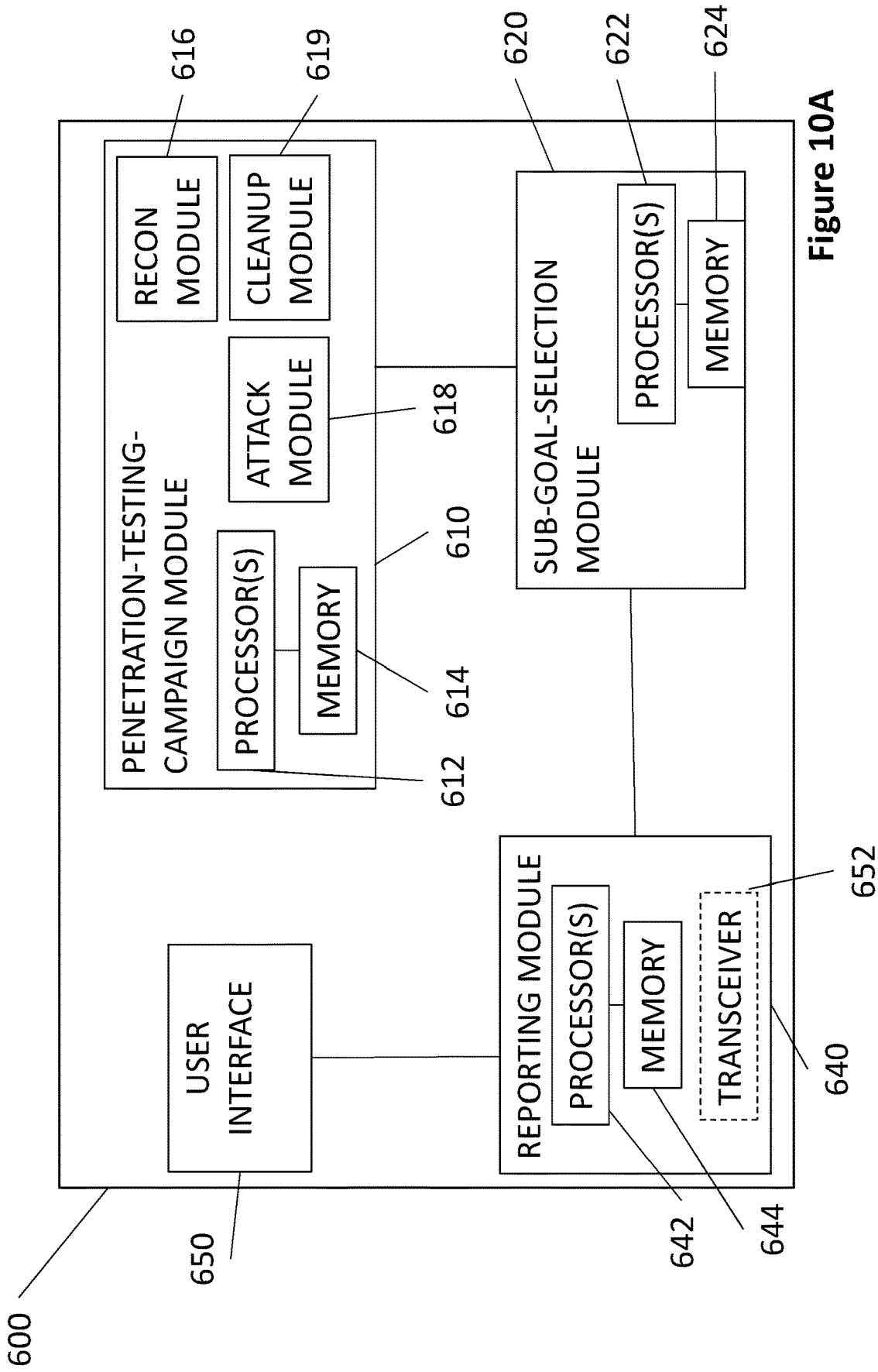
FIG. 10A is a schematic block diagram of a system for providing a recommendation for improving the security of a network system against attackers according to an embodiment of a first aspect of the invention.

Reference is now made to FIG. 10A, which is a block diagram of a system 600 for providing a recommendation for improving the security of a network system against attackers according to an embodiment of a first aspect of the present invention.

As seen in FIG. 10A, the system 600 includes a penetration-testing-campaign module 610, including one or more penetration-testing-campaign processors 612 and a penetration-testing-campaign memory 614, such as a non-transitory computer readable storage medium, having stored thereon instructions to be executed by the one or more penetration-testing-campaign processors 612. The memory 614 has stored instructions to carry out one or more penetration tests of a networked system.

System 600 further includes a reconnaissance module 616 adapted to carry out a reconnaissance function, an attack module 618 adapted to carry out an attack function, and optionally a cleanup module 619 adapted to carry out a cleanup function as described hereinabove. The penetration-testing-campaign module 610 may include at least part of the reconnaissance module 616 carrying out the reconnaissance function code, the attack module 618 carrying out the attack function code, and optionally the cleanup module 619 carrying out the cleanup function code.

System 600 further includes a sub-goal-selection module 620, including one or more sub-goal-selection processors 622 and a sub-goal-selection memory 624, such as a non-transitory computer readable storage medium, having stored thereon instructions to be executed by the one or more sub-goal-selection processors 622. The instructions include instructions that, when carried out in the correct order, select the single optimal sub-goal to be protected in order to improve the security of a tested networked system.

Figure 10B:
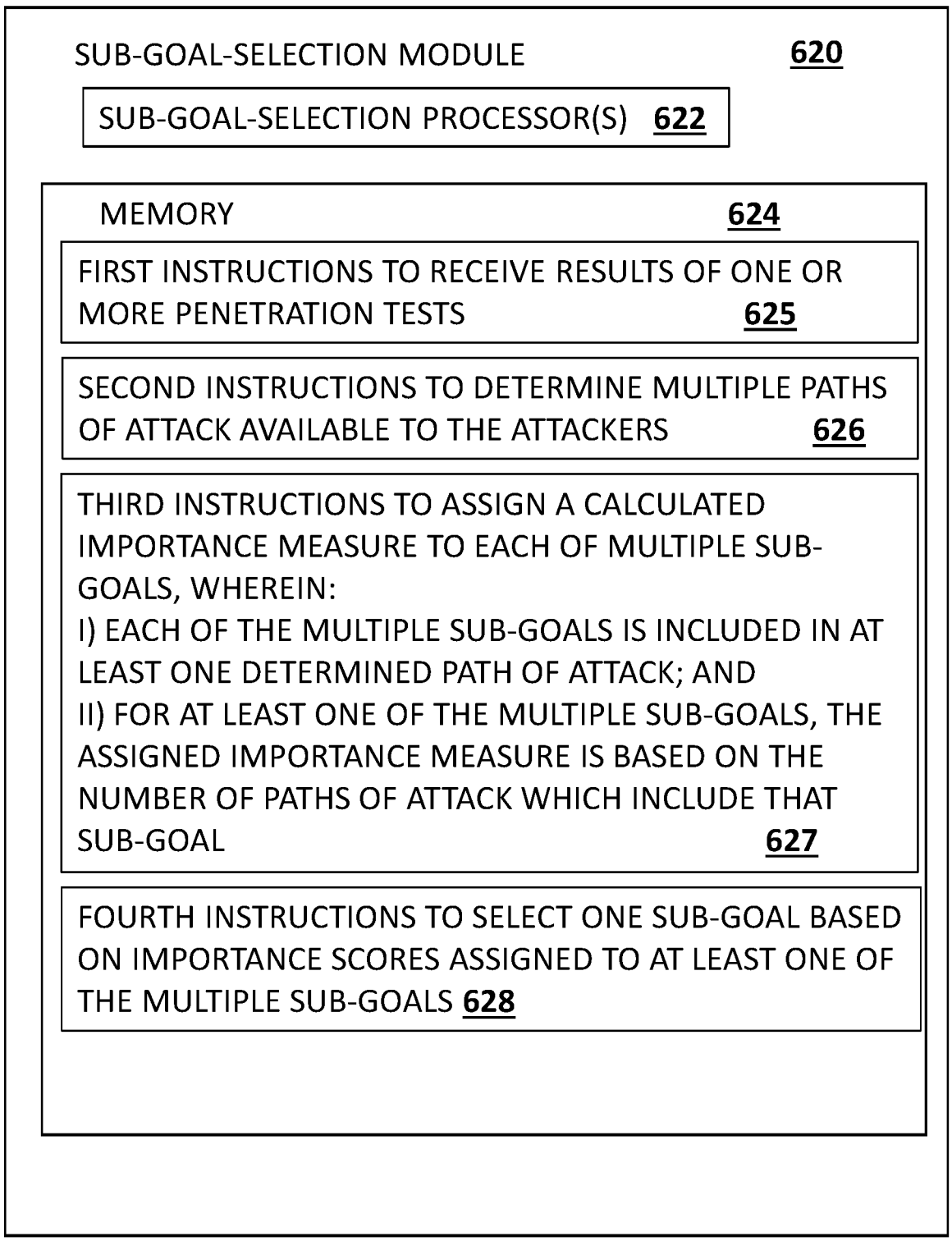
FIG. 10B is a schematic block diagram of a sub-goal selection module forming part of the system of FIG. 10A.

Turning additionally to FIG. 10B, which is a schematic block diagram of sub-goal-selection module 620, it is seen that memory 624 includes multiple instructions to be executed by the processor(s) 622, including:

First instructions 625 to receive, from penetration-testing-campaign module 610, results of the one or more penetration tests of the networked system carried out by the penetration-testing-campaign module;

Second instructions 626 to determine, based on the received results, multiple paths of attack available to the attackers. As described in detail hereinabove, each such path of attack is an ordered sequence of one or more attacker steps and one or more sub-goals.

Third instructions 627 to assign a calculated importance score, or importance measure, to each of multiple sub-goals. Each sub-goal of the multiple sub-goals is included in at least one of the multiple paths of attack determined by execution of second instructions 626. Additionally, for at least one given sub-goal of the multiple sub-goals, the importance score or measure assigned to the given sub-goal is based on the number of paths of attack which include the sub-goal, as in the four exemplary importance measures described hereinabove; and Fourth instructions 628 to select one sub-goal included in at least one of the multiple paths of attack determined by execution of second instructions 626, where the one sub-goal is selected based on the importance score assigned to at least one of the multiple sub-goals, and/or to that one sub-goal, during execution of the third instructions 627.

Returning to FIG. 10A, it is seen that system 600 further includes a reporting module 640, functionally associated with a user interface 650 and with sub-goal-selection module 620. Reporting module 640 includes one or more reporting processors 642, and a reporting memory 644, such as a non-transitory computer readable storage medium, having stored thereon instructions to be executed by the one or more reporting processors 642. The reporting memory 644 has stored:

instructions to receive from sub-goal-selection module 620 an identification of the selected sub-goal; and instructions to provide a recommendation to protect the selected sub-goal, thereby to improve the security of the networked system. The instructions to provide the recommendation include at least one of:

(i) instructions to cause a display device (e.g. of a user interface 650 or another display device, which may be located remotely to the reporting module 640) to display information about the recommendation;

(ii) instructions to store the information about the recommendation in a file; and (iii) instructions to electronically transmit the information about the recommendation, for example using a transceiver 652 functionally associated with the reporting module 640.

In some embodiments, the penetration-testing-campaign memory 614, sub-goal-selection memory 624, and reporting memory 644 are each a dedicated, and separate, memory component or storage medium. In other embodiments, at least two of the penetration-testing-campaign memory 614, the sub-goal-selection memory 624, and the reporting memory 644 may be part of the same memory component or storage medium.

In some embodiments, the penetration-testing-campaign processor(s) 612, sub-goal-selection processor(s) 622, and reporting processor(s) 642 are each dedicated, and separate, processors. In other embodiments, at least two of the penetration-testing-campaign processor(s) 612, sub-goal-selection processor(s) 622, and reporting processor(s) 642 share at least one common processor.

Figure 11:
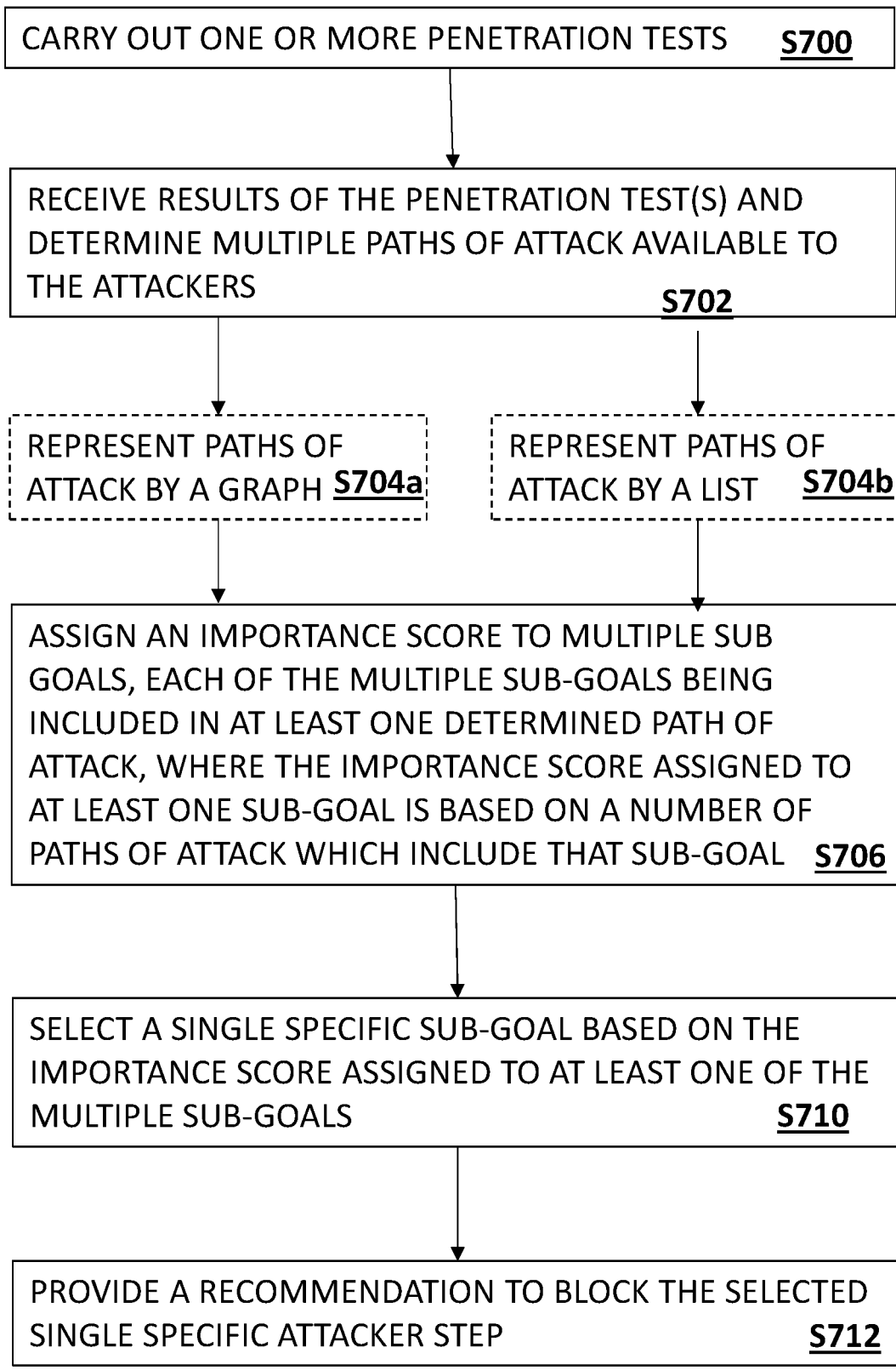
FIG. 11 is a flow chart of a method for providing a recommendation for improving the security of a network system against attackers according to an embodiment of the first aspect of the invention.

FIG. 11 is a flow chart of a method for providing a recommendation for improving the security of a network system against attackers according to an embodiment of the first aspect of the invention. The method of FIG. 11 is described herein as being carried out using system 600 of FIG. 10A, but may be carried out using any suitable system.

In step S700 shown in FIG. 11, a penetration testing system, such as penetration testing system 600, carries out one or more tests of the networked system, for example using testing methods known in the art.

Based on the results of the tests received by sub-goal-selection module 620, for example by execution of first instructions 625 of sub-goal-selection module 620, multiple paths of attack which are available to attackers are determined at step S702, for example by execution of second instructions 626 of sub-goal-selection module 620. Each such path of attack is an ordered sequence of one or more attacker steps and one or more sub-goals.

In some embodiments, each path of attack determined in step S702 starts at a starting sub-goal that is assumed to be achievable by the attacker, and ends at a final sub-goal which is assumed to be a goal of the attacker in at least one of the tests carried out at step S700. For example, such paths of attack are illustrated in FIGS. 3A-9B hereinabove.

In some embodiments, in each path of attack determined in step S702: (A) each attacker step in the path of attack is preceded by a sub-goal and followed by a sub-goal in the path of attack, (B) each sub-goal in the path of attack, except for a starting sub-goal of the path of attack, is preceded by an attacker step in the given path of attack, and (C) each sub-goal in the path of attack, except for a final sub-goal of the path of attack, is followed by an attacker step in the path of attack.

In some embodiments, at an optional step S704*a*, the paths of attack determined at step S702 are represented by a graph, for example by sub-goal-selection module 620. Each determined path of attack corresponds to a path in the graph.

In some embodiments, for each given path in the graph corresponding to a specific path of attack available to the attackers, all sub-goals and all attacker steps included in the specific path of attack are represented as graph nodes included in the given path in said graph. Such a representation is illustrated, for example, in FIGS. 3A, 4, 5, 6, 9A and 9B.

In some embodiments, for each given path in the graph corresponding to a specific path of attack available to the attackers, all sub-goals included in the specific path of attack are represented as graph nodes included in the given path in the graph and all attacker steps included in the specific path of attack are represented as graph edges included in the given path in the graph. Such a representation is illustrated, for example, in FIGS. 3B, and 7A to 8.

In some embodiments, at an optional step S704*b*, the paths of attack determined at step S702 are represented by a list, for example by sub-goal-selection module 620. Each given path of attack corresponds to an item in the list that includes all sub-goals and all attacker steps included in the given path of attack. Such a representation is illustrated, for example, in FIG. 3C.

A calculated importance score, or importance measure, is assigned to each of multiple sub-goals at step S706, for example by execution of third instructions 627 of sub-goal-selection module 620. Each sub-goal of the multiple sub-goals to which an importance score is assigned, is included in at least one of the multiple paths of attack determined at step S702. The importance score assigned to at least one given sub-goal of the multiple sub-goals is based on a number of determined paths of attack which include that given sub-goal.

In some embodiments, the importance score assigned, at step S706, to each given sub-goal of the multiple sub-goals, is based on the number of determined paths of attack which include that given sub-goal.

In some embodiments, the importance score assigned, at step S706, to at least one of the multiple sub-goals, is based only on the number of determined paths of attack which include that sub-goal.

In some embodiments, the importance score assigned, at step S706, to each given sub-goal of the multiple sub-goals, is based only on the number of determined paths of attack which include the given sub-goal.

In some embodiments, the importance score assigned, at step S706, to at least one of the multiple sub-goals, is equal to the number of determined paths of attack which include that sub-goal.

In some embodiments, the importance score assigned, at step S706, to at least one of the multiple sub-goals, is based on (i) the number of paths of attack of the determined multiple paths of attack which include the given sub-goal, and (ii) at least one member selected from the group consisting of: a cost of remediation of the given sub-goal, a cost of exploitation of an attacker step leading to the given sub-goal, a cost of remediation of an attacker step leading to the given sub-goal, and a probability of success of an attacker step leading to the given sub-goal.

In some embodiments, the importance scores assigned at step S706 are such that a higher numerical value of the importance score for a specific sub-goal is indicative of a higher degree of importance associated with the specific sub-goal.

In some other embodiments, the importance scores assigned at step S706 are such that a lower numerical value of the importance score for a specific sub-goal is indicative of a higher degree of importance associated with the specific sub-goal.

At step S710, a single specific sub-goal included in at least one of the multiple paths of attack determined at step S702, is selected, for example by execution of fourth instructions 628 of sub-goal-selection module 620. The selection of the specific sub-goal is based on the importance score assigned to at least one of the multiple sub-goals at step S706.

In some embodiments, the selected sub-goal is one whose assigned importance score meets a predefined criterion.

In some embodiments, the selected sub-goal is one whose assigned importance score has the highest numerical value of all importance scores assigned to sub-goals included in at least one of the paths of attack determined at step S702. In other embodiments, the selected sub-goal is one whose assigned importance score has the lowest numerical value of all importance scores assigned to sub-goals included in at least one of the determined paths of attack.

In some embodiments, it may happen that multiple sub-goals have assigned thereto a common importance score, which is an importance score indicative of the highest degree of importance of all the importance scores assigned to the multiple sub-goals at step S706. In such embodiments, a tie-breaking rule is used to select one of those multiple sub-goals as the single specific sub-goal.

In some such embodiments, the tie-breaking rule depends on at least one of:
- a cost of remediation of at least one of the multiple sub goals having assigned the common importance score;
- a cost of exploitation of at least one attacker step leading to at least one of the multiple sub-goals having assigned the common importance score;
- a cost of remediation of at least one attacker step leading to at least one of the multiple sub-goals having assigned the common importance score; and
- a probability of success of at least one attacker step leading to at least one of the multiple sub-goals having assigned the common importance score.

In some other such embodiments, the tie-breaking rule includes randomly selecting one of the multiple sub-goals having assigned the common importance score as the single specific sub-goal.

At step S712, a recommendation is provided to protect the selected single specific sub-goal, thereby to improve the security of the networked system. For example, the recommendation may be provided by reporting module 640. The recommendation may be provided by any one or more of: (i) causing a display device to display information about the recommendation, (ii) recording the information about the recommendation in a file, and (iii) electronically transmitting the information about the recommendation, for example to a remote location.

Figure 12A:
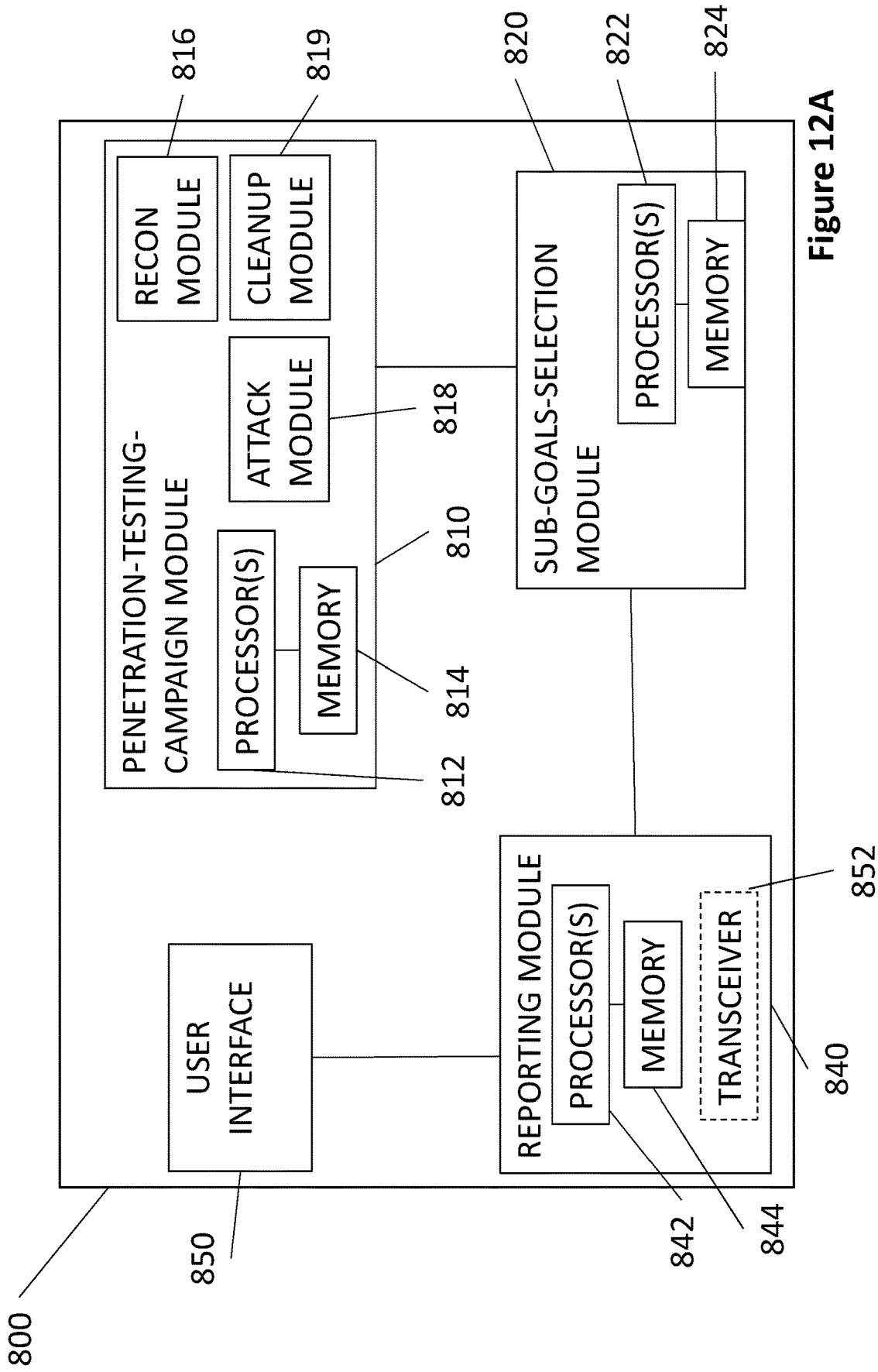
FIG. 12A is a schematic block diagram of a system for providing a recommendation for improving the security of a network system against attackers according to an embodiment of a second aspect of the invention.

Reference is now made to FIG. 12A, which is a block diagram of a system 800 for providing a recommendation for improving the security of a network system against attackers according to an embodiment of a second aspect of the present invention.

As seen in FIG. 12A, the system 800 includes a penetration-testing-campaign module 810, including one or more penetration-testing-campaign processors 812 and a penetration-testing-campaign memory 814, such as a non-transitory computer readable storage medium, having stored thereon instructions to be executed by the one or more penetration-testing-campaign processors 812. The memory 814 has stored instructions to carry out one or more penetration tests of a networked system.

System 800 further includes a reconnaissance module 816 adapted to carry out a reconnaissance function, an attack module 818 adapted to carry out an attack function, and optionally a cleanup module 819 adapted to carry out a cleanup function as described hereinabove. The penetration-testing-campaign module 810 may include at least part of the reconnaissance module 816 carrying out the reconnaissance function code, the attack module 818 carrying out the attack function code, and optionally the cleanup module 819 carrying out the cleanup function code.

System 800 further includes a sub-goals-selection module 820, including one or more sub-goals-selection processors 822 and a sub-goals-selection memory 824, such as a non-transitory computer readable storage medium, having stored thereon instructions to be executed by the one or more sub-goals-selection processors 822. The instructions include instructions that, when carried out in the correct order, select multiple sub-goals to be protected in order to improve the security of a tested networked system.

Figure 12B:
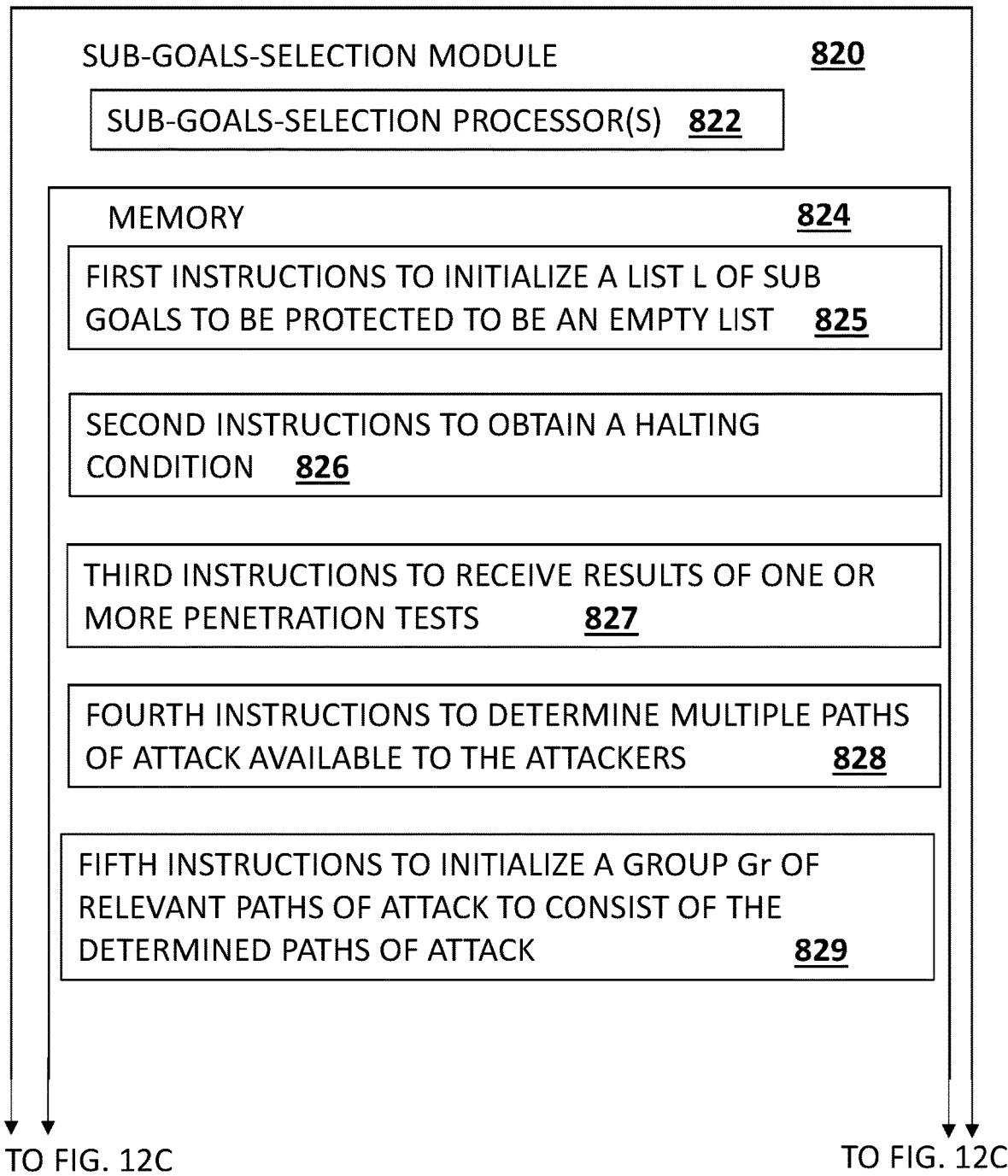
FIGS. 12B and 12C, together, are a schematic block diagram of a sub-goals selection module forming part of the system of FIG. 12A.
Figure 12C:
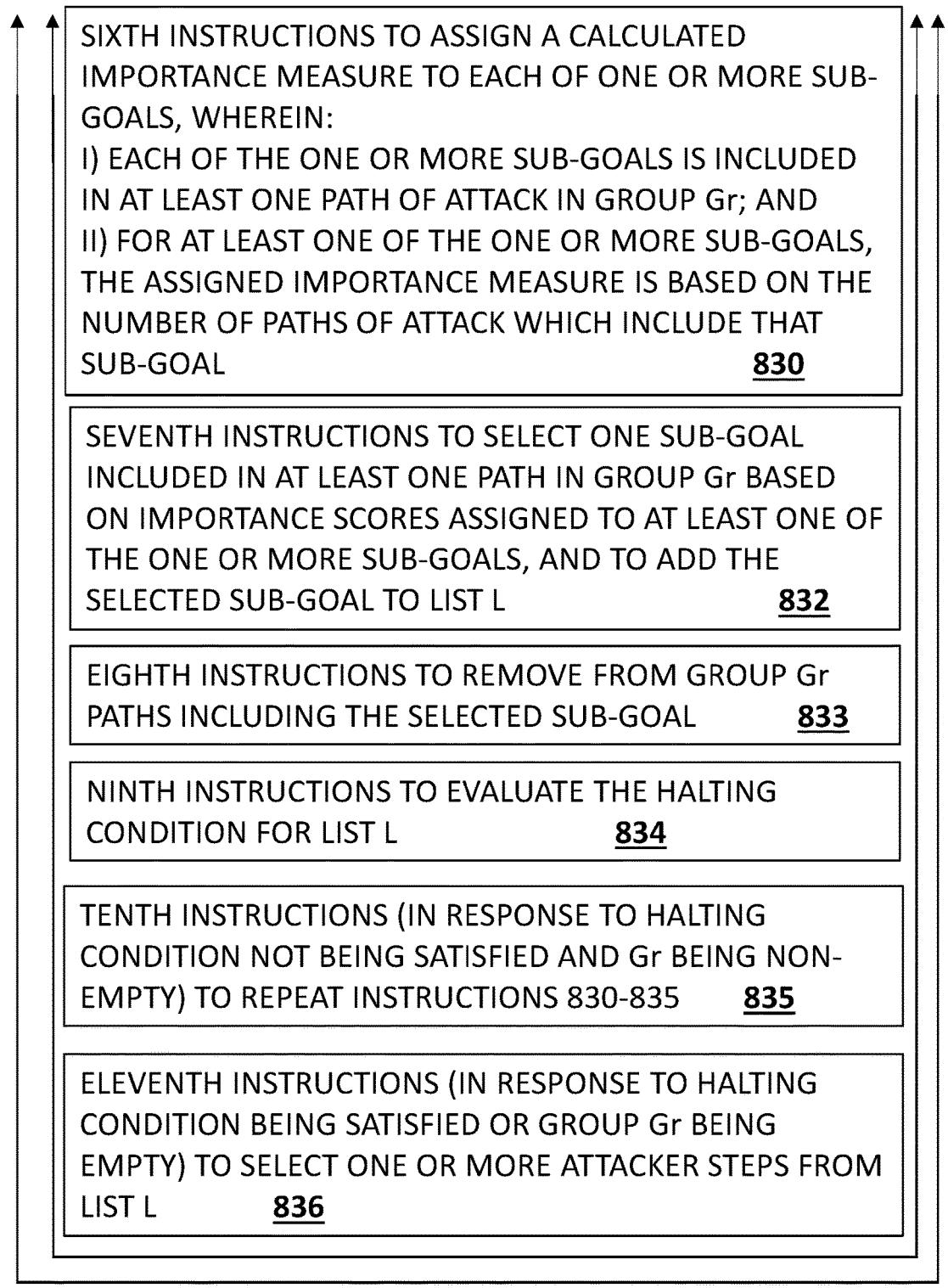

Turning additionally to FIGS. 12B and 12C, which, together, are a schematic block diagram of sub-goals-selection module 820, it is seen that memory 824 includes multiple instructions to be executed by the processor(s) 822, including:

First instructions 825 to initialize a list L of sub-goals to be protected to be an empty list;

Second instructions 826 to obtain a halting condition. The halting condition includes a Boolean condition to be applied to the list of sub-goals;

Third instructions 827 to receive, from penetration-testing-campaign module 810, results of the one or more penetration tests of the networked system carried out by the penetration-testing-campaign module;

Fourth instructions 828 to determine, based on the received results, multiple paths of attack available to the attackers. As described in detail hereinabove, each such path of attack is an ordered sequence of one or more attacker steps and one or more sub-goals;

Fifth instructions 829 to initialize a group Gr of relevant paths of attack to consist of the determined multiple paths of attack;

Sixth instructions 830 to assign a calculated importance score, or importance measure, to each of one or more sub-goals. Each of the one or more sub-goals is included in at least one of the multiple paths of attack included in the group Gr of relevant paths of attack. Additionally, for at least one given sub-goal of the one or more sub-goals, the importance score or measure assigned to the given sub-goal is based on the number of paths of attack in the group of relevant paths of attack which include the sub-goal;

Seventh instructions 832 to select one sub-goal included in at least one path of attack in group Gr, and to add the selected sub-goal to the list L. The selection of the sub-goal is based on the importance score assigned to at least one of the one or more sub-goals;

Eighth instructions 833 to modify the group Gr of relevant paths of attack by removing from group Gr every path of attack that includes the selected sub-goal added to list L by carrying out of instructions 832;

Ninth instructions 834 to evaluate the halting condition for the list L of sub-goals;

Tenth instructions 835, to be carried out in response to determining that (i) the halting condition is not satisfied, and (ii) group Gr of relevant paths of attack includes at least one path of attack, to repeat the sixth instructions 830 to the tenth instructions 835; and Eleventh instructions 836, to be carried out in response to determining that (i) the halting condition is satisfied, or (ii) group Gr of relevant paths of attack is empty, to select one or more sub-goals from the list L of sub-goals.

Returning to FIG. 12A, it is seen that system 800 further includes a reporting module 840, functionally associated with a user interface 850 and with sub-goals-selection module 820. Reporting module 840 includes one or more reporting processors 842, and a reporting memory 844, such as a non-transitory computer readable storage medium, having stored thereon instructions to be executed by the one or more reporting processors 842. The reporting memory 844 has stored:

instructions to receive from sub-goals-selection module 820 an identification of one or more selected sub-goals from list L; and instructions to provide a recommendation to protect the selected one or more sub-goals, thereby to improve the security of the networked system. The instructions to provide the recommendation include at least one of:
  (i) instructions to cause a display device (e.g. of a user interface 850 or another display device, which may be located remotely to the reporting module 840) to display information about the recommendation;
  (ii) instructions to store the information about the recommendation in a file; and
  (iii) instructions to electronically transmit the information about the recommendation, for example using a transceiver 852 functionally associated with the reporting module 840.

In some embodiments, the penetration-testing-campaign memory 814, sub-goals-selection memory 824, and reporting memory 844 are each a dedicated, and separate, memory component or storage medium. In other embodiments, at least two of the penetration-testing-campaign memory 814, the sub-goals-selection memory 824, and the reporting memory 844 may be part of the same memory component or storage medium.

In some embodiments, the penetration-testing-campaign processor(s) 812, sub-goals-selection processor(s) 822, and reporting processor(s) 842 are each a dedicated, and separate, processors. In other embodiments, at least two of the penetration-testing-campaign processor(s) 812, sub-goals-selection processor(s) 822, and reporting processor(s) 842 share at least one common processor.

Figure 13A:
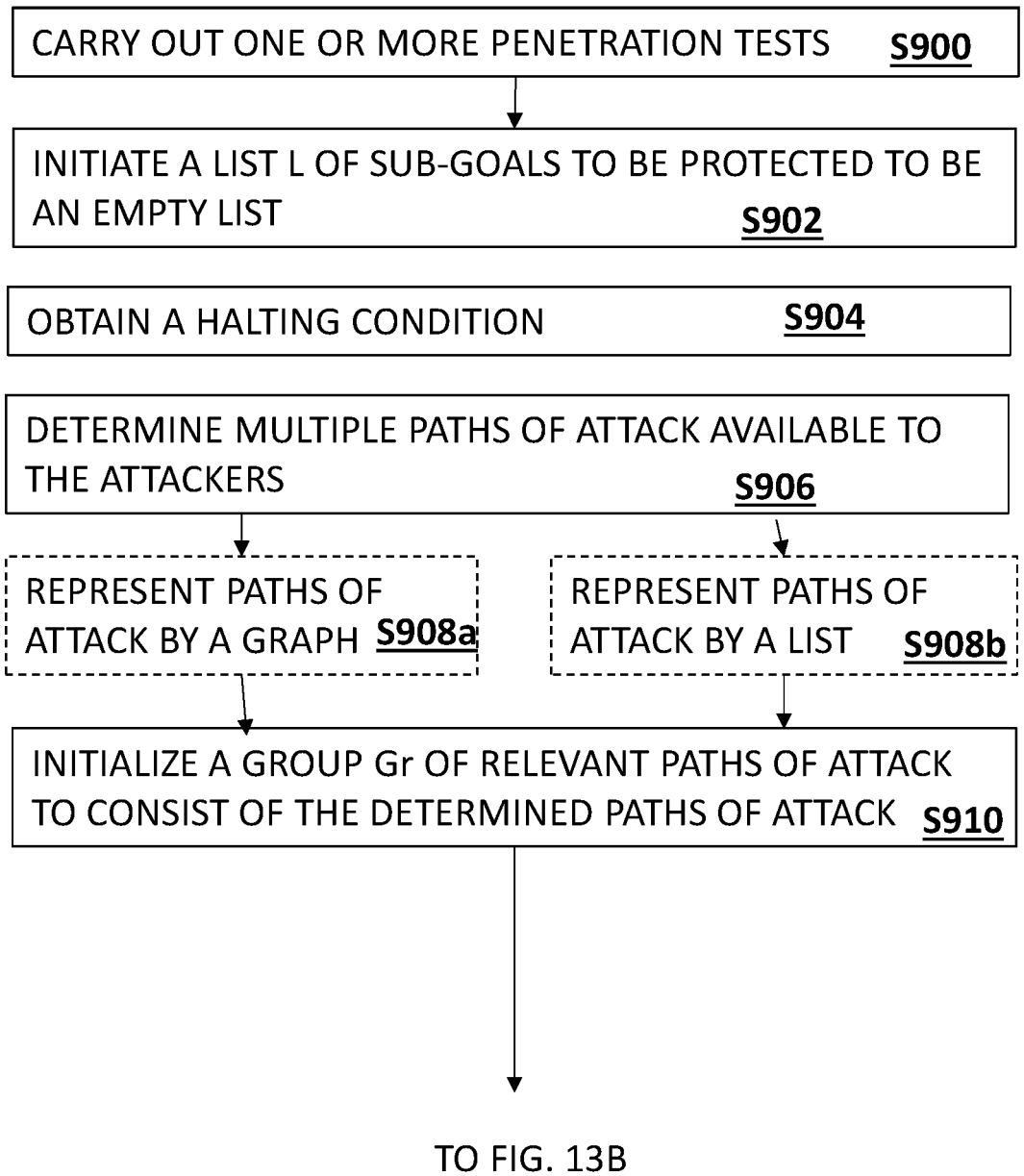

FIGS. 13A and 13B, together, are a flow chart of a method for providing a recommendation for improving the security of a network system against attackers according to an embodiment of the second aspect of the invention. The method of FIGS. 13A and 13B is described herein as being carried out using system 800 of FIG. 12A, but may be carried out using any suitable system.

At step S900 shown in FIG. 13A, a penetration testing system, such as system 800, carries out one or more tests of the networked system, for example using testing methods known in the art.

At step S902, a list L of sub-goals to be protected is initialized to be an empty list, for example by execution of first instructions 825 of sub-goals-selection module 820. In some embodiments, the list L is an ordered list, such that the first element added to the list has the highest priority, and subsequent elements have a monotonically decreasing priority.

A halting condition is obtained at step S904, for example by execution of second instructions 826 of sub-goals-selection module 820. The halting condition is or includes a Boolean condition to be applied to the list L.

In some embodiments, the halting condition is true if and only if list L consists of one sub-goal. In some embodiments, the halting condition is true if and only if list L consists of a pre-determined number of sub-goals.

In some embodiments, the halting condition is true if and only if a sum of remediation costs of all members of list L satisfies a second Boolean condition. In some such embodiments, the second Boolean condition is true if and only if the sum of remediation costs of all members of list L satisfies one of the conditions: higher than a pre-determined threshold, higher than or equal to the pre-determined threshold, lower than the pre-determined threshold, and lower than or equal to the pre-determined threshold.

It will be appreciated by people of skill in the art that step S900 may occur prior to steps S902 and S904, concurrently with steps S902 and S904, or after those steps.

Based on the results of the tests carried out at step S900, multiple paths of attack which are available to attackers are determined at step S906, for example by execution of third instructions 827 and fourth instructions 828 of sub-goals-selection module 820. Each such path of attack is an ordered sequence of one or more attacker steps and one or more sub-goals.

In some embodiments, each path of attack determined in step S906 starts at a starting sub-goal that is assumed to be achievable by the attacker, and ends at a final sub-goal which is assumed to be a goal of the attacker in at least one of the tests carried out at step S900. For example, such paths of attack are illustrated in FIGS. 3A-9B hereinabove.

In some embodiments, in each path of attack determined in step S906: (A) each attacker step in the path of attack is preceded by a sub-goal and followed by a sub-goal in the path of attack, (B) each sub-goal in the path of attack, except for a starting sub-goal of the path of attack, is preceded by an attacker step in the given path of attack, and (C) each sub-goal in the path of attack, except for a final sub-goal of the path of attack, is followed by an attacker step in the path of attack.

In some embodiments, at an optional step S908a, the paths of attack determined at step S906 are represented by a graph, for example by attacker-steps-selection module 820. Each determined path of attack corresponds to a path in the graph.

In some such embodiments, for each given path in the graph corresponding to a specific path of attack available to the attackers, all sub-goals and all attacker steps included in the specific path of attack are represented as graph nodes included in the given path in said graph. Such a representation is illustrated, for example, in FIGS. 3A, 4, 5, 6, 9A and 9B.

In some other such embodiments, for each given path in the graph corresponding to a specific path of attack available to the attackers, all sub-goals included in the specific path of attack are represented as graph nodes included in the given path in the graph and all attacker steps included in the specific path of attack are represented as graph edges included in the given path in the graph. Such a representation is illustrated, for example, in FIGS. 3B, and 7A to 8.

In some embodiments, at an optional step S908b, the paths of attack determined at step S906 are represented by a list, for example by attacker-steps-selection module 820. Each given path of attack corresponds to an item in the list that includes all sub-goals and all attacker steps included in the given path of attack. Such a representation is illustrated, for example, in FIG. 3C.

At step S910, a group Gr of relevant paths of attack is initialized to consist of all the multiple paths of attack determined at step S906, for example by execution of fifth instructions 829 of sub-goals-selection module 820.

A calculated importance score, or importance measure, is assigned to each of one or more sub-goals at step S912, for example by execution of sixth instructions 830 of sub-goals-selection module 820. Each sub-goal of the one or more sub-goals to which an importance score is assigned, is included in at least one of the paths of attack included in group Gr of relevant paths of attack. The importance score assigned to at least one given sub-goal of the one or more sub-goals is based on a number of paths of attack in group Gr of relevant paths of attack which include that given sub-goal.

In some embodiments, the importance score assigned, at step S912, to each given sub-goal of the one or more sub-goals, is based on the number of paths of attack in group Gr of relevant paths of attack which include that given sub-goal.

In some embodiments, the importance score assigned, at step S912, to at least one of the one or more sub-goals, is based only on the number of paths of attack in group Gr of relevant paths of attack which include that sub-goal.

In some embodiments, the importance score assigned, at step S912, to each given sub-goal of the one or more sub-goals, is based only on the number of paths of attack in group Gr of relevant paths of attack which include the given sub-goal.

In some embodiments, the importance score assigned, at step S912, to at least one of the one or more sub-goals, is equal to the number of paths of attack in group Gr of relevant paths of attack which include that sub-goal.

In some embodiments, the importance score assigned, at step S912, to at least one given sub-goal of the one or more sub-goals, is based on (i) the number of paths of attack which include the given sub-goal, and (ii) at least one member selected from the group consisting of: a cost of remediation of the given sub-goal, a cost of exploitation of an attacker step leading to the given sub-goal, a cost of remediation of an attacker step leading to the given sub-goal, and a probability of success of an attacker step leading to the given sub-goal.

In some embodiments, the importance scores assigned at step S912 are such that a higher numerical value of the importance score for a specific sub-goal is indicative of a higher degree of importance associated with the specific sub-goal.

In some other embodiments, the importance scores assigned at step S912 are such that a lower numerical value of the importance score for a specific sub-goal is indicative of a higher degree of importance associated with the specific sub-goal.

At step S916, one sub-goal included in at least one of the paths of attack in group Gr is selected and is added to the list L of sub-goals, for example by execution of seventh instructions 832 of sub-goals-selection module 820. The selection of the sub-goal is based on the importance score assigned to at least one of the one or more sub-goals (which are included in at least one of the paths of attack in group Gr).

In some embodiments, the selected sub-goal is one whose assigned importance score meets a predefined criterion.

In some embodiments, the selected sub-goal is one whose assigned importance score has the highest numerical value of all importance scores assigned to sub-goals included in at least one of the paths of attack in group Gr of relevant paths of attack. In other embodiments, the selected sub-goal is one whose assigned importance score has the lowest numerical value of all importance scores assigned to sub-goals included in at least one of the paths of attack in group Gr of relevant paths of attack.

In some embodiments, it may happen that multiple sub-goals have assigned thereto a common importance score, which is an importance score indicative of the highest degree of importance of all the importance scores assigned to the multiple sub-goals at step S912. In such embodiments, a tie-breaking rule is used to select one of those multiple sub-goals as the one sub-goal.

In some such embodiments, the tie-breaking rule depends on at least one of:
 a cost of remediation of at least one of the multiple sub goals having assigned the common importance score;
 a cost of exploitation of at least one attacker step leading to at least one of the multiple sub-goals having assigned the common importance score;
 a cost of remediation of a at least one attacker step leading to at least one of the multiple sub-goals having assigned the common importance score; and
 a probability of success of at least one attacker step leading to at least one of the multiple sub-goals having assigned the common importance score.

In some other such embodiments, the tie-breaking rule includes randomly selecting one of the multiple sub-goals having assigned the common importance score as the one sub-goal.

In some embodiments, in which list L is an ordered list, the selected sub-goal is added to the end of list L.

At step S918 the group Gr of relevant paths of attack is modified, for example by execution of eighth instructions 833 of sub-goals-selection module 820. The modification of group Gr includes removing from the group Gr every path of attack that includes the selected sub-goal (of step S916). Thus, following step S918, group Gr typically includes fewer elements than prior to step S918.

At step S920, the halting condition for list L (obtained at step S904) is evaluated, for example by execution of ninth instructions 834 of sub-goals-selection module 820.

If the halting condition is not satisfied, at step S922 the group Gr is evaluated to determine whether it includes at least one path of attack.

If the group Gr includes at least one path of attack, another iteration of the method is initiated, by returning the flow to step S912, for example by execution of tenth instructions 835 of sub-goals-selection module 820.

If at step S920 it is determined that the halting condition is satisfied, or if at step S922 it is determined that the group Gr is an empty group (i.e. includes zero paths of attack), one or more of the sub-goals in list L are selected as sub-goals to be protected at step S924, for example by execution of eleventh instructions 836 of sub-goals-selection module 820.

At step S926, a recommendation is provided to protect one or more of the sub-goals currently in list L, thereby to improve the security of the networked system. For example, the recommendation may be provided by reporting module 840. The recommendation may be provided by any one or more of: (i) causing a display device to display information about the recommendation, (ii) recording the information about the recommendation in a file, and (iii) electronically transmitting the information about the recommendation, for example to a remote location.

In some embodiments, in which list L is an ordered list, and at step S916 sub-goals are added to the end of list L such that newly added sub-goals become the last elements in the ordered list L, the recommendation provided at step S926 includes a recommendation to protect the one or more sub-goals selected from list L according to an order of the sub-goals in the list L.

DEFINITIONS

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation". Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system.

The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.
18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.
19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.
20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.
21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.
22. "attacker" or "threat actor"—An entity, whether a single person, a group of persons or an organization, that might conduct an attack against a networked system by penetrating it for uncovering its security vulnerabilities and/or for compromising it.
23. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.
24. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.
25. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.
26. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.
27. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

28. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

29. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

30. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

31. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.
The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

32. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

33. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.
It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

34. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

35. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

36. "resource of a network node"—A file in the network node, a folder in the network node, credentials of a user residing in the network node (the credentials not necessarily applying to the network node containing the credentials), a peripheral device of the network node or a communication device accessible to the network node.

37. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

38. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

Access rights may be conditioned on the user authenticating himself before getting the rights to perform the relevant operations. A user is said to have certain access rights regardless if those rights are conditioned on authentication or not.

The term "access rights" in the plural may be used even if only a single right is involved (e.g. when a user has only a right to read a single file in the network node).

39. "user credentials"—An attestation issued to the user for authenticating himself in order to be allowed to use access rights granted to him in one or more network nodes. User credentials may include a user name, a user ID, a password, any combination of the three, or any other data item which is expected not to be available to other people.

40. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

41. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

42. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

43 "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

44. "session-hijacking attack"—a cyber-attack where a valid communication session between two network nodes in a networked system is used by an attacker to gain unauthorized access to information or services in the networked computer system.

45. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

46. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

47 "administrator of a network node"—Any person that is authorized, among other things, to define or change at least one rule controlling at least one of an access right, a permission, a priority and a configuration in the network node.

48 "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

49. "achieving full control of a computing device"—For a multi-user computing device that distinguishes between administrator and non-administrator users, logging into the computing device with administrator access rights. For a single-user computing device, logging into the computing device as the single user.

50. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

51. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

52. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

53. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

54. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

55. "user interface of a computing device"—A user interface that is functionally attached to the computing device and serves the computing device for interacting with the user. An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse). An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

56. "random selection"—A selection that depends on a random or pseudo-random factor.

Different possible outcomes in a random selection do not necessarily have the same probabilities of being selected.

57. "broadcast domain"—A logical division of a networked system, in which all network nodes can reach each other by broadcasting at the data link layer. In other words, each network node in a broadcast domain can transmit a data link broadcast message that is addressed to all other network nodes within its broadcast domain.

58. "attacker step"—One or more actions performed by an attacker of a networked system in order to achieve a certain result. An attacker step may be included in an actual or potential attempt of an attacker to compromise a networked system that includes one or more attacker steps. Performing a given attacker step may be conditioned on certain achievements being already achieved by the attacker prior to carrying out the given attacker step.

An example of an attacker step that consists of a single action is the recovering of a password enabling access to a given network node from a known hash code (e.g. using a pre-compiled dictionary of hash codes and their corresponding passwords, when the algorithm of hashing is known). In this example, the attacker step is conditioned on a prior achievement by the attacker of finding out the hash code.

An example of an attacker step that consists of multiple actions is the recovering of a password enabling access to a given network node based on an ability to remotely execute arbitrary code in the given network node (e.g. remotely executing in the given network node code that obtains a hash code of a password enabling access to the given network node, and then recovering the corresponding password from its hash code as in the previous example). In this example, the attacker step is conditioned on a prior achievement by the attacker of obtaining an ability to remotely execute arbitrary code in the given network node.

As can be seen from the above examples, the breaking out of a potential attack plan into attacker steps is somewhat arbitrary. The second example above including a single attacker step consisting of two actions could have been defined to include two separate attacker steps, each including a single action—the first attacker step consisting of remotely executing in the given network node code that obtains the hash code, and the second attacker step consisting of recovering the password from its hash code.

59. "remediation action" or just "remediation"—An action that improves the security of a networked system by making one or more attacker steps practically unavailable, more expensive, more difficult, less efficient and/or less useful for attackers of the networked system.

An example of a remediation action that makes only a single attacker step practically unavailable to attackers is the installing of a defensive measure applicable only to a single network node (e.g. installing in a single network node a software utility that locally requires fingerprints identification on top of requiring a password in order to allow access).

An example of a remediation action that makes multiple attacker steps practically unavailable to attackers is the replacing of a common algorithm or a common method used in multiple network nodes of the networked system by an improved algorithm or method (e.g. the global replacing of a simple password hash code calculation algorithm by an improved password hash code algorithm that uses salt in its calculation). In such case, each given network node benefiting from the improved algorithm corresponds to a different attacker step targeting the given network node.

A remediation action that makes the one or more attacker steps practically unavailable does not necessarily make the one or more attacker steps completely unavailable to the attackers. If an action makes the one or more attacker steps too costly for the attackers to use (i.e. makes the cost of exploitation of the one or more attacker steps so high that there is very low probability that the attackers would use them), then the action is considered to make the one or more attacker steps practically unavailable to the attackers and therefore is a remediation action.

Another example of a remediation action that does not make the one or more attacker steps completely unavailable to the attackers is an action of replacing an encryption algorithm using a short key with a similar encryption algorithm using a longer key. This may result in the deciphering of the encrypted data by an attacker taking a much longer time than before. This in turn makes the one or more attacker steps less efficient to use, and therefore such action is considered to be a remediation action.

60. "sub-goal" or "achievement"—A result or ability obtained by an attacker by successfully performing an attacker step against a networked system, where the attacker was not in possession of the result or ability before performing the attacker step.

For example, obtaining a password enabling access to a given network node of the networked system is a possible sub-goal. Such sub-goal may be obtained by an attacker by carrying out the attacker step "recovering of a password to the given network node from a known password hash code" or the attacker step "exporting out of the networked system of a file containing all credentials for the local network in which the given network node resides". As another example, exporting a specific file (e.g. an Excel file containing a company's budget) out of the networked system is a possible sub-goal. As still another example, compromising a given network node so that the attacker gets full control of it is a possible sub-goal. It should be noted that every resource of a tested networked system corresponds to a possible sub-goal of obtaining, controlling or damaging that resource.

A special case of a sub-goal is a dummy sub-goal representing a state in which an attacker has no possession of any result or ability which is not available to all. A dummy sub-goal is assumed to be achievable by any attacker even before carrying out any attacker step.

In some cases, a sub-goal may be automatically obtained by an attacker following the obtaining of another sub-goal, without having to perform any additional attacker step. For example, the sub-goal "compromise either node X or node Y" is automatically obtained once the sub-goal "compromise node X" was obtained, without having to perform any additional attacker step. In such case it can be assumed that the sub-goal is obtained by a dummy attacker step that does nothing.

61. "path of attack of a networked system" or "a branch of attack of a networked system"—An ordered sequence of one or more attacker steps and one or more sub-goals in the networked system, that starts with a starting sub-goal that is assumed to be achievable by attackers and ends with a final sub-goal that is assumed to be a goal of attackers when attacking the networked system.

The starting sub-goal may be a dummy sub-goal representing a state in which an attacker has no possession of any result or ability which is not available to all. Alternatively, the starting sub-goal may be a non-dummy sub-goal representing a state in which an attacker is in possession of a result or an ability not available to all, which sub-goal is assumed to be available to the attacker for the purpose of the present testing.

A path of attack may be represented using multiple different representation forms, including but not limited to various forms of graphs and lists. In other words, different representation forms of a path of attack may represent the same path of attack, in which case they are equivalent to each other.

Typically, but not necessarily, a given path of attack satisfies the following conditions: (A) each attacker step included in the given path of attack is preceded by a sub-goal and followed by a sub-goal in the given path of attack, (B) each sub-goal included in the given path of attack, except for the starting sub-goal of the given path of attack, is preceded by an attacker step in the given path of attack, (C) each sub-goal included in the given path of attack, except for the final sub-goal of the given path of attack, is followed by an attacker step in the given path of attack.

62. "a true sub-goal of a path of attack"—A sub-goal included in the path of attack that is not the starting sub-goal or the final sub-goal of the path of attack.

63. "an attacker step leading to a sub-goal"—An attacker step that, if executed, achieves, or has a non-negligible probability of achieving, the sub-goal for the attacker. The term "leading" in this context should be understood as "directly leading". In other words, if attacker step A brings the attacker from sub-goal 1 to sub-goal 2 and attacker step B brings the attacker from sub-goal 2 to sub-goal 3, then attacker step A is leading to sub-goal 2 and attacker step B is leading to sub-goal 3, but attacker step A is not leading to sub-goal 3 (even though it is in a path of attack leading to sub-goal 3).

64. "importance of a sub-goal in a networked system"—A measure of how important it is for the owner of the networked system to protect the sub-goal against attack. For example, a sub-goal that is included in a large number of paths of attack that are available to attackers of the networked system is more important to protect than a sub-goal included only in a single path of attack (assuming all other factors associated with the two sub-goals are equal).

The importance of sub-goals may be represented by a numeric score within a given range, typically (but not necessarily) with a higher score indicating a sub-goal having a higher importance. For example, the given range may be [0 . . . 10], with the importance of a first sub-goal included in three paths of attack being 8, and the importance of a second sub-goal included in a single path of attack being 2. Alternatively, a lower score may represent a lower importance sub-goal.

65. "blocking an attacker step", "blocking a vulnerability", "blocking a way for an attacker to compromise"—Making the attacker step or the exploitation of the vulnerability or the way to compromise (as the case may be) practically unavailable, more expensive, more difficult, less efficient and/or less useful to attackers. The blocking of the attacker step or the exploitation of the vulnerability or the way to compromise is done by implementing one or more remediation actions.

66. "protecting a sub-goal"—Making the sub-goal practically unachievable, more expensive to achieve, more difficult to achieve, less efficient to achieve and/or less useful to attackers. The protecting of the sub-goal is done by implementing one or more remediation actions. Typically, the one or more remediation actions applied for protecting a sub-goal are remediation actions that block attacker steps leading to that sub-goal in at least one path of attack in which it is included.

67. "cost of exploitation of an attacker step", "cost of exploitation of a vulnerability"—A measure of how difficult or expensive it is for an attacker to use the attacker step or to exploit the vulnerability (as the case may be). For example, an attacker step using the attacking method known as "ARP Spoofing" is costlier for the attacker than an attacker step using a method of attack taken from a publicly available exploit kit.

The cost of exploitation may be represented by a numeric score within a given range, typically (but not necessarily) with a higher score indicating a costlier attacker step. For example, the given range may be [0 . . . 10], with the cost of exploitation using ARP Spoofing being 7, and the cost of exploitation using a method taken from a publicly available exploit kit being 2. Alternatively, a lower score may represent a costlier attacker step.

68. "cost of remediation of an attacker step", "cost of remediation of a vulnerability"—A measure of how difficult or expensive it is for the organization owning the networked system to which the attacker step or the exploitation of the vulnerability is applied to block the attacker step or the exploitation of the vulnerability (as the case may be). For example, an attacker step that can be blocked by simply installing a security patch for a software application (e.g. Microsoft Word) is much less costly to block than an attacker step that requires buying and installing a new router in order to split an existing sub-network into two different sub-networks.

The cost of remediation may be represented by a numeric score within a given range, typically (but not necessarily) with a higher score representing a costlier attacker step. For example, the given range may be [0 . . . 10], with the cost of a remediation action requiring only installing a patch being 1, and the cost of a remediation action requiring a new router being 8. Alternatively, a lower score may represent a costlier attacker step.
69. "cost of remediation of a sub-goal"—A measure of how difficult or expensive it is for the organization owning the networked system in which the sub-goal is defined to protect the sub-goal against being achieved by an attacker. The cost of remediation of a sub-goal typically depends on the costs of remediation of the attacker steps leading to it in the paths of attack in which it is included.

For example, for a sub-goal included only in a single path of attack, the cost of remediation of the sub-goal may be equal to the cost of remediation of the single attacker step leading to it in the single path of attack. For a sub-goal included in multiple paths of attack, the cost of remediation of the sub-goal may be equal to the sum of the costs of remediation of all attacker steps leading to it in at least one path. If the same attacker step leads to the sub-goal in multiple paths of attack, the cost of remediation of that attacker step may be taken into account only once.

The cost of remediation of a sub-goal may depend on factors other than costs of remediation of attacker steps. For example, the cost of remediation of a sub-goal may be the sum of the multiplications of cost of remediation and probability of success for all attacker steps leading to it in at least one path.

70. "probability of success of an attacker step", "probability of success of a vulnerability"—A measure of how probable is it that execution of the attacker step or an attempt to exploit the vulnerability (as the case may be) by the attacker will succeed in achieving the sub-goal that the attacker step is intended to achieve or will succeed in compromising the networked system, taking into account currently available knowledge regarding the state of the attacked networked system. For example, an attacker step that is based on exploiting a known Windows 7 vulnerability may have high probability of success when applied to a network node having the original version of the OS installed, while having a low probability of success when applied to a network node in which a certain security patch had also been installed.

Typically, probabilities of success are expressed in percentages in the range of 0% to 100%. Alternatively, the probabilities of success may be represented by numeric values in the range of zero to one, where zero corresponds to 0% and one corresponds to 100%. However, any other numerical scale may be used for representing probabilities of success, provided that the scale is a monotonically increasing or monotonically decreasing function of how probable is it that the attacker step will succeed in achieving its sub-goal.

71. "a Boolean condition"—A statement that can have a value of either true or false. If the statement is true, we say that the Boolean condition is satisfied. If the statement is false, we say that the Boolean condition is not satisfied.

72. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

73. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

74. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

75. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately, in any other embodiment, or in any suitable combination including only a sub-group of those features.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for providing, by a penetration testing system, a recommendation for improving the security of a networked system against attackers, the method comprising:
   a. carrying out one or more penetration tests of the networked system by the penetration testing system;
   b. based on results of the one or more penetration tests of the networked system, determining multiple paths of attack available to the attackers, each path of attack of the determined multiple paths of attack being an ordered sequence of one or more attacker steps and one or more sub-goals;
   c. assigning a calculated importance score to each of multiple sub-goals, wherein (i) each sub-goal of the multiple sub-goals is included in at least one of the determined multiple paths of attack, and (ii) for at least one given sub-goal of the multiple sub-goals, the importance score assigned to the given sub-goal is based on a number of paths of attack of the determined multiple paths of attack which include the given sub-goal;
   d. selecting one sub-goal included in at least one of the determined multiple paths of attack, the selecting of the one sub-goal being based on the importance score assigned to at least one of the multiple sub-goals; and
   e. providing a recommendation to protect the selected one sub-goal, the providing of the recommendation comprising at least one operation selected from the group consisting of:
      i. causing a display device to display information about the recommendation;
      ii. recording the information about the recommendation in a file; and
      iii. electronically transmitting the information about the recommendation.

2. The method of claim 1, wherein, for each given sub-goal of the multiple sub-goals, the importance score assigned to the given sub-goal is based on the number of paths of attack of the determined multiple paths of attack which include the given sub-goal.

3. The method of claim 1, wherein, for at least one given sub-goal of the multiple sub-goals, the importance score assigned to the given sub-goal is based only on the number of paths of attack of the determined multiple paths of attack which include the given sub-goal.

4. The method of claim 1, wherein, for each given sub-goal of the multiple sub-goals, the importance score assigned to the given sub-goal is based only on the number of paths of attack of the determined multiple paths of attack which include the given sub-goal.

5. The method of claim 1, wherein, for at least one given sub-goal of the multiple sub-goals, the importance score assigned to the given sub-goal is equal to the number of paths of attack of the determined multiple paths of attack which include the given sub-goal.

6. The method of claim 1, wherein the selecting of the one sub-goal included in at least one of the determined multiple paths of attack comprises selecting one sub-goal whose assigned importance score meets a predefined criterion.

7. The method of claim 1, wherein, for at least one given sub-goal of the multiple sub-goals, the importance score assigned to the given sub-goal is based on (i) the number of paths of attack of the determined multiple paths of attack which include the given sub-goal, and (ii) at least one member selected from the group consisting of: a cost of remediation of the given sub-goal, a cost of exploitation of an attacker step leading to the given sub-goal, a cost of remediation of an attacker step leading to the given sub-goal, and a probability of success of an attacker step leading to the given sub-goal.

8. A method for providing, by a penetration testing system, a recommendation for improving the security of a networked system against attackers, the method comprising:
   a. initializing a list of sub-goals that should be protected to be an empty list;
   b. obtaining a halting condition, the halting condition including a Boolean condition applied to the list of sub-goals;
   c. carrying out one or more penetration tests of the networked system by the penetration testing system;
   d. based on results of the one or more penetration tests of the networked system, determining multiple paths of attack available to the attackers, each path of attack of the determined multiple paths of attack being an ordered sequence of one or more attacker steps and one or more sub-goals;
   e. initializing a group of relevant paths of attack to consist of the determined multiple paths of attack;
   f. assigning a calculated importance score to each of one or more sub-goals, wherein (i) each sub-goal of the one or more sub-goals is included in at least one path of attack included in the group of relevant paths of attack, and (ii) for at least one given sub-goal of the one or more sub-goals, the importance score assigned to the given sub-goal is based on a number of paths of attack in the group of relevant paths of attack which include the given sub-goal;
   g. selecting one sub-goal included in at least one member of the group of relevant paths of attack and adding the one sub-goal to the list of sub-goals, the selecting of the one sub-goal being based on the importance scores assigned to at least one of the one or more sub-goals;
   h. modifying the group of relevant paths of attack by removing from it every path of attack that includes the one sub-goal;
   i. evaluating the halting condition for the list of sub-goals;
   j. in response to determining that (i) the halting condition is not satisfied, and (ii) the group of relevant paths of attack is not empty, repeating steps f to j; and
   k. in response to determining that (i) the halting condition is satisfied, or (ii) the group of relevant paths of attack is empty, providing a recommendation to protect one or more sub-goals from the list of sub-goals, the providing of the recommendation comprising at least one operation selected from the group consisting of:
i. causing a display device to display information about the recommendation;
ii. recording the information about the recommendation in a file; and
iii. electronically transmitting the information about the recommendation.

9. The method of claim 8, wherein, for each given sub-goal of the one or more sub-goals, the importance score assigned to the given sub-goal is based on the number of paths of attack in the group of relevant paths of attack which include the given sub-goal.

10. The method of claim 8, wherein, for at least one given sub-goal of the one or more sub-goals, the importance score assigned to the given sub-goal is based only on the number of paths of attack in the group of relevant paths of attack which include the given sub-goal.

11. The method of claim 8, wherein, for each given sub-goal of the one or more sub-goals, the importance score assigned to the given sub-goal is based only on the number of paths of attack in the group of relevant paths of attack which include the given sub-goal.

12. The method of claim 8, wherein, for at least one given sub-goal of the one or more sub-goals, the importance score assigned to the given sub-goal is equal to the number of paths of attack in the group of relevant paths of attack which include the given sub-goal.

13. The method of claim 8, wherein the selecting of the one sub-goal included in at least one member of the group of relevant paths of attack comprises selecting one sub-goal whose assigned importance score meets a predefined criterion.

14. The method of claim 8, wherein, for at least one given sub-goal of the one or more sub-goals, the importance score assigned to the given sub-goal is based on (i) the number of paths of attack in the group of relevant paths of attack which include the given sub-goal, and (ii) at least one member selected from the group consisting of: a cost of remediation of the given sub-goal, a cost of exploitation of an attacker step leading to the given sub-goal, a cost of remediation of an attacker step leading to the given sub-goal, and a probability of success of an attacker step leading to the given sub-goal.

15. The method of claim 8, wherein (i) the list of sub-goals is an ordered list of sub-goals, (ii) the adding of the one sub-goal to the list of sub-goals includes adding the one sub-goal at an end of the ordered list of sub-goals such that the one sub-goal becomes a last member of the ordered list of sub-goals, and (iii) the providing a recommendation to protect one or more sub-goals from the list of sub-goals includes providing a recommendation to protect the one or more sub-goals from the list of sub-goals according to an order of the one or more sub-goals in the ordered list of sub-goals.

16. The method of claim 8, wherein the halting condition is true if and only if the list of sub-goals consists of one sub-goal.

17. The method of claim 8, wherein the halting condition is true if and only if the list of sub-goals consists of a pre-determined number of sub-goals.

18. The method of claim 8, wherein the halting condition is true if and only if a sum of remediation costs of all members of the list of sub-goals satisfies a second Boolean condition.

19. A system for providing a recommendation for improving the security of a networked system against attackers, the system comprising:
a. a penetration-testing-campaign module including:
i. one or more penetration-testing-campaign hardware processors; and
ii. a penetration-testing-campaign non-transitory computer readable storage medium for instructions execution by the one or more penetration-testing-campaign hardware processors, the penetration-testing-campaign non-transitory computer readable storage medium having stored instructions to carry out one or more penetration tests of the networked system;
b. a sub-goal-selection module including:
i. one or more sub-goal-selection hardware processors; and
ii. a sub-goal-selection non-transitory computer readable storage medium for instructions execution by the one or more sub-goal-selection hardware processors, the sub-goal-selection non-transitory computer readable storage medium having stored:
1) instructions to receive, from the penetration-testing-campaign module, results of the one or more penetration tests of the networked system;
2) instructions to determine, based on said received results, multiple paths of attack available to the attackers, each path of attack of the determined multiple paths of attack being an ordered sequence of one or more attacker steps and one or more sub-goals;
3) instructions to assign a calculated importance score to each of multiple sub-goals, wherein (i) each sub-goal of the multiple sub-goals is included in at least one of the determined multiple paths of attack, and (ii) for at least one given sub-goal of the multiple sub-goals, the importance score assigned to the given sub-goal is based on a number of paths of attack of the determined multiple paths of attack which include the given sub-goal; and
4) instructions to select one sub-goal included in at least one of the determined multiple paths of attack, the selecting of the one sub-goal being based on the importance score assigned to at least one of the multiple sub-goals; and
c. a reporting module including:
i. one or more reporting hardware processors; and
ii. a reporting non-transitory computer readable storage medium for instructions execution by the one or more reporting hardware processors, the reporting non-transitory computer readable storage medium having stored:
1) instructions to receive, from the sub-goal-selection module, an identification of the selected one sub-goal; and
2) instructions to provide a recommendation to protect the selected one sub-goal, the instructions to provide the recommendation including at least one member selected from the group consisting of:
I. instructions to cause a display device to display information about the recommendation;
II. instructions to record the information about the recommendation in a file; and
III. instructions to electronically transmit the information about the recommendation.

20. A system for providing a recommendation for improving the security of a networked system against attackers, the system comprising:
  a. a penetration-testing-campaign module including:
    i. one or more penetration-testing-campaign hardware processors; and
    ii. a penetration-testing-campaign non-transitory computer readable storage medium for instructions execution by the one or more penetration-testing-campaign hardware processors, the penetration-testing-campaign non-transitory computer readable storage medium having stored instructions to carry out one or more penetration tests of the networked system;
  b. a sub-goals-selection module including:
    i. one or more sub-goals-selection hardware processors; and
    ii. a sub-goals-selection non-transitory computer readable storage medium for instructions execution by the one or more sub-goals-selection hardware processors, the sub-goals-selection non-transitory computer readable storage medium having stored:
      1) first instructions to initialize a list of sub-goals that should be protected to be an empty list;
      2) second instructions to obtain a halting condition, the halting condition including a Boolean condition applied to the list of sub-goals;
      3) third instructions to receive, from the penetration-testing-campaign module, results of the one or more penetration tests of the networked system;
      4) fourth instructions to determine, based on said received results of the one or more tests of the networked system, multiple paths of attack available to the attackers, each path of attack of the determined multiple paths of attack being an ordered sequence of one or more attacker steps and one or more sub-goals;
      5) fifth instructions to initialize a group of relevant paths of attack to consist of the determined multiple paths of attack;
      6) sixth instructions to assign a calculated importance score to each of one or more sub-goals, wherein (i) each sub-goal of the one or more sub-goals is included in at least one path of attack included in the group of relevant paths of attack, and (ii) for at least one given sub-goal of the one or more sub-goals, the importance score assigned to the given sub-goal is based on a number of paths of attack in the group of relevant paths of attack which include the given sub-goal;
      7) seventh instructions to select one sub-goal included in at least one member of the group of relevant paths of attack and to add the one sub-goal to the list of sub-goals, the selecting of the one sub-goal being based on the importance scores assigned to at least one of the one or more sub-goals;
      8) eighth instructions to modify the group of relevant paths of attack by removing from it every path of attack that includes the one sub-goal;
      9) ninth instructions to evaluate the halting condition for the list of sub-goals;
      10) tenth instructions, to be carried out in response to determining that (i) the halting condition is not satisfied, and (ii) the group of relevant paths of attack is not empty, to repeat the sixth instructions to the tenth instructions; and
      11) eleventh instructions, to be carried out in response to determining that (i) the halting condition is satisfied, or (ii) the group of relevant paths of attack is empty, to select one or more sub-goals from the list of sub-goals; and
  c. a reporting module including:
    i. one or more reporting hardware processors; and
    ii. a reporting non-transitory computer readable storage medium for instructions execution by the one or more reporting hardware processors, the reporting non-transitory computer readable storage medium having stored:
      1) instructions to receive, from the sub-goals-selection module, an identification of the one or more selected sub-goals; and
      2) instructions to provide a recommendation to protect the one or more selected sub-goals, the instructions to provide the recommendation including at least one member selected from the group consisting of:
        I. instructions to cause a display device to display information about the recommendation;
        II. instructions to record the information about the recommendation in a file; and
        III. instructions to electronically transmit the information about the recommendation.

* * * * *